(12) United States Patent
Bryce et al.

(10) Patent No.: US 6,610,118 B2
(45) Date of Patent: Aug. 26, 2003

(54) AIR PURIFIER

(75) Inventors: Don Bryce, Framingham, MA (US); David Curtis, Torrington, CT (US); Yani Deros, Phoenix, AZ (US)

(73) Assignee: The Holmes Group, Inc., Milford, MA (US)

( * ) Notice: Subject to any disclaimer, the term of this patent is extended or adjusted under 35 U.S.C. 154(b) by 0 days.

(21) Appl. No.: 09/936,574

(22) PCT Filed: Jan. 12, 2001

(86) PCT No.: PCT/US01/01272

§ 371 (c)(1),
(2), (4) Date: Feb. 8, 2002

(87) PCT Pub. No.: WO01/51169

PCT Pub. Date: Jul. 19, 2001

(65) Prior Publication Data

US 2003/0010001 A1 Jan. 16, 2003

Related U.S. Application Data

(63) Continuation-in-part of application No. 09/611,513, filed on Jul. 7, 2000, now Pat. No. 6,425,932.
(60) Provisional application No. 60/142,599, filed on Jul. 7, 1999, and provisional application No. 60/176,413, filed on Jan. 14, 2000.

(51) Int. Cl.[7] .............................................. B01D 35/30
(52) U.S. Cl. ........................... 55/467; 55/472; 55/484; 55/486; 55/503; 248/604
(58) Field of Search .......................... 55/467, 471, 472, 55/482, 484, 486, 503; 248/675, 604; 310/91

(56) References Cited

U.S. PATENT DOCUMENTS

| | | |
|---|---|---|
| 1,462,196 A | 7/1923 | Dros |
| 1,521,575 A | 12/1924 | Wittemeier |
| 2,199,632 A | 5/1940 | Keyes |
| 2,214,750 A | 9/1940 | Myers |
| 2,232,065 A | 2/1941 | Hasselwander |
| 2,270,395 A | 1/1942 | Tjernlund |
| 2,808,124 A | 10/1957 | Attwood |
| 2,881,854 A | 4/1959 | Uehre, Jr. |
| 3,286,445 A | 11/1966 | Welch |
| 3,486,311 A | 12/1969 | Allan, Jr. |
| 3,523,858 A | 8/1970 | Schudel |
| 3,577,710 A | 5/1971 | Feldman |
| 3,830,595 A | 8/1974 | Carpenter et al. |
| 3,857,688 A | 12/1974 | Wisnewski |
| 3,928,008 A | 12/1975 | Petersen |
| 4,251,237 A | 2/1981 | Smith |
| 4,378,983 A | 4/1983 | Martin |
| 4,425,145 A | 1/1984 | Reese |
| 4,436,538 A | 3/1984 | Tomita et al. |
| 4,450,682 A | 5/1984 | Sato et al. |
| 4,487,606 A | 12/1984 | Leviton et al. |
| 4,521,234 A | 6/1985 | Peebles, Jr. et al. |
| 4,552,574 A | 11/1985 | Hotta |
| 4,604,110 A | 8/1986 | Frazier |

(List continued on next page.)

Primary Examiner—Robert A. Hopkins
(74) Attorney, Agent, or Firm—Hoffman & Baron, LLP

(57) ABSTRACT

The portable air purifying device (10) is provided for removing airborne particles. The device includes a housing (12) including an exterior surface formed with an air inlet (26) and an air outlet (28). The air outlet is formed as a plurality of openings. A scroll (44) is located within the housing and has walls formed with an intake opening (194) and an exhaust port (186). The exterior surface and the walls define a cavity (76). The cavity has a first portion and a second portion. The first portion is in communication between the exhaust port and the air outlet. A fan (14) is positioned within the intake opening for drawing air in through the air inlet to pass through the scroll and the first portion of the cavity to be expelled through the air outlet while the second portion of the cavity is under a positive pressure. A filter assembly (48) is assembled within the housing between the air inlet and the fan. The device can include a second filter assembly.

18 Claims, 50 Drawing Sheets

U.S. PATENT DOCUMENTS

| | | | |
|---|---|---|---|
| 4,629,482 A | 12/1986 | Davis | |
| 4,634,458 A | 1/1987 | Craig | |
| 4,737,173 A | 4/1988 | Kudirka et al. | |
| 4,749,390 A | * 6/1988 | Burnett et al. | 96/57 |
| 4,778,496 A | 10/1988 | Conrad | |
| 4,790,863 A | 12/1988 | Nobiraki et al. | |
| 4,802,900 A | 2/1989 | Ball et al. | |
| 4,858,683 A | 8/1989 | Beehler | |
| 5,047,348 A | 9/1991 | Stinson | |
| 5,078,764 A | 1/1992 | Lutterbach et al. | |
| 5,080,699 A | 1/1992 | Ho et al. | |
| 5,102,435 A | 4/1992 | Rau et al. | |
| 5,131,932 A | 7/1992 | Glucksman | |
| RE34,055 E | 9/1992 | Tassicker | |
| 5,230,723 A | 7/1993 | Travis et al. | |
| 5,259,854 A | 11/1993 | Newman | |
| 5,266,090 A | 11/1993 | Burnett | |
| 5,288,298 A | 2/1994 | Aston | |
| 5,290,330 A | 3/1994 | Tepper et al. | |
| 5,298,045 A | 3/1994 | Whitson et al. | |
| 5,322,536 A | 6/1994 | Straub | |
| 5,512,086 A | 4/1996 | Glucksman | |
| 5,733,350 A | 3/1998 | Muller et al. | |
| 5,762,665 A | 6/1998 | Abrahamian et al. | |
| 5,766,286 A | 6/1998 | Flaherty et al. | |
| 5,769,915 A | 6/1998 | Dehn et al. | |
| 5,833,727 A | 11/1998 | Skarsten | |
| 5,893,939 A | 4/1999 | Rakocy et al. | |
| 5,935,282 A | 8/1999 | Lin | |
| 5,980,600 A | 11/1999 | Stopyra et al. | |
| 6,004,367 A | 12/1999 | Stopyra et al. | |
| 6,478,838 B2 | * 11/2002 | McSweeney et al. | 55/467 |

* cited by examiner

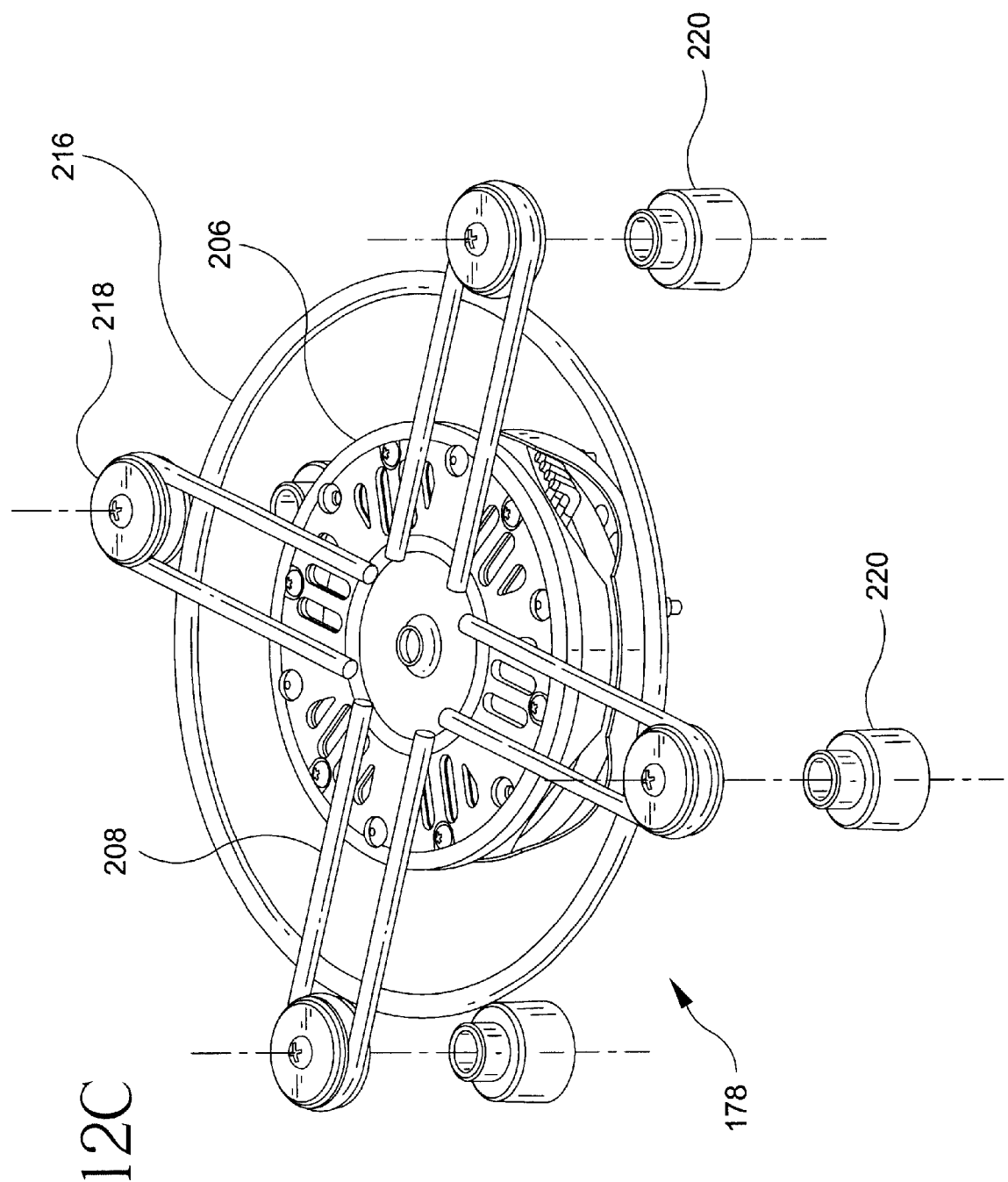

AIR PURIFIER

This application is a continuation-in-part application of U.S. patent application Ser. No. 09/611,513 filed on Jul. 7, 2000 now U.S. Pat. No. 6,425,932 which claims priority to U.S. Provisional Applications Nos. 60/142,599 filed on Jul. 7, 1999 and 60/176,413 filed on Jan. 14, 2000, and claims priority to U.S. Provisional Applications 60/176,413 filed on Jan. 14, 2000 and 60/176,253, filed on Jan. 15, 2000, all of which are incorporated herein by reference.

BACKGROUND OF THE INVENTION

1. Field of the Invention

The field of the invention relates to air purifiers, particularly to portable air purifiers including HEPA filters.

2. Brief Description of the Prior Art

Portable air purifiers for removing airborne particles are used in many homes and offices. Such purifiers often include a fine particle high efficiency particulate air (HEPA) filter. In addition to a HEPA filter, some purifiers include a carbon filter to remove odors. The carbon may be incorporated within a fibrous matrix. A filter for trapping relatively large particles may also be found in portable air purifiers. In operation, one or more fans cause air to be drawn through the filter(s) and emitted through an outlet.

HEPA filters have gained increasing acceptance for use in purifiers directed to consumers as they remove 99.97% of particles having a size equal to or greater than 0.3 microns. In order to take full advantage of a HEPA filter or any other type of filter used in an air purifier, it is important to ensure that substantially all of the air emitted by the air purifier has indeed first passed through the filter(s) provided in the purifier. Where a filter includes both a HEPA component and filter component, the lifespan of the filter is generally dependent upon the carbon component. This is because the trapping capacity of the carbon component is generally exhausted prior to that of the HEPA component.

As the filter(s) employed in air purifiers require replacement when spent, the ability to easily remove and replace the filter(s) is important. A replaced filter must be properly installed if it is to function properly. Disposable filter assemblies have accordingly been designed to facilitate user convenience.

Currently portable air purifiers are manufactured in various sizes with different capacities to suit a consumer's particular needs. The larger capacity air purifiers generally require larger sized filters. This generally requires retailers to stock a plurality of different size filter elements to satisfy the demands of all consumers. Replacement HEPA filter elements are traditionally bulky and expensive inventory for retailers to maintain. The retailer must stock the replacement filters for every air purifier that is sold, but the filters generally do not need replacement very frequently. The retailers that carry air purifiers are required out of necessity to offer a line of different size units that are expensive to purchase, do not turn over very often, and take up a lot of shelf space. In addition, to exacerbate the problem it has been found that by the time the consumer needs to replace the filter element, the inventory is old and looks beat up.

A general problem associated with air purifiers is that the devices create noise which can be disturbing to the user. Most of the noise attributed to the air purifier is attributed to the airflow through the unit. Generally the noise levels generated by the unit will increase with the volume of airflow passing through the unit. In addition, the overall size of the unit is important too because it is also known that if portable purifiers could be made larger (while remaining portable) the unit would be quieter. Accordingly when assessing the performance characteristics of an air purifier the volume or Clean Air Delivery Rate ("CADR"), size and noise generated must all be considered.

A number of patents have issued which disclose air purifiers including HEPA filters, carbon filters, and/or other filters. U.S. Pat. Nos. 3,928,008; 4,378,983; 4,521,234; 4,629,482; 4,737,173; 4,778,496; 5,078,764; 5,102,435; 5,131,932; 5,230,723; 5,259,854; 5,290,330; 5,512,086; and 5,893,939 disclose air purifiers of various constructions. The disclosure of the U.S. Pat. No. 5,893,939 is incorporated herein by reference.

SUMMARY OF THE INVENTION

A portable air purifying device is provided for removing airborne particles. The device includes a housing including an exterior surface formed with an air inlet and an air outlet. The air outlet is formed as a plurality of openings. A scroll is located within the housing and has walls formed with an intake opening and an exhaust port. The exterior surface and the walls define a cavity. The cavity has a first portion and a second portion. The first portion is in communication between the exhaust port and the air outlet. A fan is positioned within the intake opening for drawing air in through the air inlet to pass through the scroll and the first portion of the cavity to be expelled through the air outlet while the second portion of the cavity is under a positive pressure. A filter assembly is positioned within the housing between the air inlet and the fan.

In a first preferred embodiment, the plurality of openings of the air outlet are formed as a grill. The scroll preferably includes an exhaust duct portion having a first end and a second end with the walls defining a cross section of the exhaust duct portion. The first end is in fluid communication with the intake opening and the second end terminates at the exhaust port. Preferably the cross section increases between the first end and the second end. Preferably the walls of the scroll are configured to form a reducer at the intake opening having a cross section. The fan preferably includes a motor mount assembly connected to one of the housing or the scroll, and a fan blade coupled to the motor mount assembly and positioned within the scroll adjacent to the reducer. Preferably the cross section of the reducer is circular and decreases from the intake opening towards the fan blade. The motor mount assembly preferably includes a motor) a motor mount ring, and a plurality of brackets. The motor preferably has a shaft for coupling to the fan blade. The motor mount ring is preferably attached to the motor and has a center. Each of the brackets preferably has a pronged end attached to the motor mount ring and extending radially from the center, and a curved end for connecting to one of the housing or the scroll. Preferably a wire ring is connected to at least two of the plurality of brackets adjacent to the curved end. Preferably a grommet is located at the curved end of each bracket.

In an alternative embodiment, a portable air purifying device includes a housing, a fan, and at least two filter assemblies. The housing includes an air inlet and an air outlet. The fan is positioned within the housing for drawing air into the housing through the air inlet and expelling air through the air outlet. The modular filter assemblies are positioned within the housing in parallel between the air inlet and the fan. Each of the filter assemblies include a frame and a filter element mounted to the frame. Preferably the housing includes a door configured to engage the filter assemblies. Preferably each of the filter assemblies has a second filter element in series with the filter element. Most preferably the filter element is a HEPA filter and the second filter element is a removably attached carbon filter.

A family of portable air purifying devices is also presented in accordance with the present invention. The family includes a plurality of portable air purifying devices. Each of the plurality of portable air purifying devices include a housing, a fan, and a number of modular filter assemblies. The housing includes an air inlet and an air outlet. The fan is positioned within the housing for drawing air into the housing through the air inlet and expelling air through the air outlet. The number of modular filter assemblies are positioned within the housing in parallel between the air inlet and the fan. The filter assemblies have a frame and a filter element mounted to the frame. The number for at least one of the plurality of portable air purifying devices is different from the number for another of the plurality of portable air purifying devices.

BRIEF DESCRIPTION OF THE DRAWINGS

FIG. 12C is a partially exploded perspective view of the motor mount assembly shown in FIG. 12B illustrating the relationship of the boss caps to the assembly;

DETAILED DESCRIPTION OF THE PREFERRED EMBODIMENTS

Figure 1:
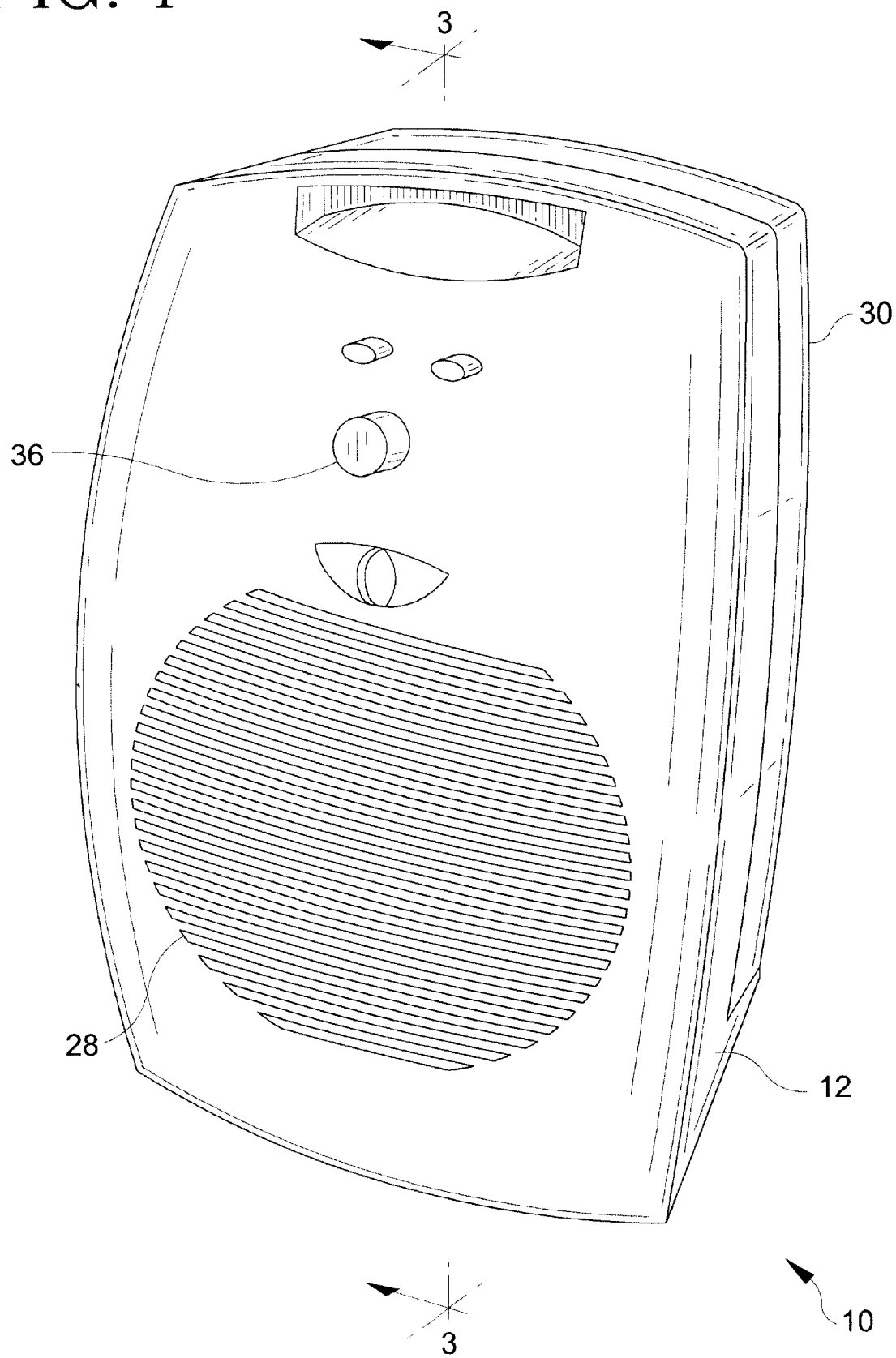
FIG. 1 is a front perspective view of a preferred embodiment of the present invention.
Figure 2:
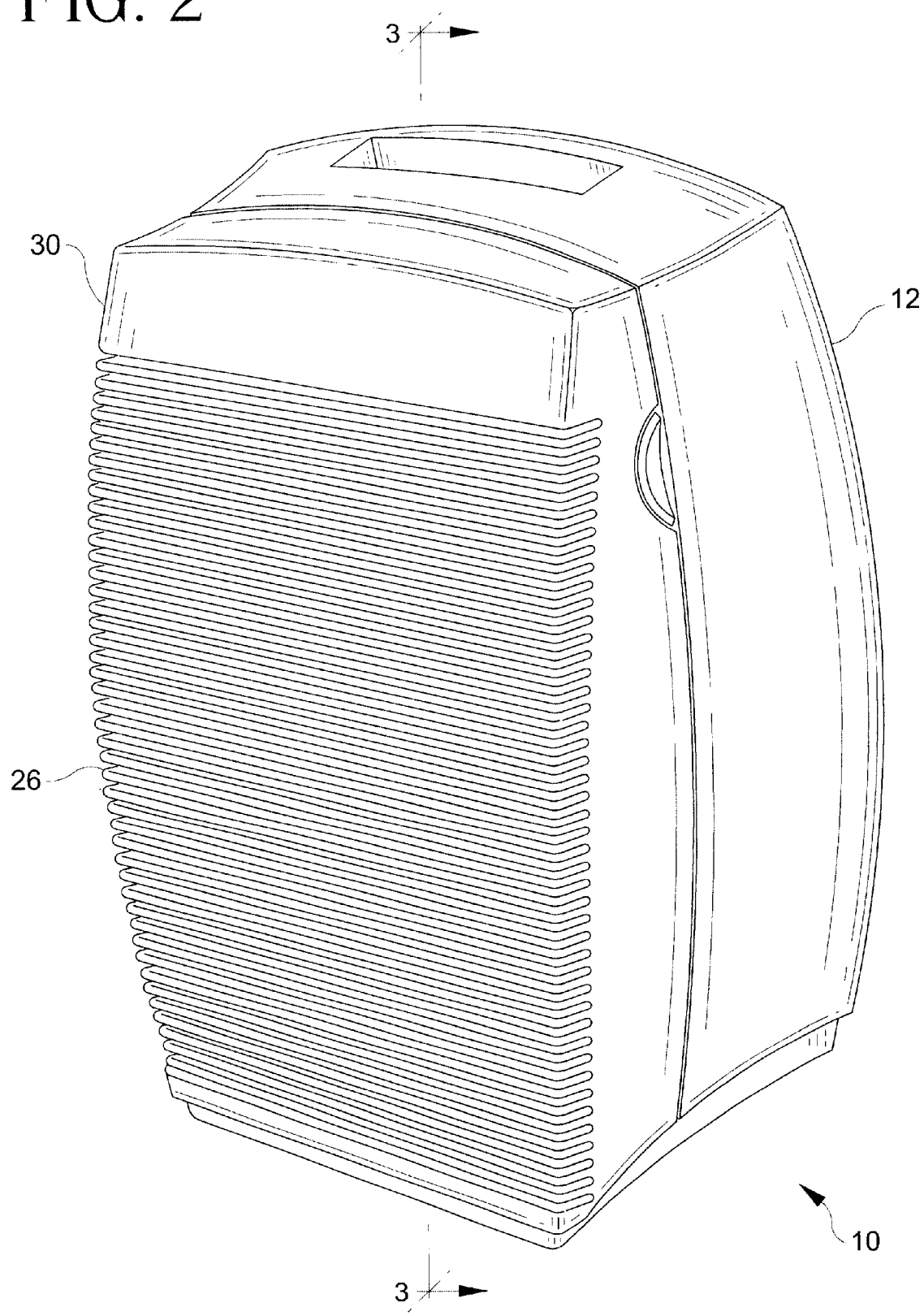
FIG. 2 is a rear perspective view of the preferred embodiment of the present invention shown in FIG. 1.
Figure 3:
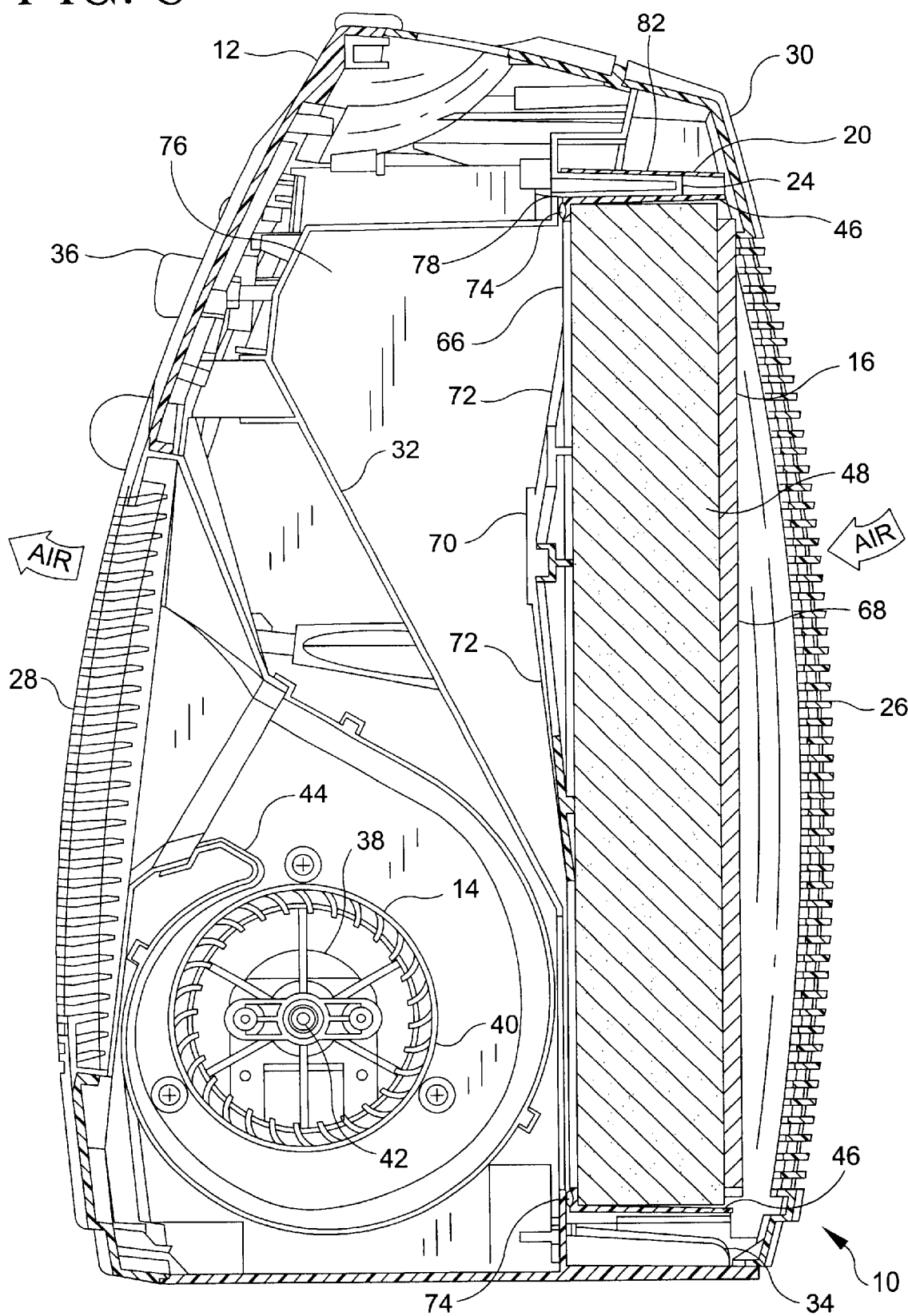
FIG. 3 is a cross-sectional view taken along line 3—3 as shown in FIGS. 1 and 2 of the preferred embodiment of the present invention shown therein.
Figure 4:
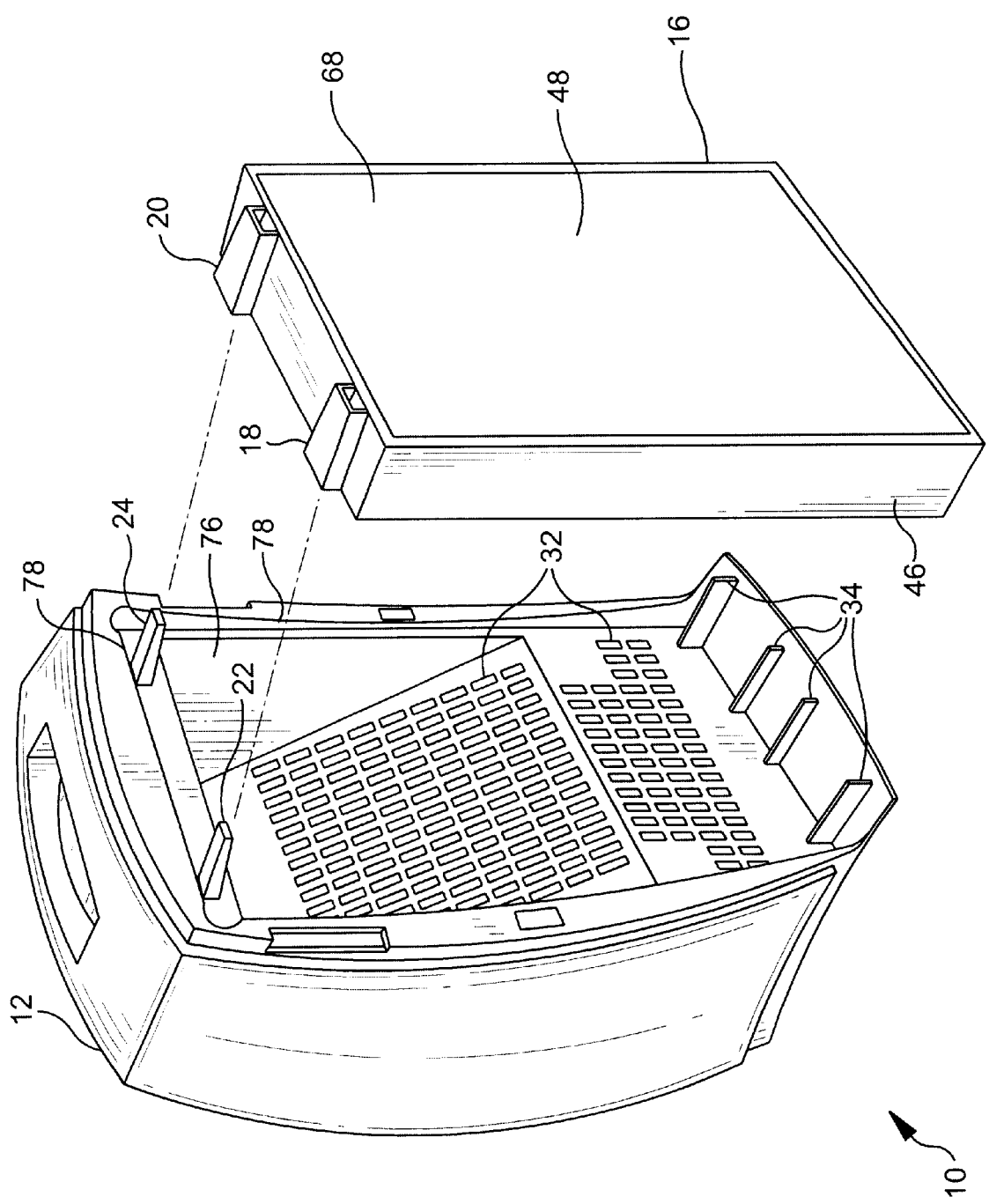
FIG. 4 is a partially exploded rear view of the preferred embodiment of the present invention shown in FIG. 1 with the filter assembly cover removed.

Initially referring to FIGS. 1 through 4, an air purifying device 10 in accordance with the present invention is depicted. The device includes a housing 12, a fan 14, a filter assembly 16, first and second hangers 18, 20, and first and second elongate hanger 22, 24 supports as shown in FIG. 4.

Referring now to FIG. 3, the housing 12 includes an air inlet 26 and an air outlet 28. Preferably both the air inlet 26 and an air outlet 28 are configured as a grill with a plurality of slot-like openings or the like formed in the exterior walls of the housing 12. The housing 12 preferably includes a filter assembly cover 30 that is removable and has the air inlet 26 formed therein as shown in FIG. 2. As shown in FIGS. 3 and 4, the housing 12 preferably includes an inner grate 32 having a plurality of slot-like openings positioned between the filter assembly 16 and the fan 14. The particular shapes of the openings is not deemed critical so long as they permit satisfactory throughput of air. The lower portion of the housing 12 below the filter assembly 16 preferably includes a plurality of stiffening ribs 34 to strengthen the housing 12 between the air inlet 26 and the inner grate 32. The housing 12 is preferably configured to accommodate a control knob 36 for adjusting the fan speed to control the flow of air. The housing 12 is preferably made from a light weight durable material such as a rigid plastic.

The fan 14 includes an electric motor 38, which is preferably operable on alternating current, and a fan blade 40 that is coupled to the electric motor 38 by a drive shaft 42. The fan 14 is positioned within the housing 12 so that air is drawn through the air inlet 26 and is expelled through the air outlet 28 as shown in FIG. 3. Preferably the fan 14 is a forward curved centrifugal blower which draws air in axially to the center of the fan blade 40 and then expels the air out radially into a scroll 44. The scroll 44 is preferably attached to the air outlet 28 of the housing 12 to accommodate the resulting airflow.

Figure 5:
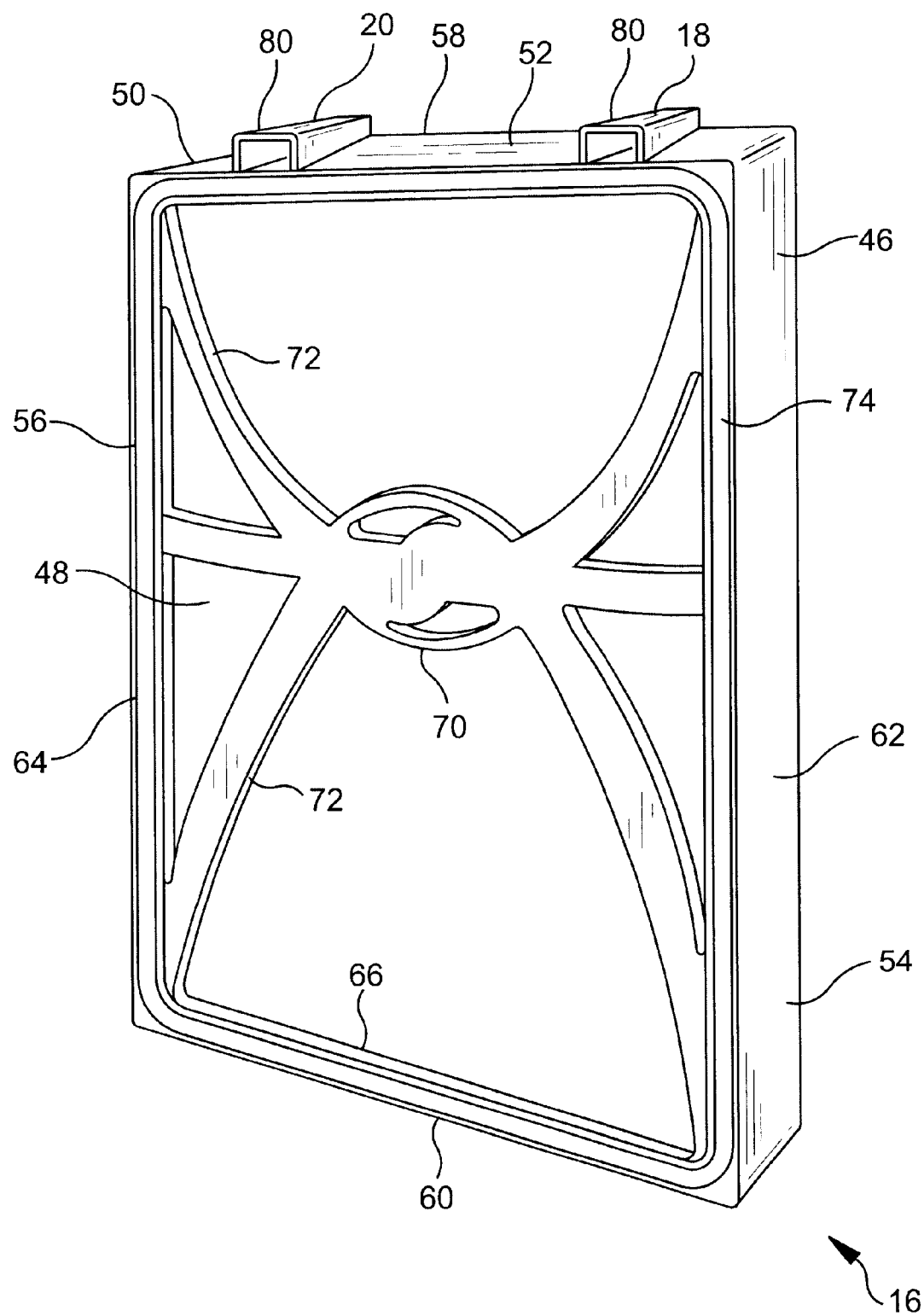
FIG. 5 is a rear perspective view of the filter assembly of the preferred embodiment of the present invention shown in FIG. 1.

Referring again to FIG. 3, the filter assembly 16 is positioned within the housing 12 between the air inlet 26 and the fan 14. The filter assembly 16 includes a frame 46 and a filter element 48 mounted to the frame 46 as shown in FIGS. 3 and 5. Preferably the filter element 48 is a high efficiency particulate air (HEPA) filter. The frame 46 has an exterior surface 50 including top 52 and first and second side surfaces 54, 56. The frame 46 preferably includes a top wall 58, a bottom wall 60, and first and second opposing side walls 62, 64 connecting the top and bottom walls 58, 60 with the filter element 48 being positioned within the walls as shown in FIG. 5. The frame 46 is generally rectangular, but could include other shapes and sizes. The frame 46 includes an outlet end 66 and an inlet end 68. Preferably a support 70 is coupled to the outlet end 66 of the frame 46. The support 70 includes a plurality of strap-like elements 72 which extend across the frame 46 to maintain the filter element 48 against the air pressure created by the fan 14 as air is drawn through the filter assembly 16. A seal 74 is preferably mounted to the outlet end 66 of the frame 46. As shown in FIGS. 3 and 4, preferably the housing 12 is formed with a cavity 76 defined by a perimeter 78 that is adapted to bear against the seal 74 when the filter assembly 16 and filter assembly cover 30 are installed. A substantially air-tight seal is formed by the engagement of the frame seal 74 and housing 12. Operation of the blower tends to draw the frame 46 towards the housing 12, thereby enhancing the seal.

Figure 7:
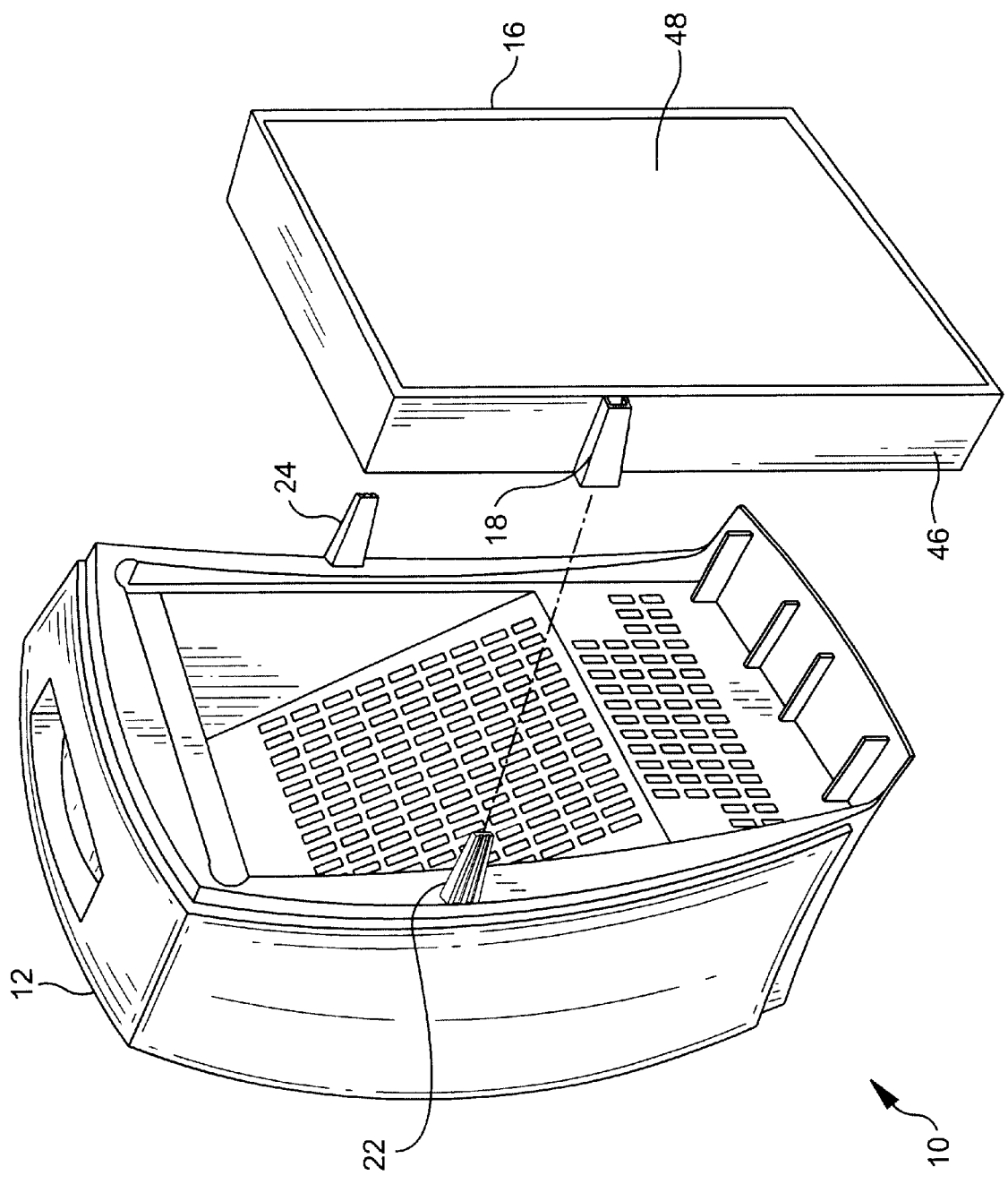
FIG. 7 is a partially exploded rear perspective view of an alternative preferred embodiment of the present invention showing the hanger and elongate hanger supports located at the side of the filter assembly.

Referring now to FIGS. 4 and 5, the first and second hangers 18, 20 are coupled to the frame 46 of the filter assembly 16. Each of the hangers 18, 20 preferably includes a channel 80. Preferably the hangers 18, 20 are coupled to an exterior surface 50 of the frame 46 as shown in FIGS. 5 and 7. In a preferred embodiment of the invention, the hangers 18, 20 are coupled to the top surface 52 of the frame 46 as shown in FIGS. 4 and 5. In an alternative embodiment of the invention, the first and second hangers 18, 20 are respectively coupled to the first and second side surfaces 54, 56 of the frame 46 as shown in FIG. 7 (second hanger not shown). Preferably each hanger 18, 20 includes at least one pair of converging walls 82 bounding the channel 80 as shown in FIG. 3. In an alternative embodiment, each of the hangers 18, 20 preferably includes two pairs of converging walls. The converging walls 82 serve to ensure that the filter assembly is installed correctly. In another embodiment of the invention, the channels 80 are plugged at their end adjacent to the inlet end 68 of the frame 46 to prevent the filter assembly 16 from being installed backwards. Although the cross section of the channels 80 as shown in FIGS. 4 and 5 is generally rectangular, the cross section can also be circular, ovular, triangular or polygonal provided that the first and second elongate hanger supports 22, 24 as described below are configured accordingly. In addition, although it is preferable to practice the present invention using first and second hangers 18, 20, the present invention can be practiced with only one hanger.

Referring now to FIGS. 4 and 7, the first and second elongate hanger supports 22, 24 are mounted to the housing 12. The first and second elongate hanger supports 22, 24 are respectively configured to be removably extended within the first and second hangers 18, 20. While the filter assembly 16 should be easily installed or removed, a relatively snug fit between the hangers 18, 20 and hanger supports 22, 24 is preferred. Such a fit will provide for frictional retention of the filter assembly 16. Detents may optionally be provided on the hangers 18, 20 and/or hanger supports 22, 24 for retention purposes. The hanger supports 22, 24 provide support for the filter assembly 16 so that it can be hung between the air inlet 26 and the fan 14. The hanger supports 22, 24 preferably, but not necessarily, provide the sole means of supporting the filter assembly 16. As noted above with respect to the first and second hangers 18, 20, the present invention can be practiced with only one hanger support.

Figure 6:
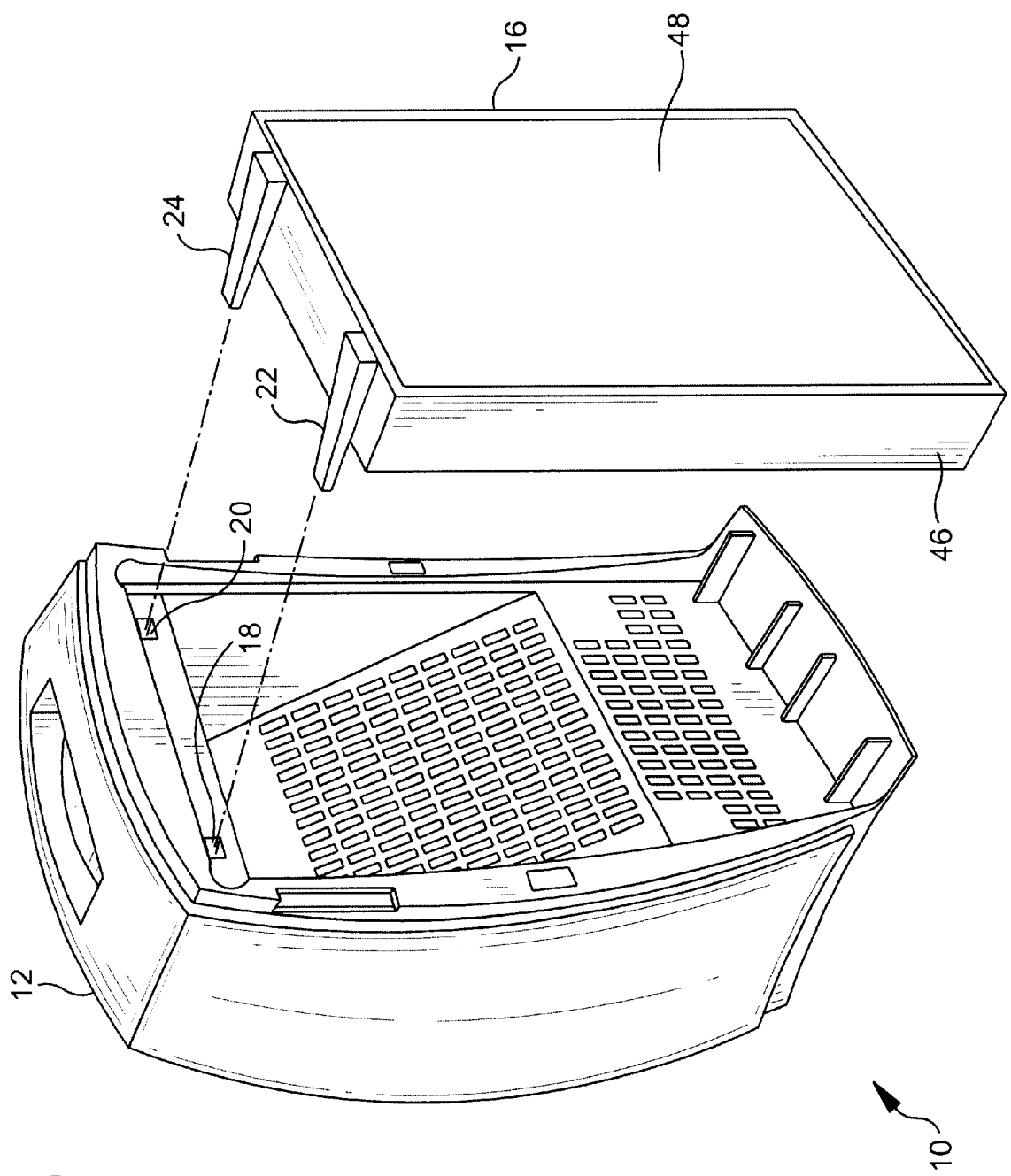
FIG. 6 is a partially exploded rear perspective view of an alternative embodiment of the present invention.

Referring now to FIG. 6, an alternative embodiment of the invention is shown where the first and second hangers 18, 20 are coupled to the housing 12 and the first and second elongate hanger supports 22, 24 are coupled the frame 40 of the filter assembly 16. The alternative embodiment is similar to the embodiment that is shown in FIGS. 4 and 5 as the hanger supports 22, 24 are coupled to the top surface 52 of the frame 46. The alternative embodiment can be similarly configured to that as shown in FIG. 7, where the hanger supports 22, 24 are coupled to the side surfaces 54, 56 of the frame 46 and the hangers 18, 20 are coupled to the housing 12.

In another alternative embodiment of the invention (not shown) that includes first and second hangers 18, 20 and first and second elongate hanger supports 22, 24, one of the hangers is coupled to the frame 46 of the filter assembly 16 while the other is coupled to the housing 12. The hanger supports 22, 24 are similarly coupled to cooperate with the hangers 18, 20 for supporting the filter assembly 16. This configuration is beneficial in that the arrangement 18, 20 of the hangers and hanger supports 22, 24 ensures that the filter assembly 16 is not installed backwards.

In operation, the control knob 36 on the housing 12 is turned by the user to select a desired fan speed. Rotation of the fan blade 40 causes air to be drawn into the air inlet 26 through the filter assembly 16. The filtered air then moves through the inner grate 32 and enters the fan 14. The fan 14 expels the air into the scroll 44 which then exits through the air outlet 28. Since the filter assembly 16 restricts the airflow, considerable suction is created across the outlet end 66 of the filter assembly 16 causing the filter assembly 16 to be drawn towards the perimeter 78 of the cavity 76. This enhances the engagement of the seal 74 and the perimeter 78 of the housing cavity 76 to ensure that unfiltered air does not bypass the filter assembly 16 prior to entering the fan 14.

The filter assembly 16 of the air purifier 10 is easily replaced. The filter assembly cover 30 is first removed and then the spent filter assembly 16 is taken off the elongate hanger supports 22, 24. The new filter assembly 16 is installed by aligning the hangers thereof with the hanger supports and sliding the new filter assembly onto the hanger supports 22, 24. The hangers 18, 20 and hanger supports 22, 24 are advantageous because a user is assured that the correct replacement filter assembly 16 is being used when it is properly mounted to the air purifier 10. The converging walls 82 of the hangers 18, 20 are beneficial to the user in that they prevent the user from installing the filter assembly 16 backwards.

The present invention can also be used in a family of air purifiers 110 that use a modular filter assembly 116. Referring now to FIGS. 10 through 24, a family of air purifiers 110 that use a modular filter assembly 116 in accordance with the present invention are shown. As discussed above with respect to the embodiment shown in FIGS. 1 through 5, the air purifying devices 110 generally include a housing 112, a fan 114, at least one filter assembly 116, at least one set of first and second hangers 118, 120, and at least one set of first and second elongate hanger supports 122, 124. The housings 112 also include air inlets 126 and air outlets 128 as described above.

Figure 11:
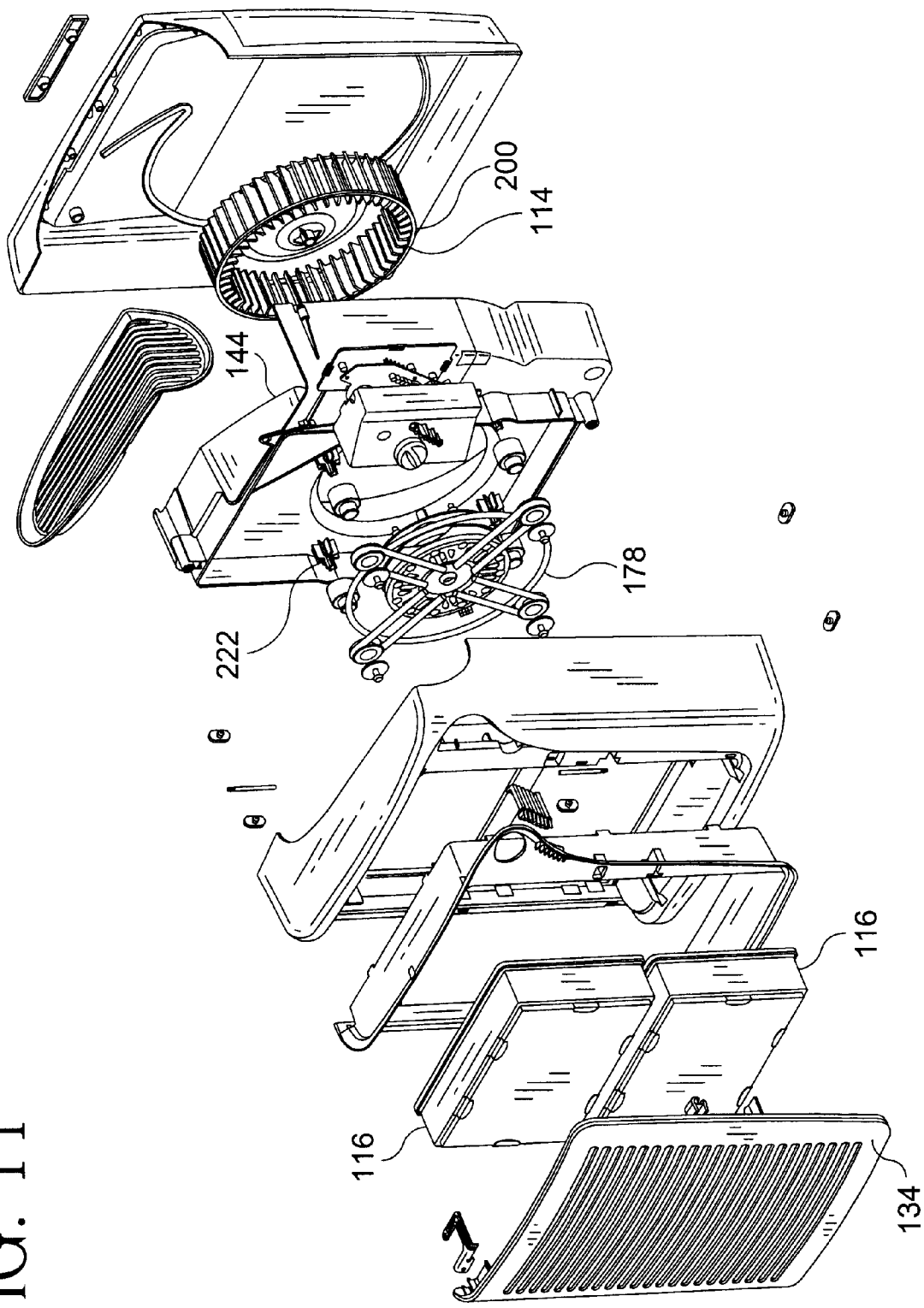
FIG. 11 is an exploded perspective view of the air purifier shown in FIG. 10.
Figure 12:
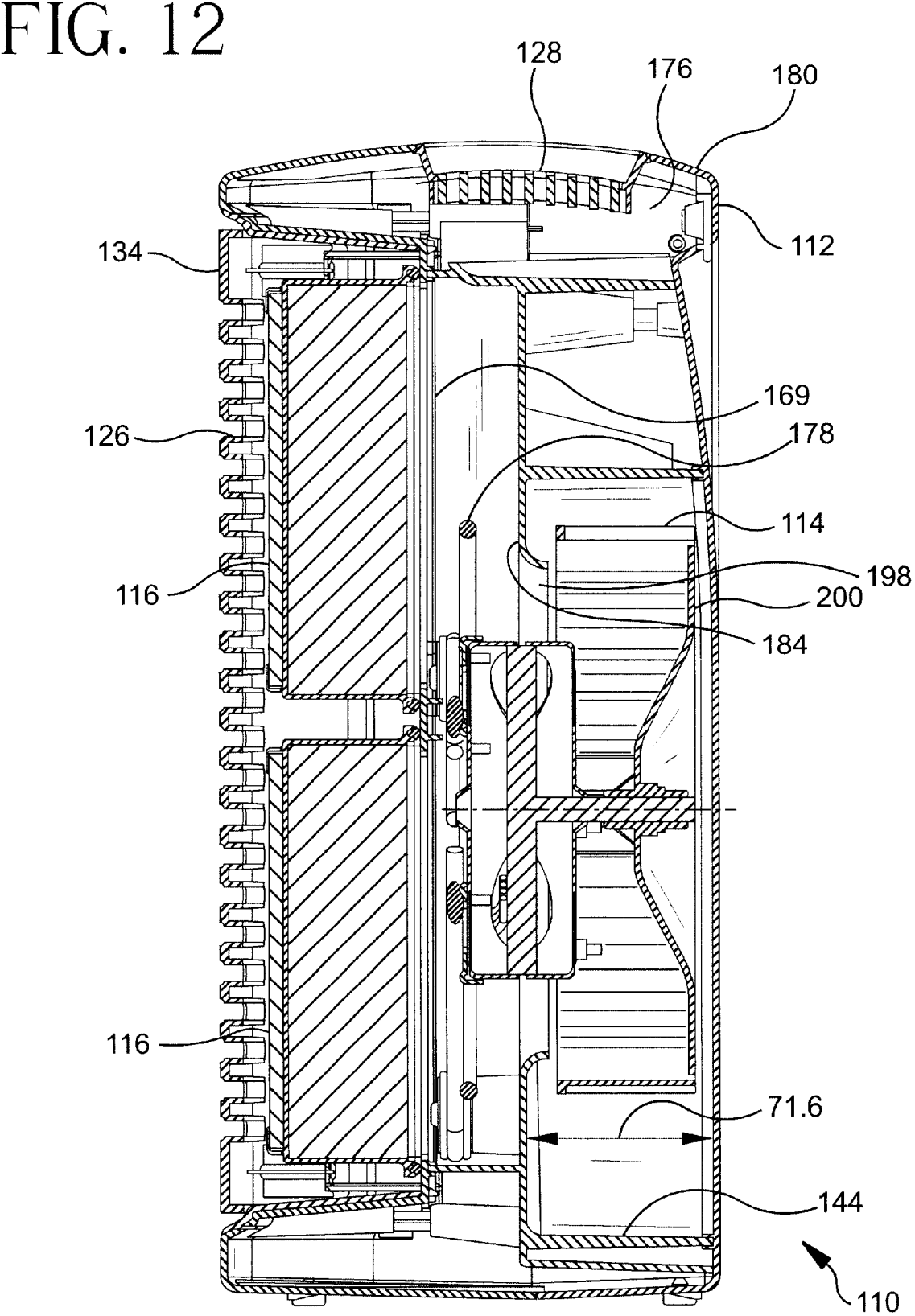
FIG. 12 is a cross-sectional view taken along line 12—12 as shown in FIG. 10.
Figure 12A:
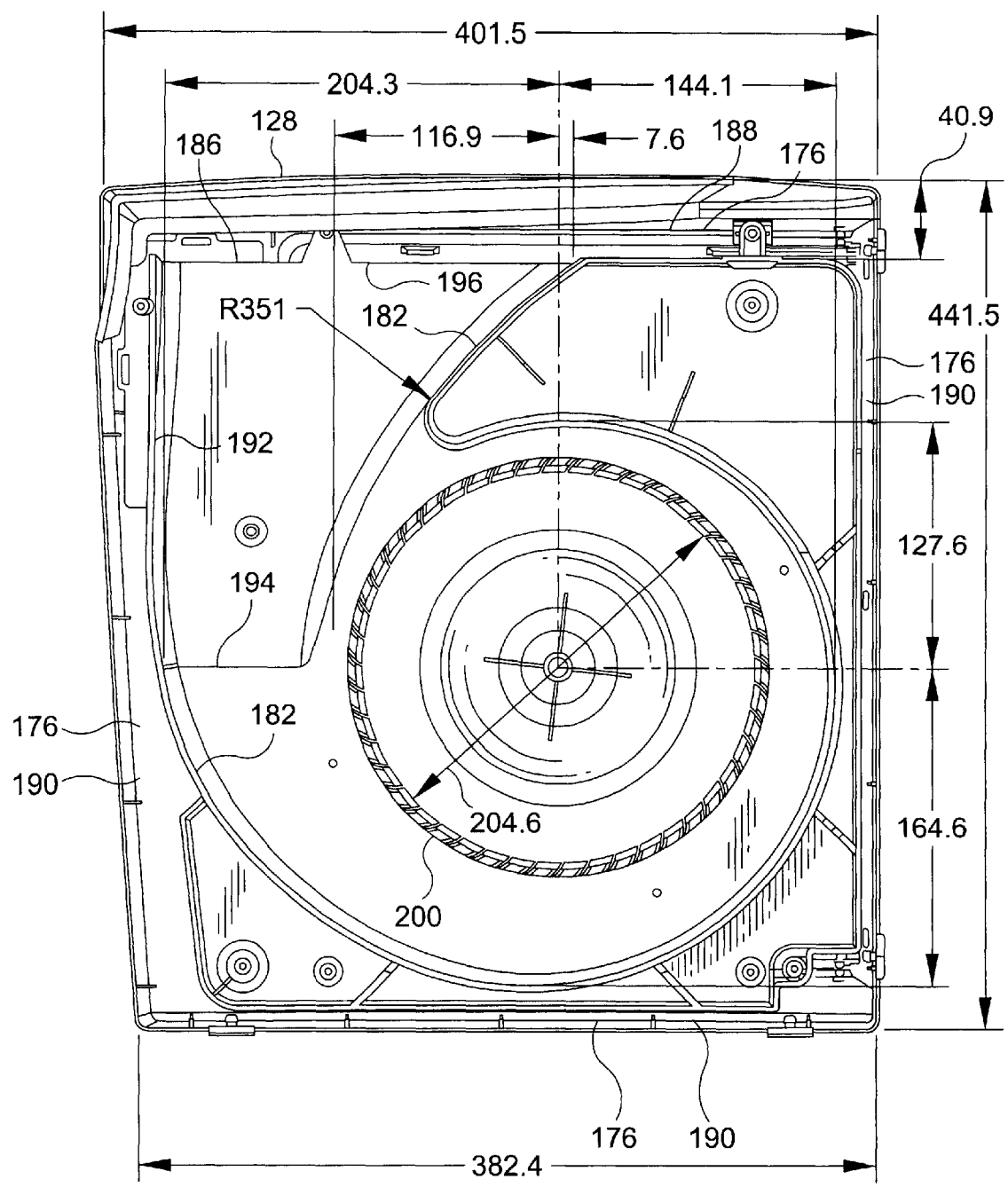
FIG. 12A is an open view of the air purifier shown in FIG. 10 looking at the fan and scroll relationship with the rear panel and top grill removed.
Figure 12B:
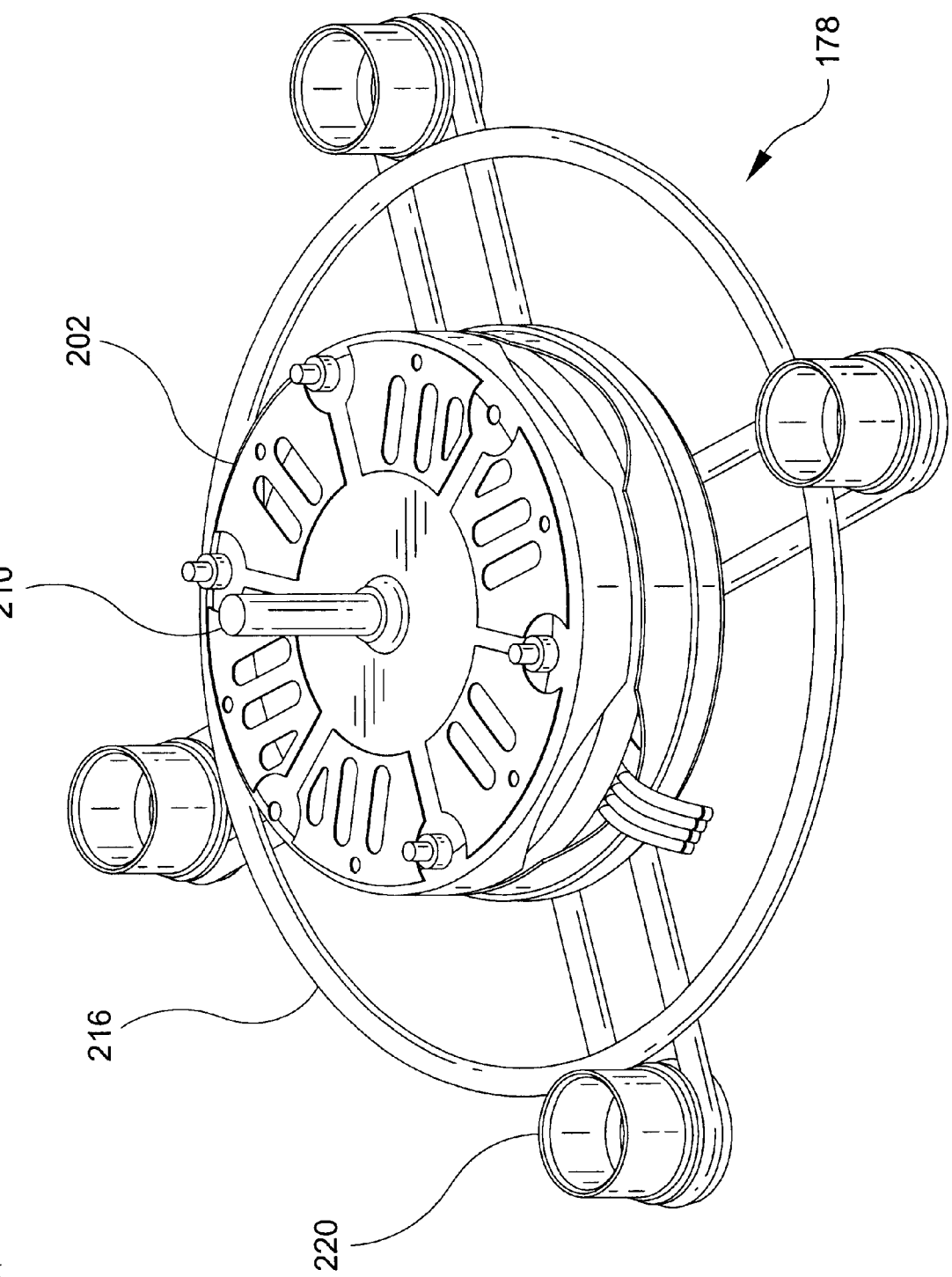
FIG. 12B is a perspective view of the motor mount assembly of the air purifiers shown in both FIGS. 10 and 19.
Figure 12D:
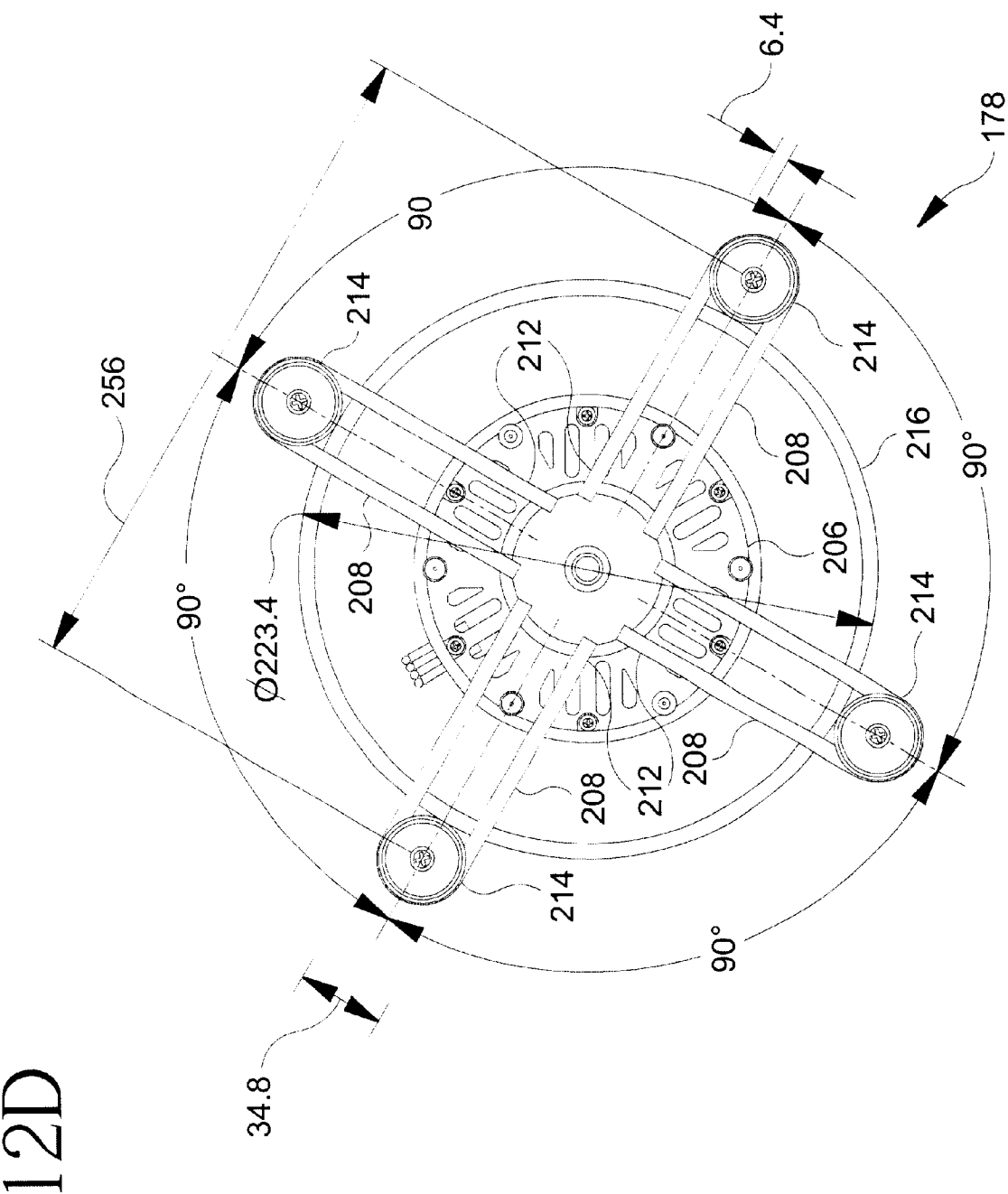
FIG. 12D is a front elevational view of the motor mount assembly shown in FIG. 12B.
Figure 12E:
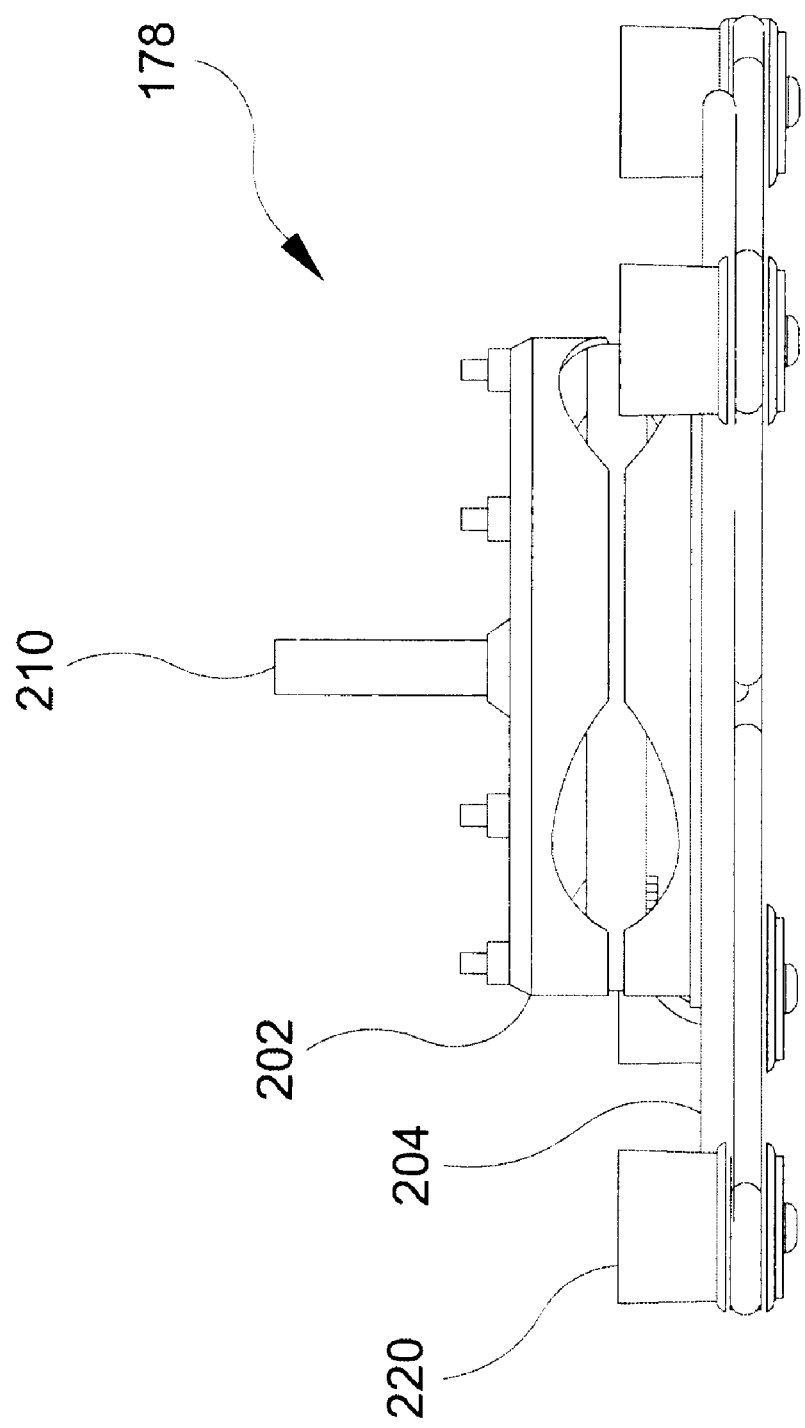
FIG. 12E is a side elevational view of the motor mount assembly shown in FIG. 12B.
Figure 12F:
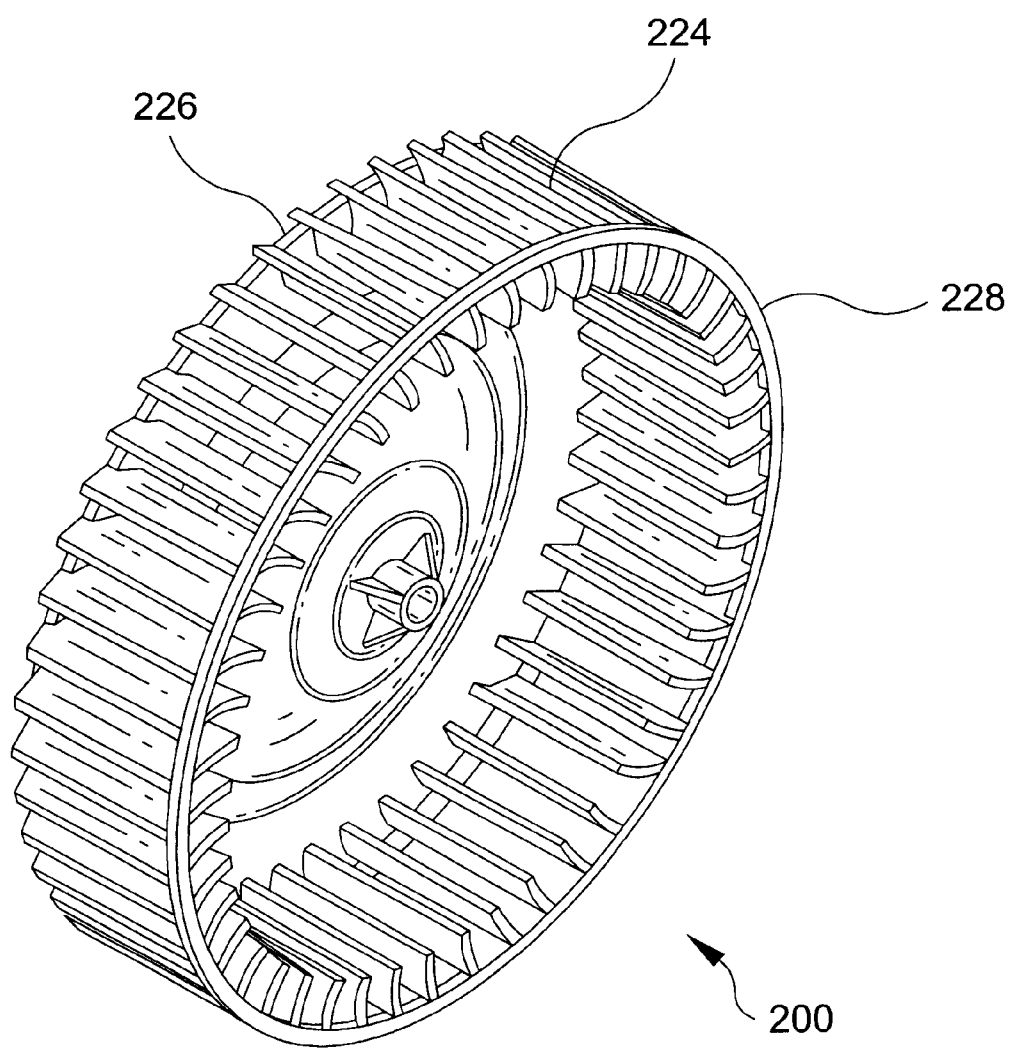
FIG. 12F is a perspective view of the fan blade of the air purifiers shown in both FIGS. 10 and 19.
Figure 13:
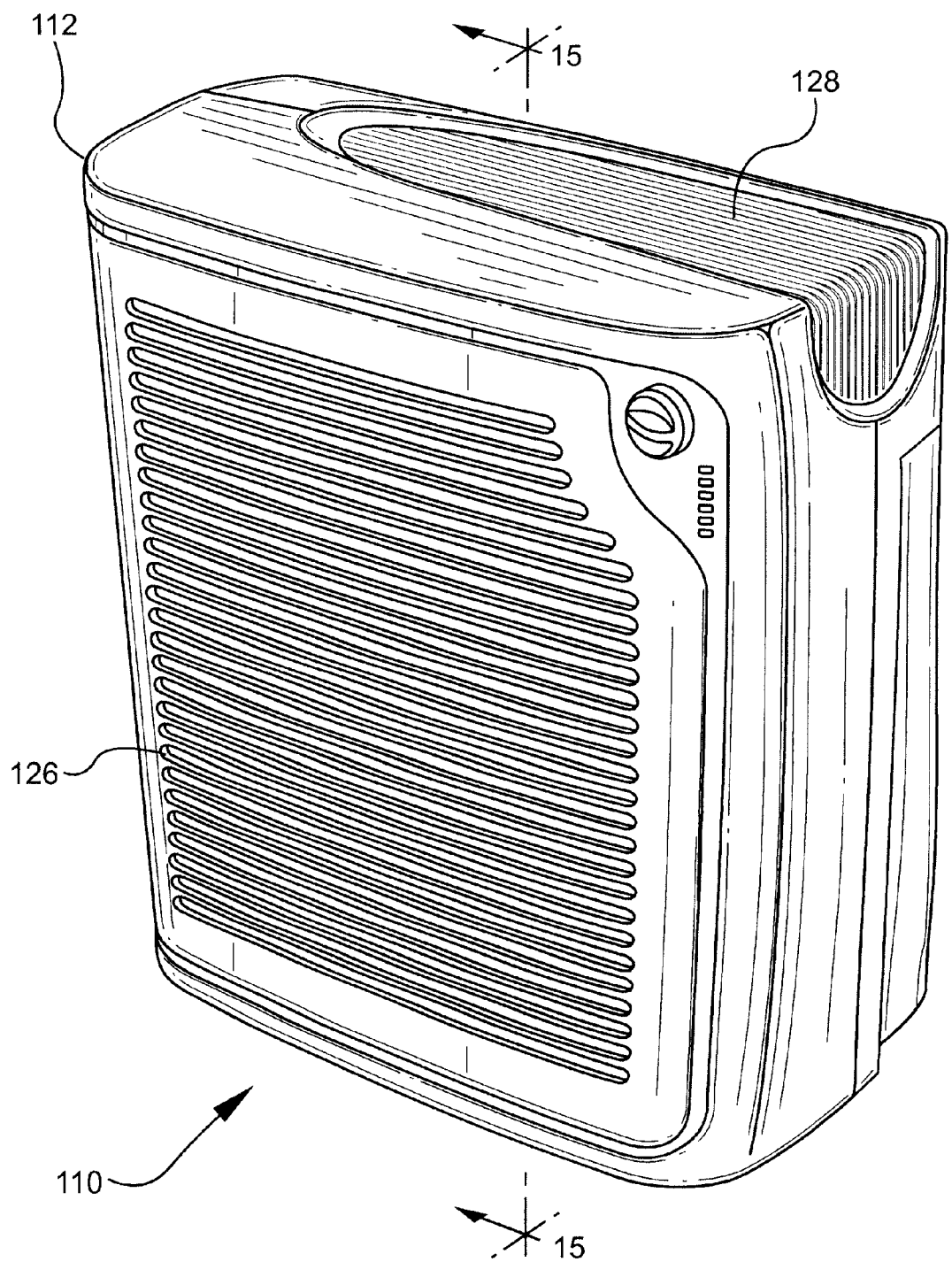
FIG. 13 is a front perspective view of a second member of a family of air purifiers in accordance with the present invention.
Figure 14:
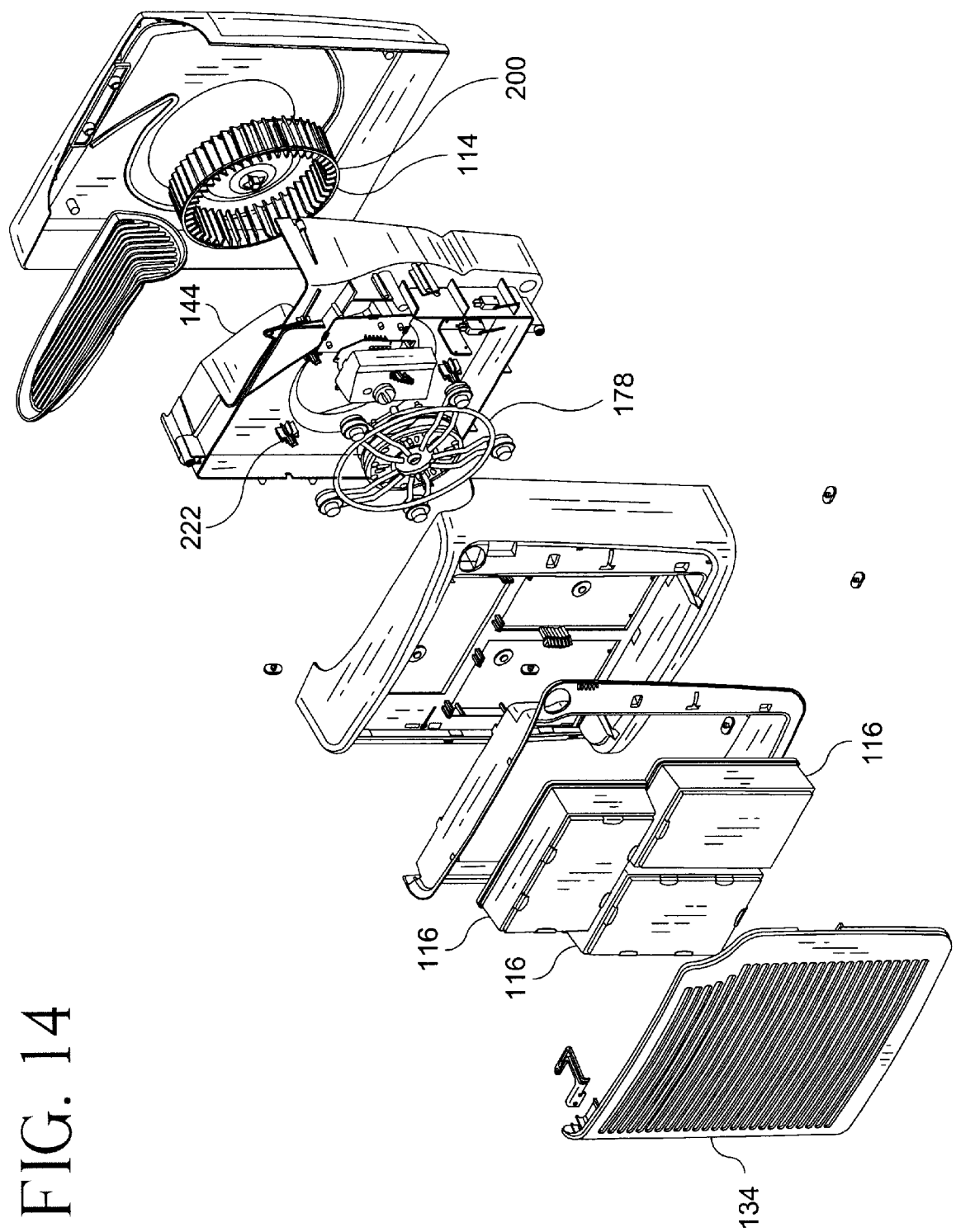
FIG. 14 is an exploded perspective view of the air purifier shown in FIG. 13.
Figure 17:
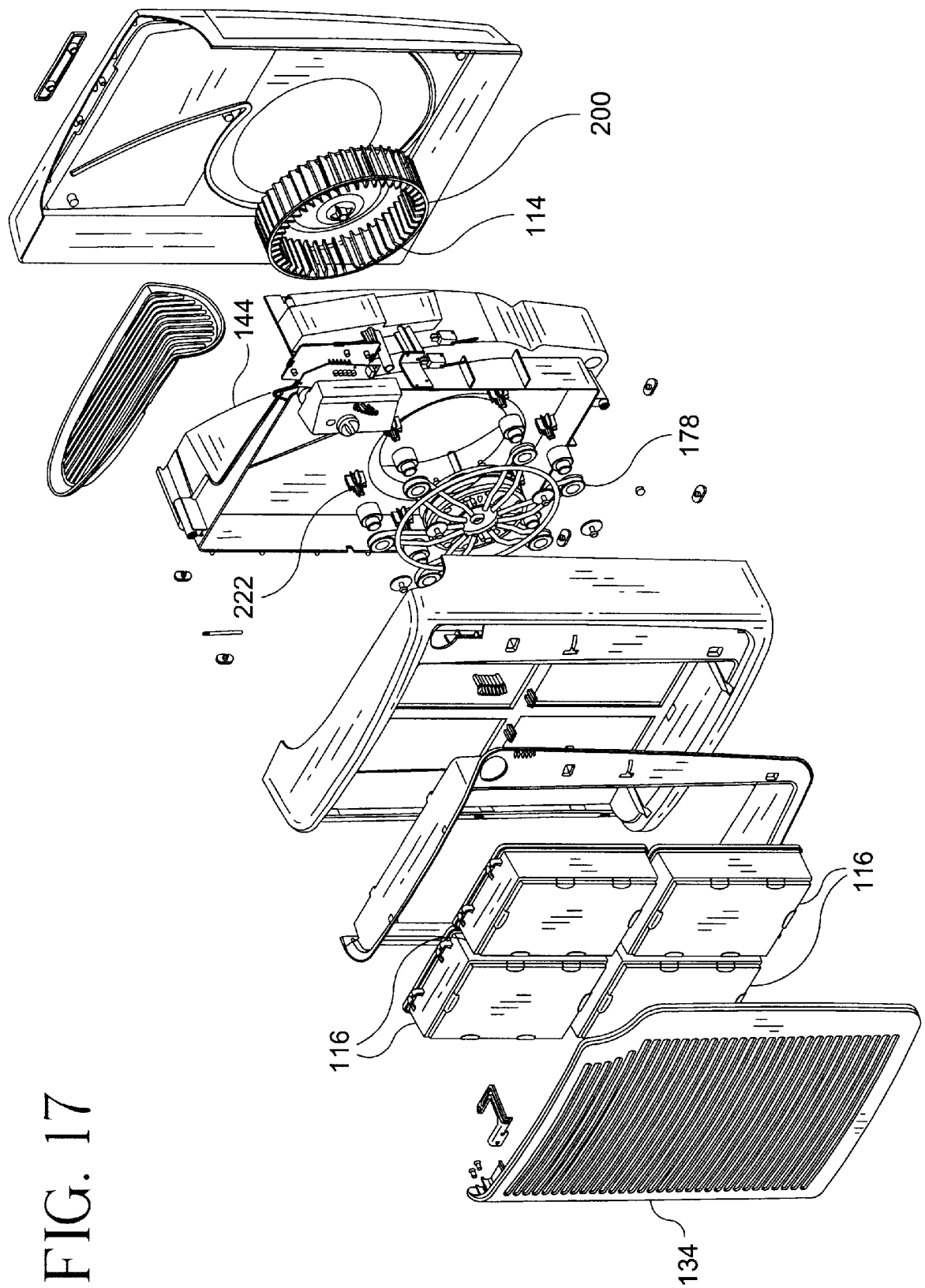
FIG. 17 is an exploded perspective view of the air purifier shown in FIG. 16.
Figure 18:
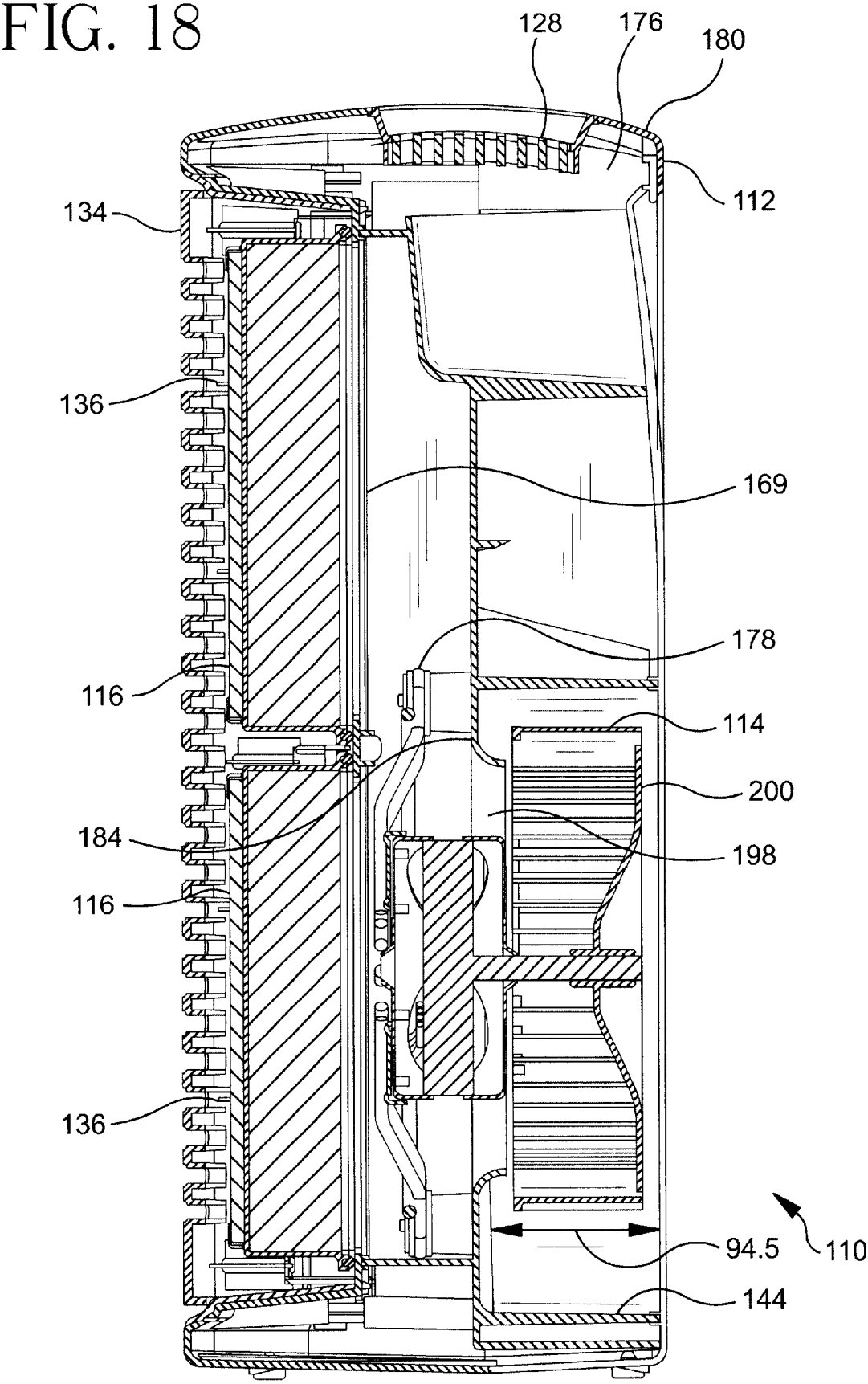
FIG. 18 is a cross-sectional view taken along line 18—18 as shown in FIG. 16.
Figure 18A:
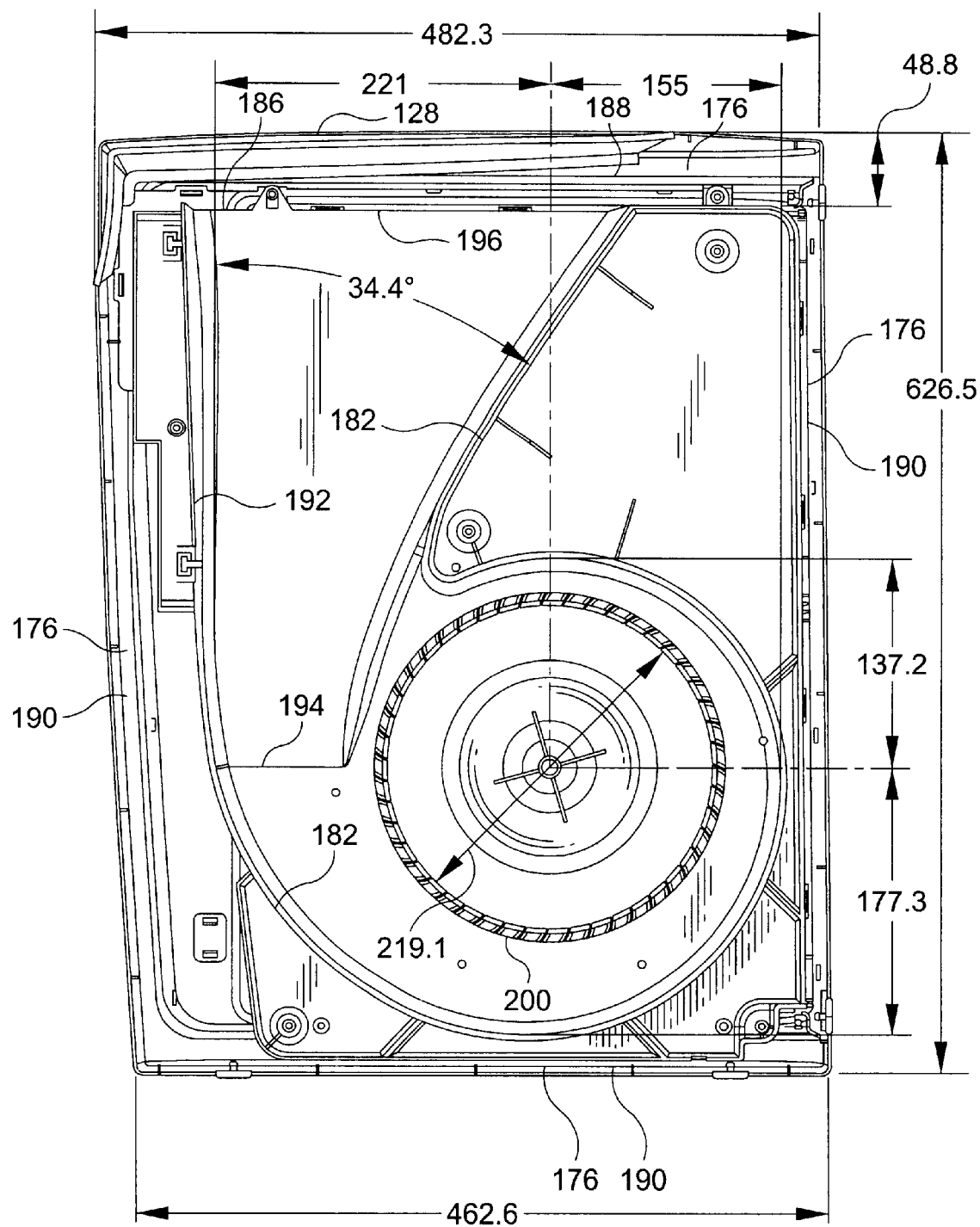
FIG. 18A is an open view of the air purifier shown in FIG. 16 looking at the fan and scroll relationship with the rear panel and top grill removed.
Figure 18B:
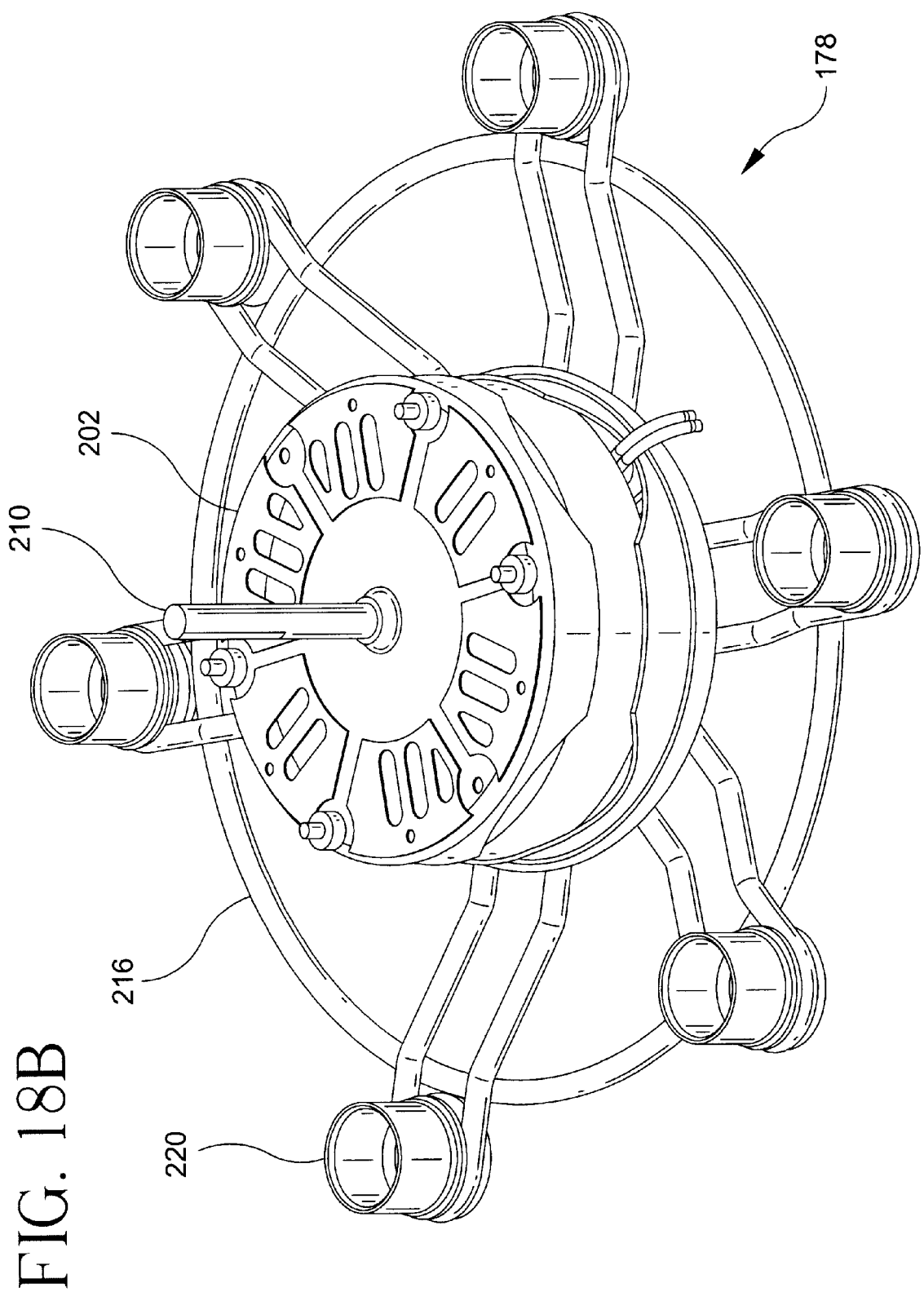
FIG. 18B is a perspective view of the motor mount assembly of the air purifier shown in both FIGS. 16 and 22.
Figure 18C:
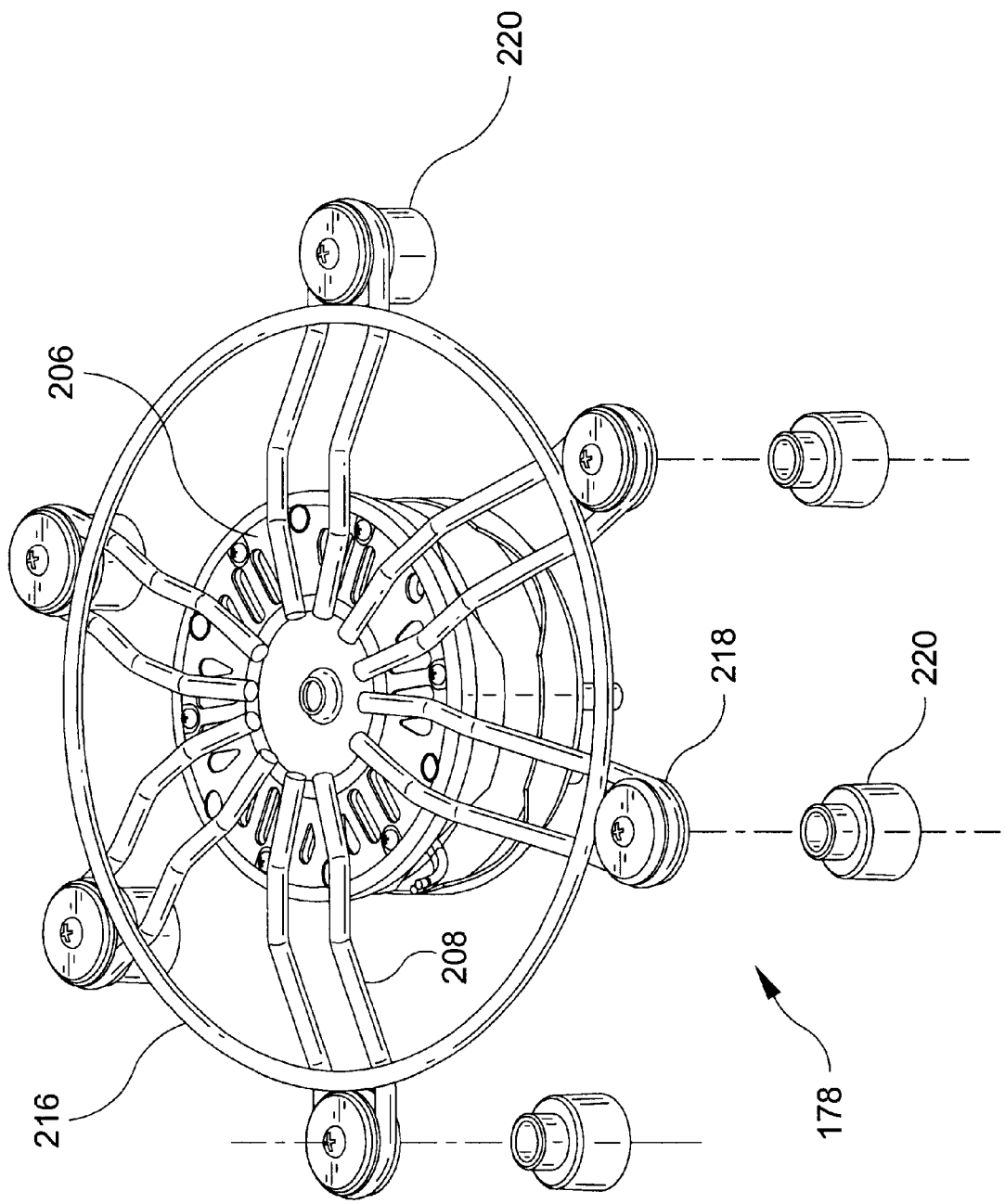
FIG. 18C is a partially exploded perspective view of the motor mount assembly shown in FIG. 18B illustrating the relationship of the boss caps to the assembly.
Figure 18D:
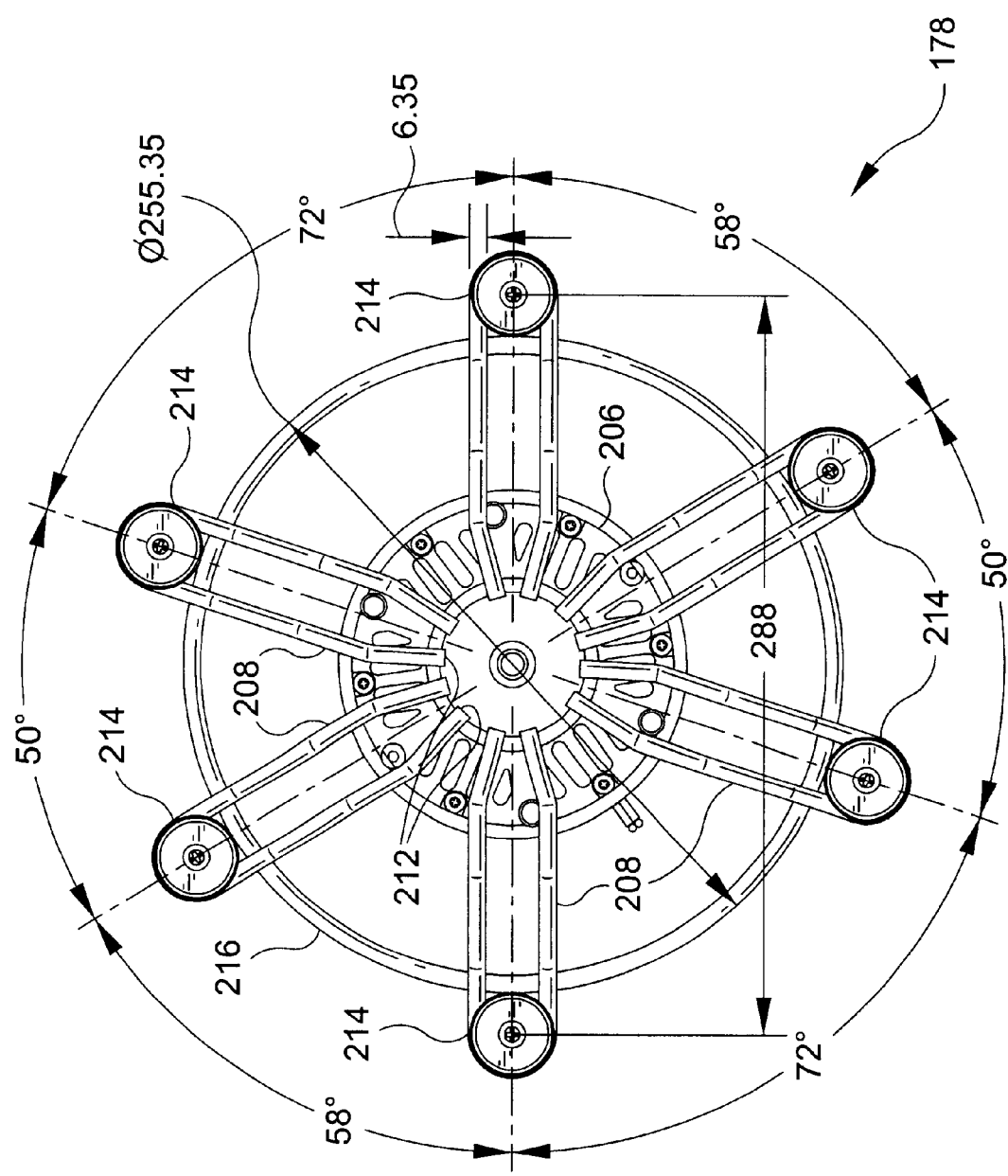
FIG. 18D is a front elevational view of the motor mount assembly shown in FIG. 18B.
Figure 18F:
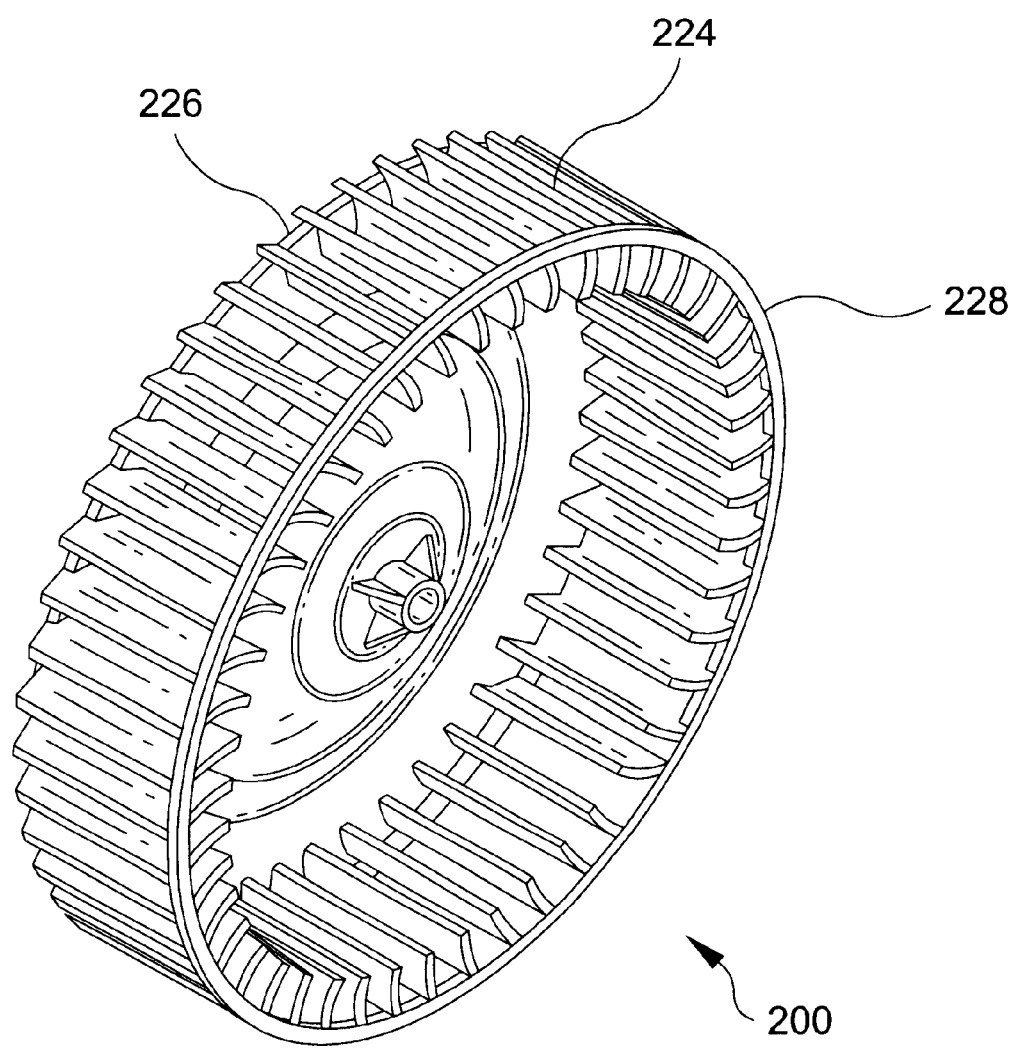
FIG. 18F is a perspective view of the fan blade of the air purifiers shown in both FIGS. 16 and 22.
Figure 19:
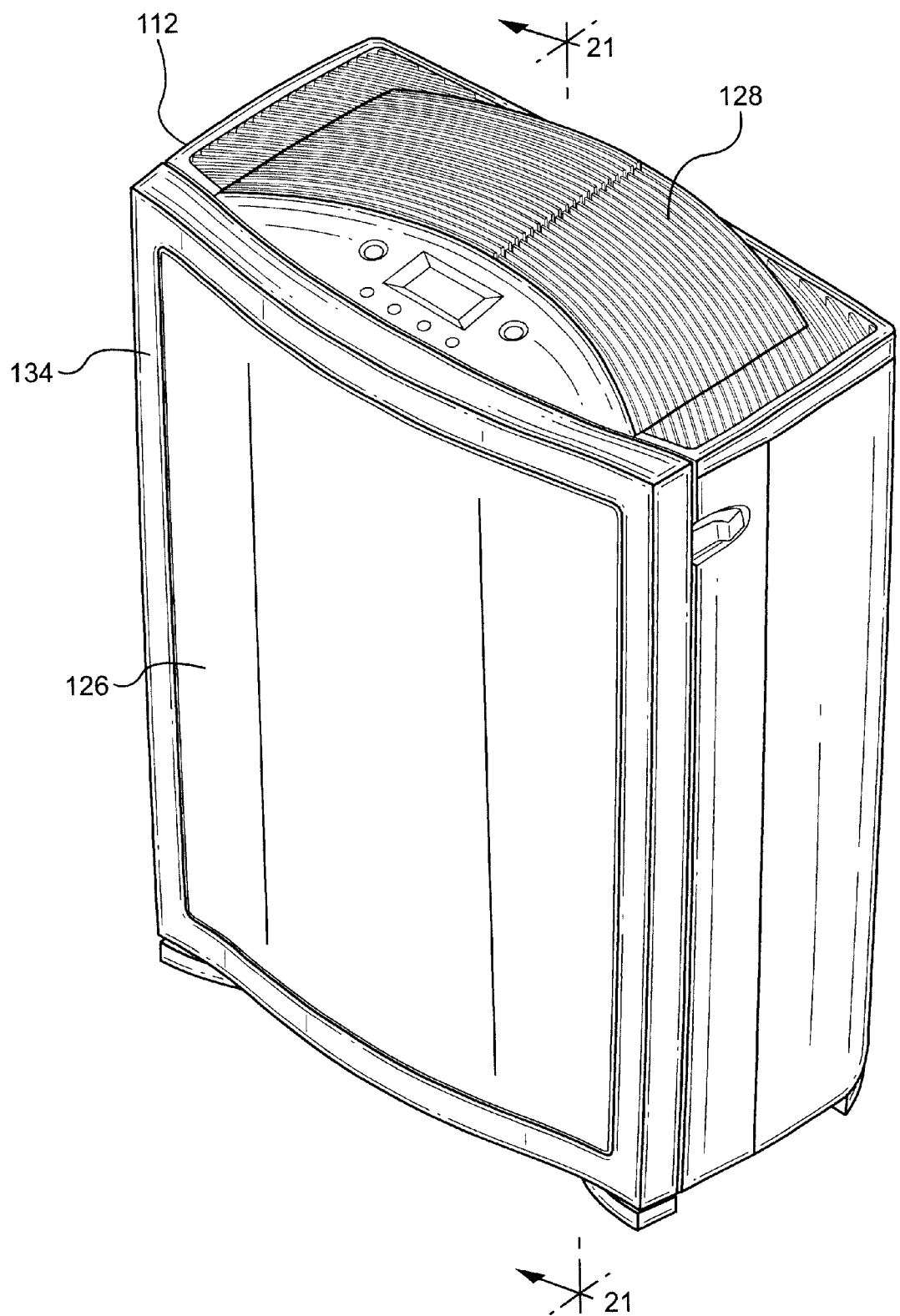
FIG. 19 is a front perspective view of a fourth member of a family of air purifiers in accordance with the present invention.
Figure 20:
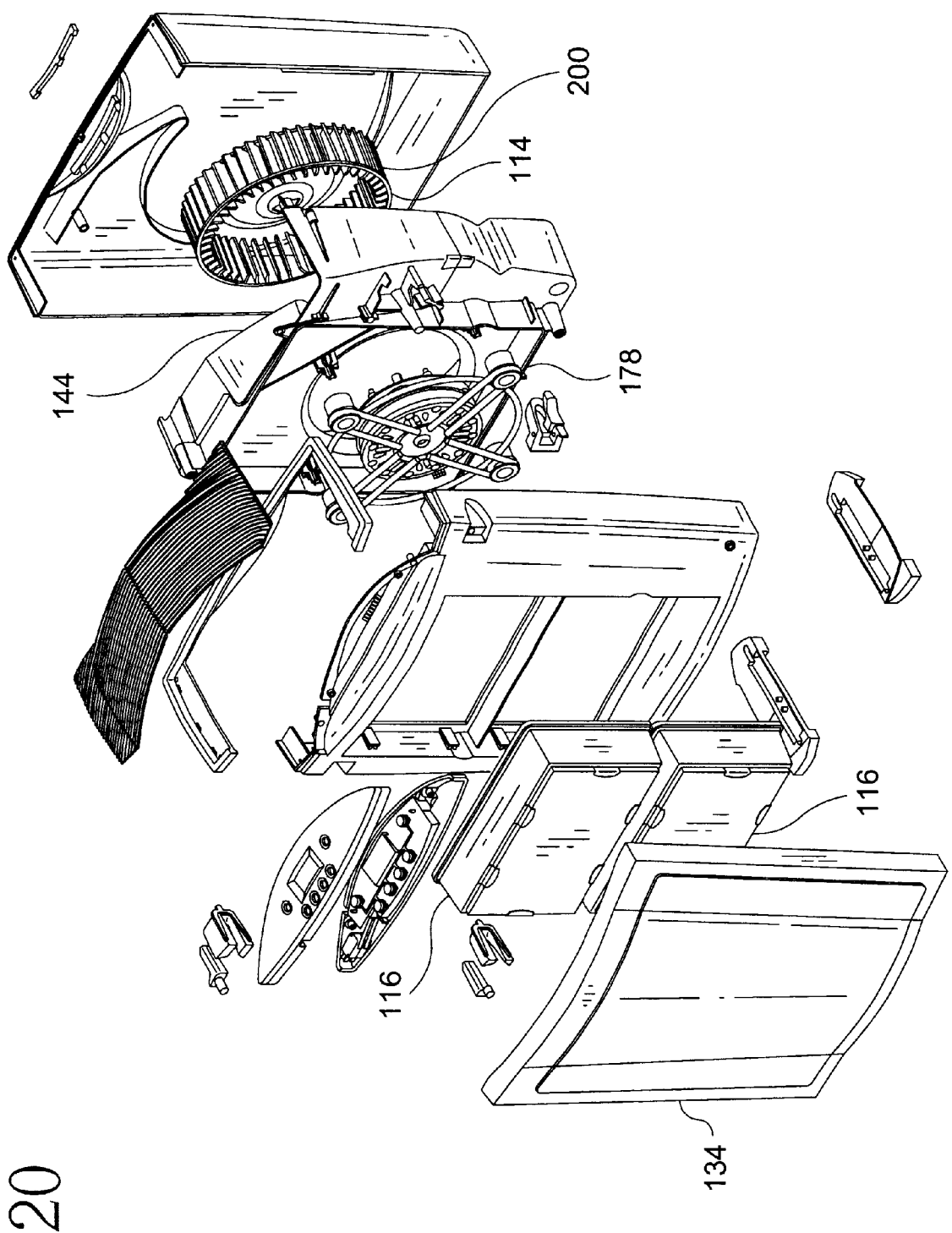
FIG. 20 is an exploded perspective view of the air purifier shown in FIG. 19.
Figure 21:
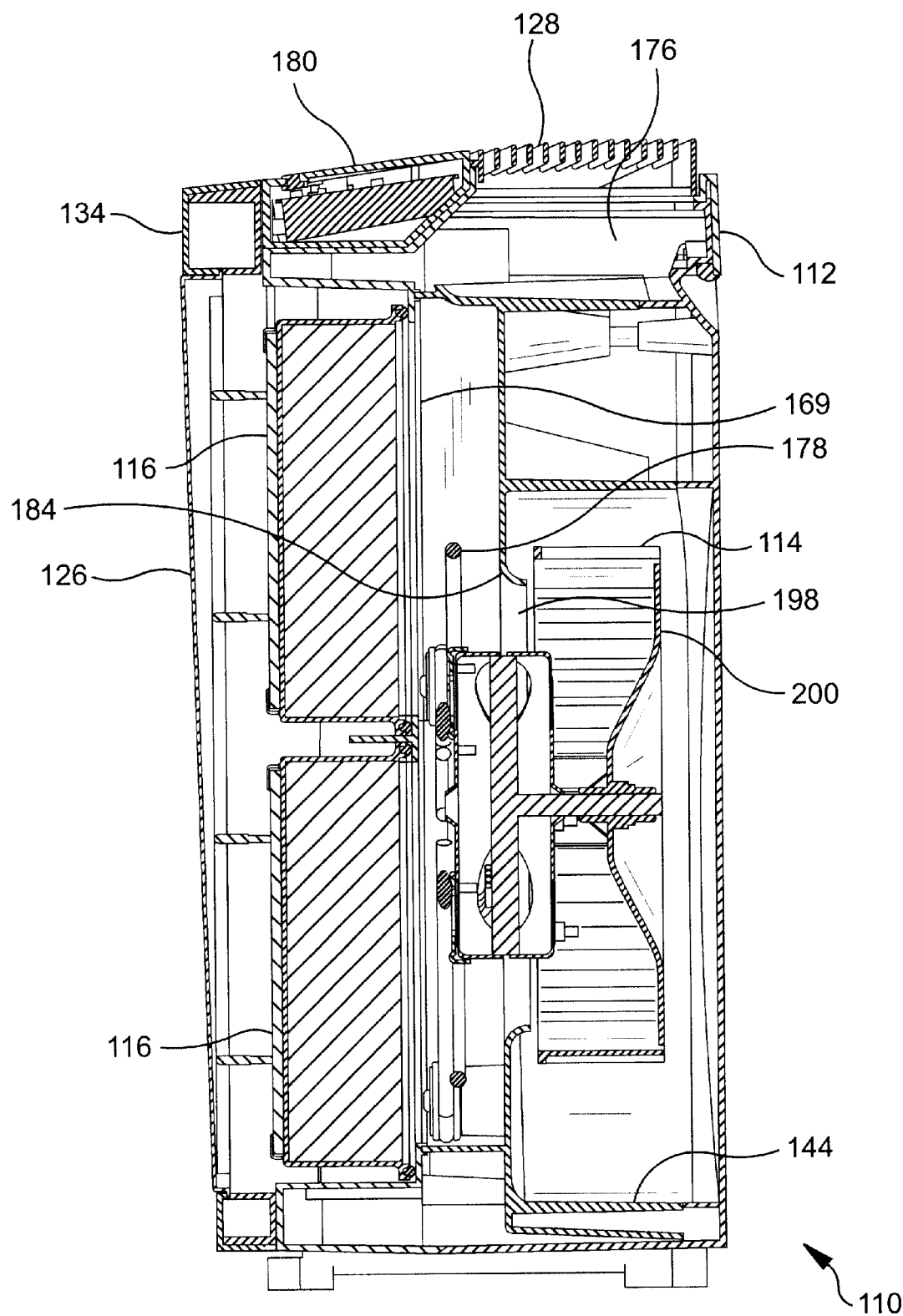
FIG. 21 is a cross-sectional view taken along line 21—21 as shown in FIG. 19.
Figure 21A:
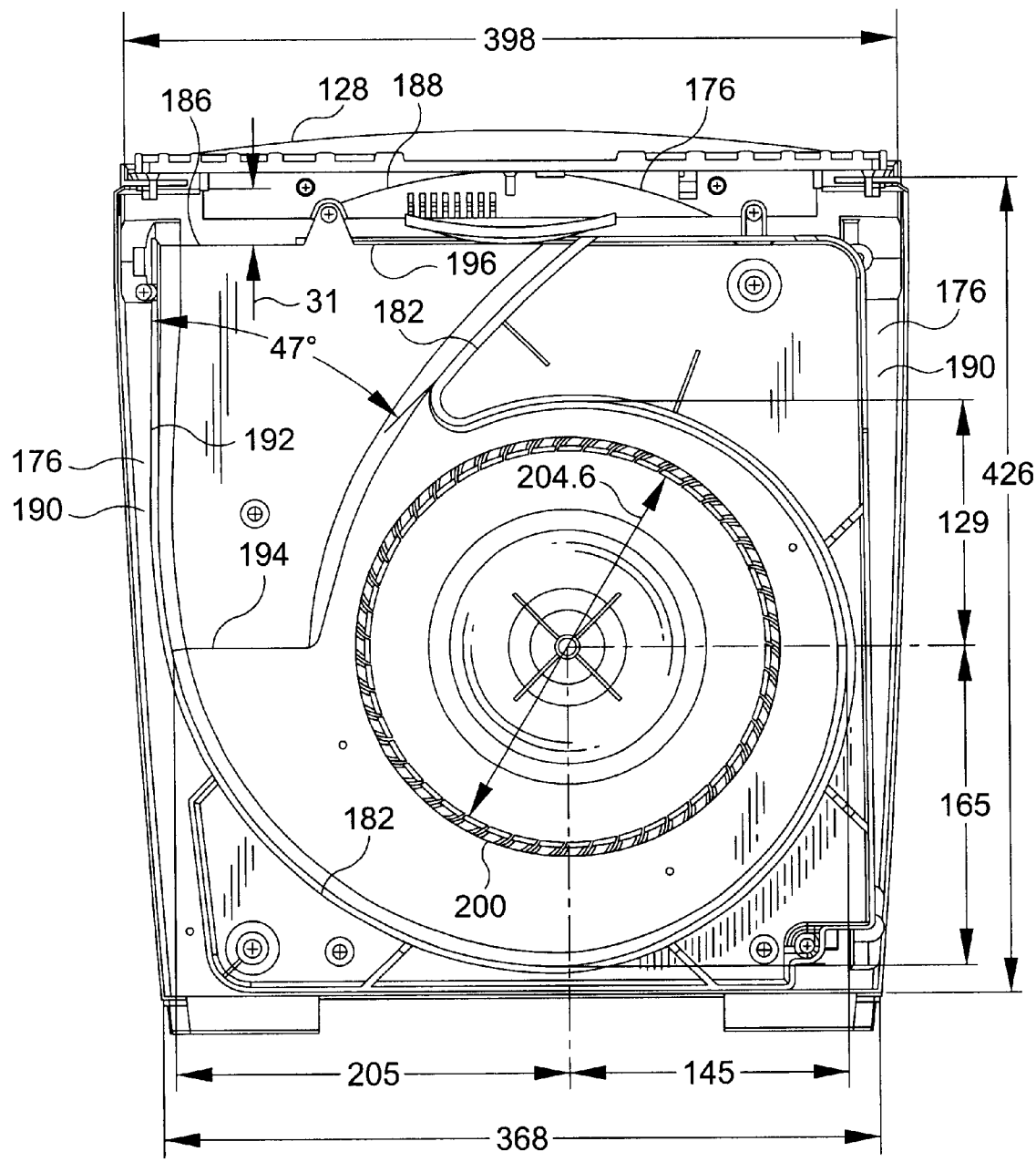
FIG. 21A is an open view of the air purifier shown in FIG. 19 looking at the fan and scroll relationship with the rear panel and top grill removed.
Figure 22:
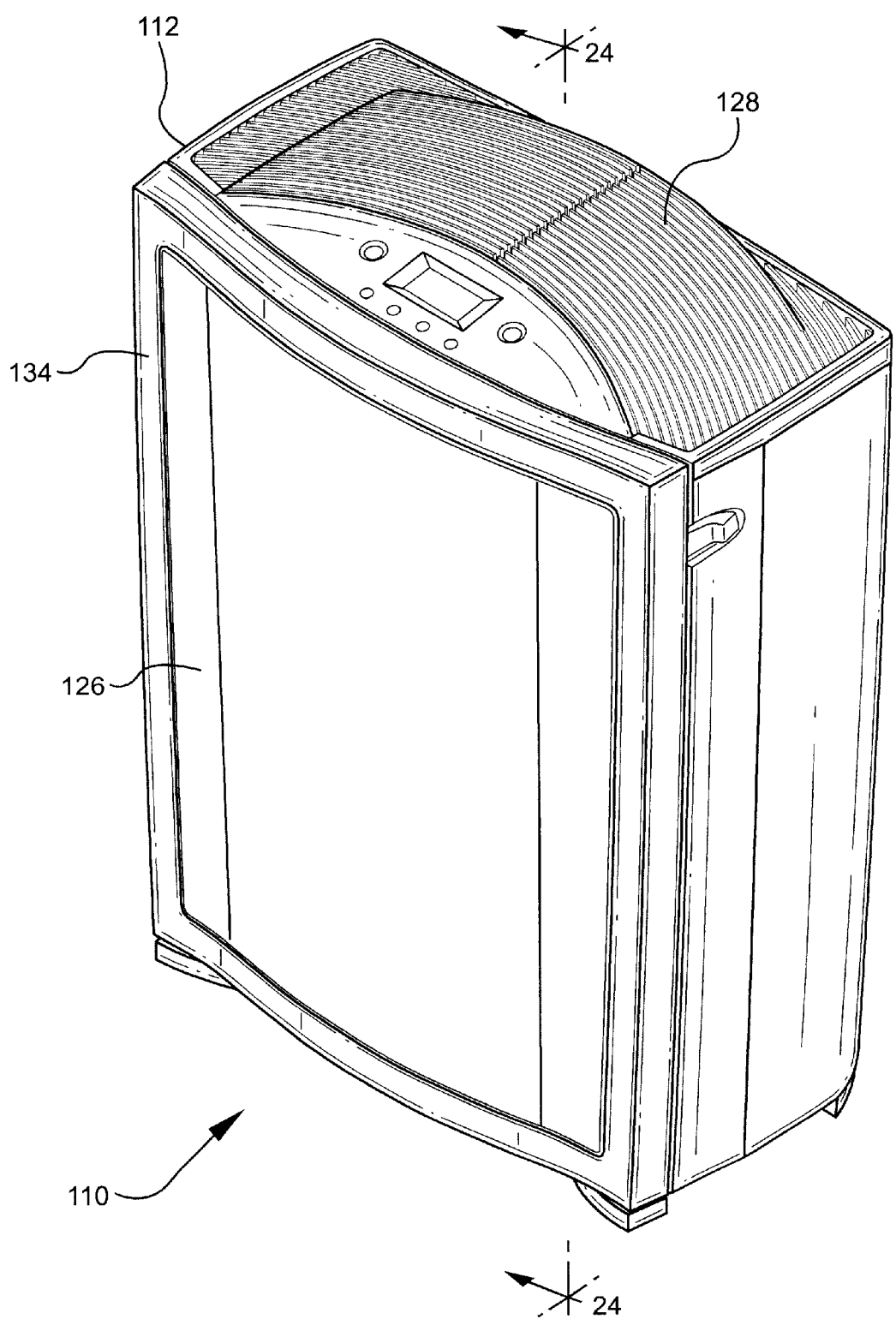
FIG. 22 is a front perspective view of a fifth member of a family of air purifiers in accordance with the present invention.
Figure 23:
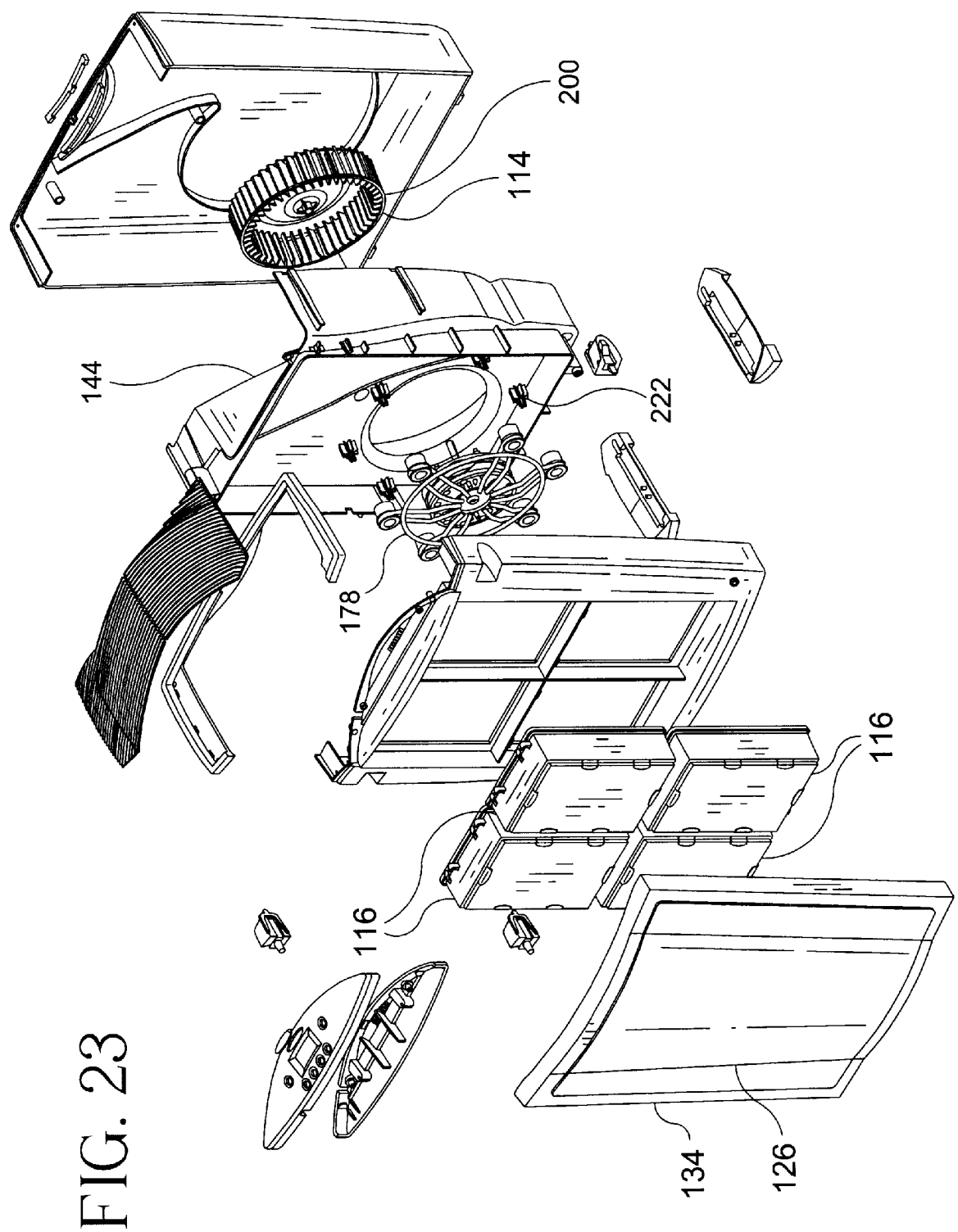
FIG. 23 is an exploded perspective view of the air purifier shown in FIG. 22.
Figure 24:
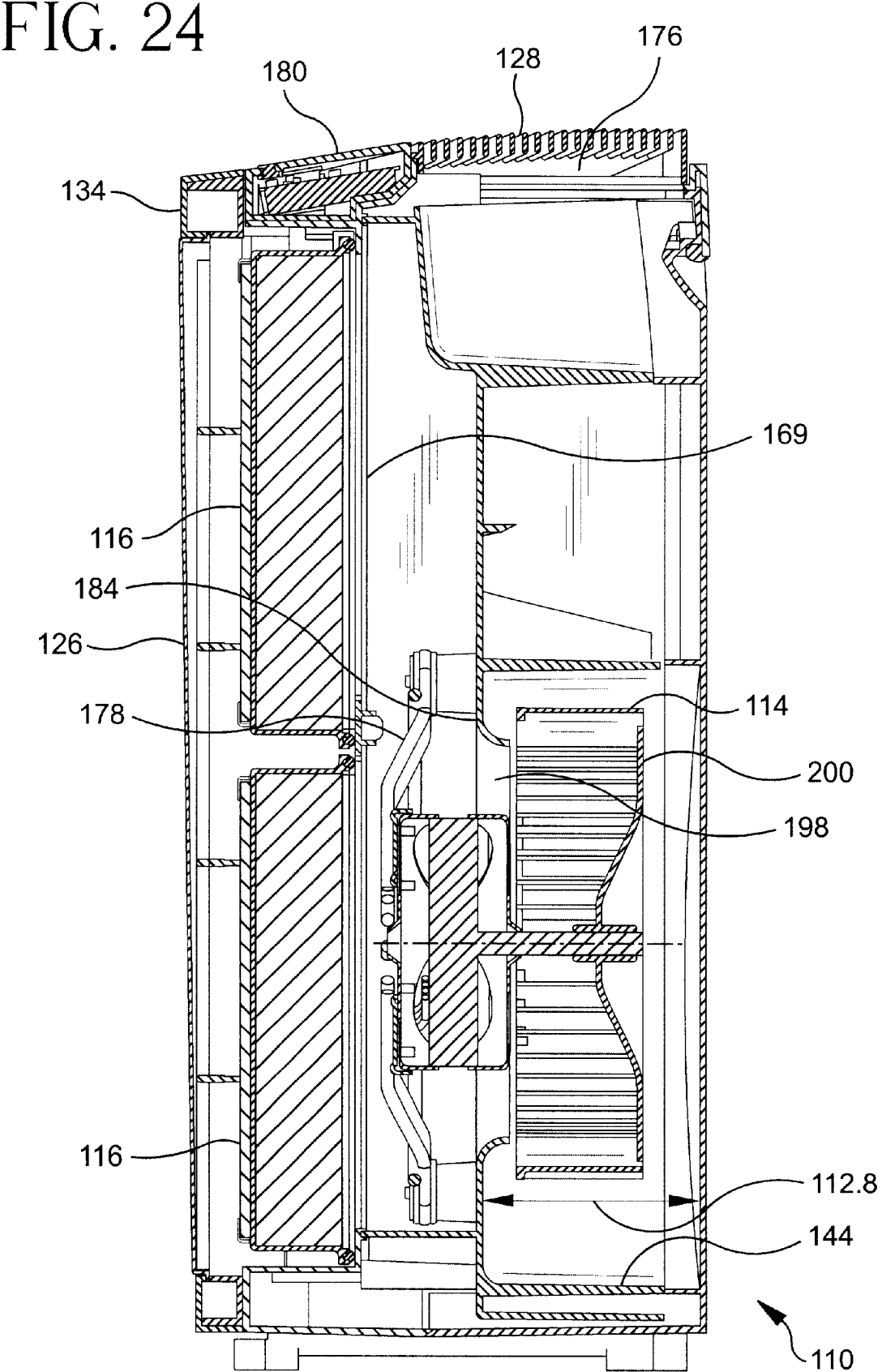
FIG. 24 is a cross-sectional view taken along line 24—24 as shown in FIG. 22.
Figure 24A:
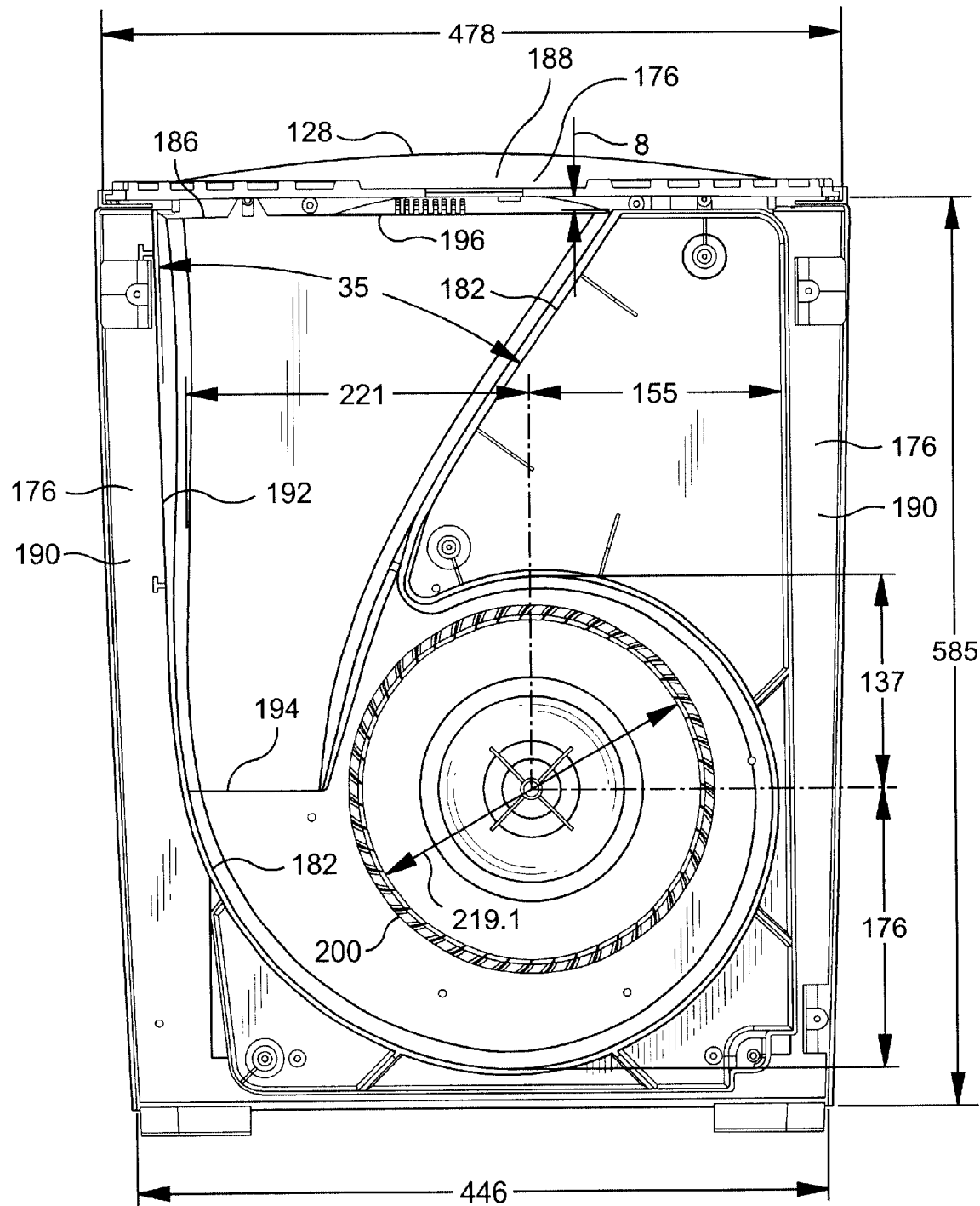
FIG. 24A is an open view of the air purifier shown in FIG. 22 looking at the fan and scroll relationship with the rear panel and top grill removed.

All of the purifiers 110 shown in FIGS. 10, 13, 16, 19, and 22 are configured to use the same filter assembly 116 that is detailed in FIGS. 25 through 31. As illustrated in the exploded views (see FIGS. 11, 14, 17, 20, and 23), the air purifying devices 110 use either 2, 3 or 4 filter assemblies 116. Although not shown, one skilled in the art would understand that an air purifier can be configured to use only 1 filter assembly 116 as evidenced by the embodiments shown in FIGS. 1 through 9. The exploded views also illustrate that the filter assemblies 116 can be either vertically hung (as shown in FIGS. 17 and 23), cantilevered— horizontally arranged—(as shown in FIGS. 11 and 20), or a combination of both vertically hanging and cantilevering (as shown in FIG. 14).

Figure 25:
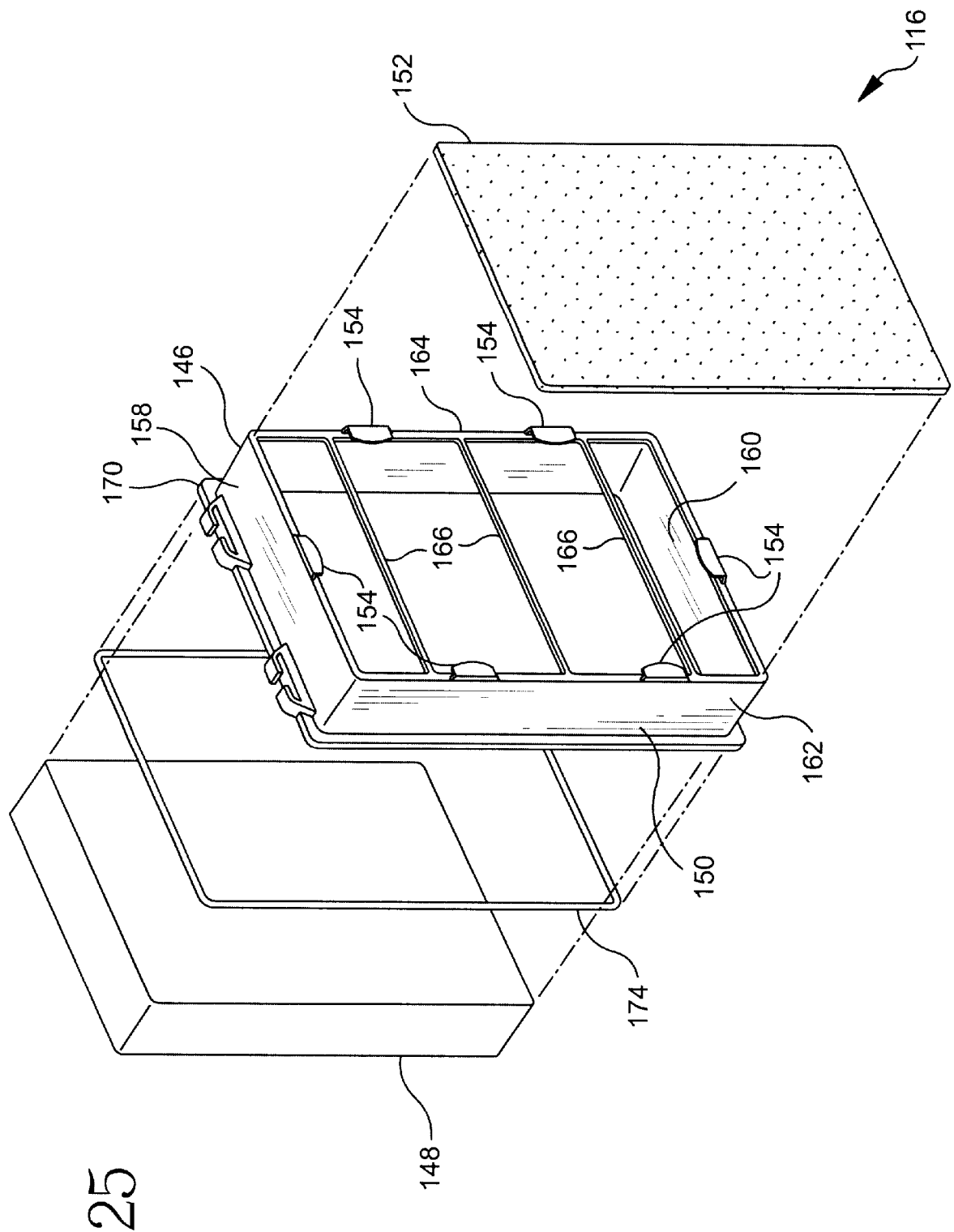
FIG. 25 is an exploded view of a filter assembly for the family of air purifiers shown in FIGS. 10 through 24.
Figure 28:
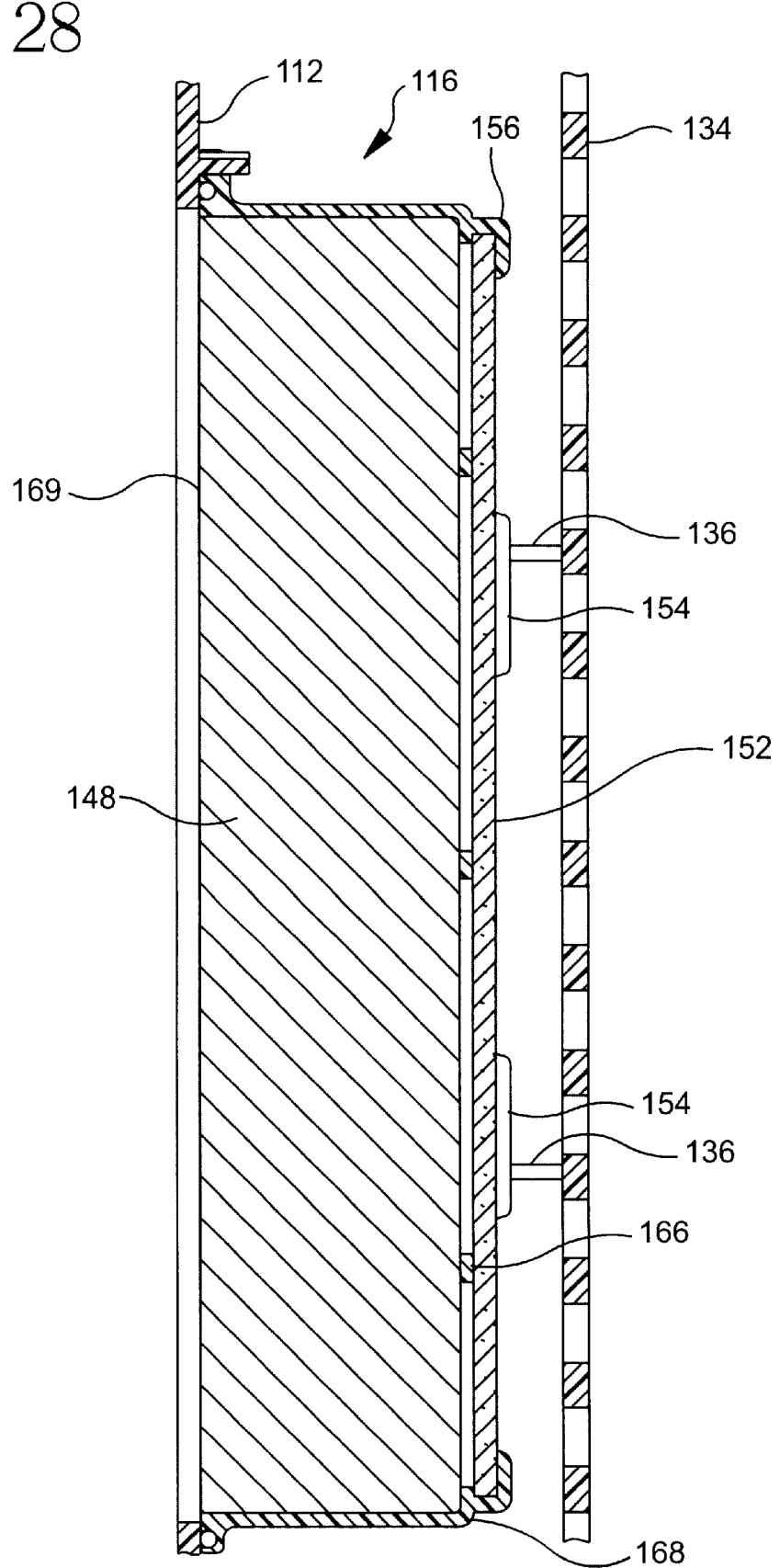
FIG. 28 is a cross-sectional view taken along line 28—28 as shown in FIG. 27.

Referring now to FIGS. 25 and 28, the filter assembly 116 includes a frame 146 and a first filter element 148 mounted within the frame 146 and preferably a second filter element 152 mounted on the intake side 168 of the filter assembly 116. Preferably the first filter element 148 is a HEPA filter for removing particulate matter and the second filter element 148 is a carbon filter 152 for removing odors. The second filter element 152 is preferably removably attached to the filter assembly 116 by a plurality of filter tabs 154.

The frame 146 of the filter assembly 116 has an exterior surface 150 and preferably includes a top wall 158, a bottom wall 160, and first and second opposing side walls 162, 164 connecting the top and bottom walls 158, 160 with the first filter element 148 being positioned within the walls. The frame 146 is generally rectangular, but could include other shape and sizes. Preferably the frame 146 includes straps 166 that extend between the first and second opposing side walls 162, 164. The frame 146 is preferably configured to receive a rubber gasket 174 to ensure a good seal against the housing. Preferably the frame 146 includes a lip 170 that extends around the perimeter of the frame 146 formed with a recess for receiving the gasket 174.

Figure 26:
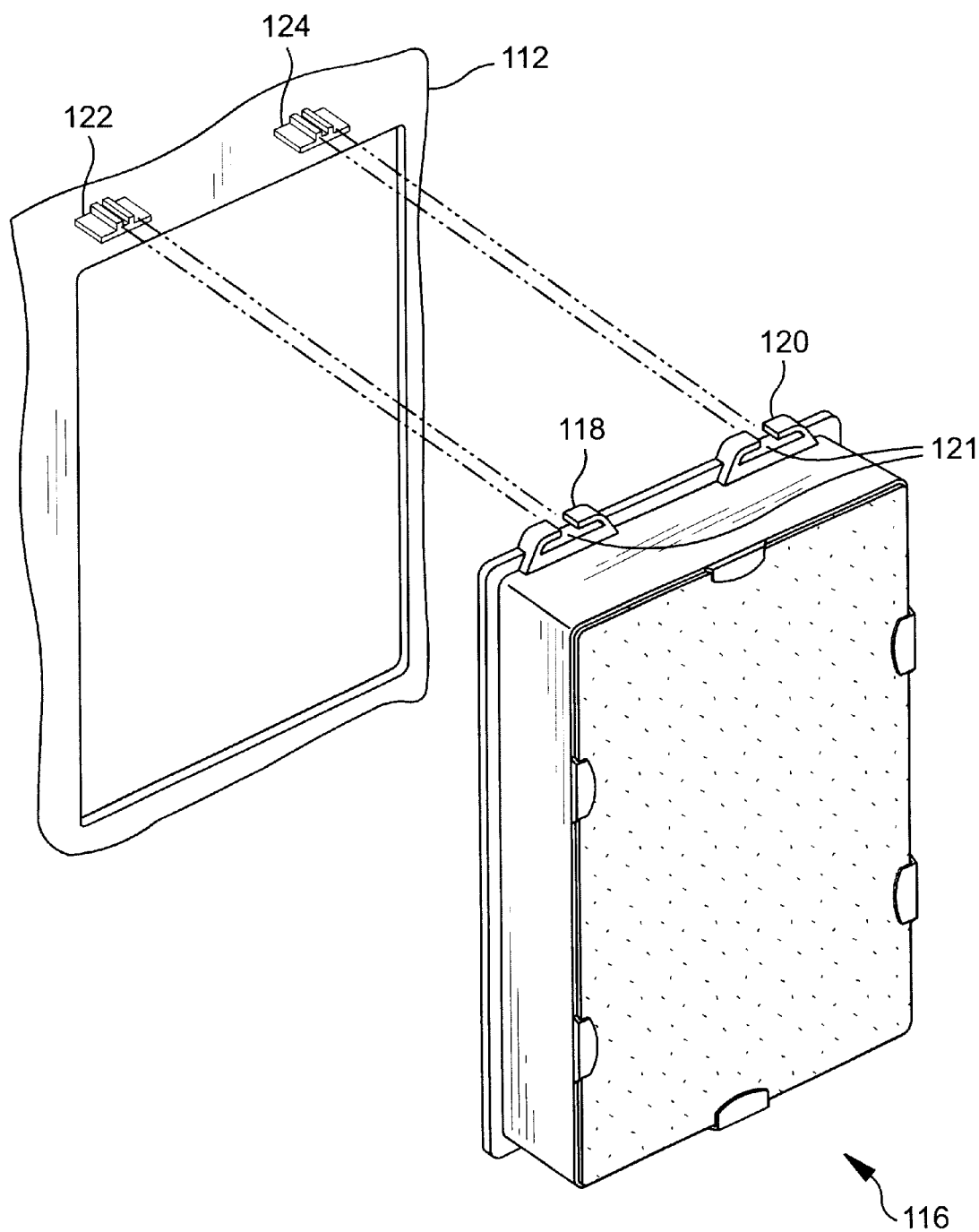
FIG. 26 is a partially exploded view showing the relation of the filter assembly to the housing.
Figure 29:
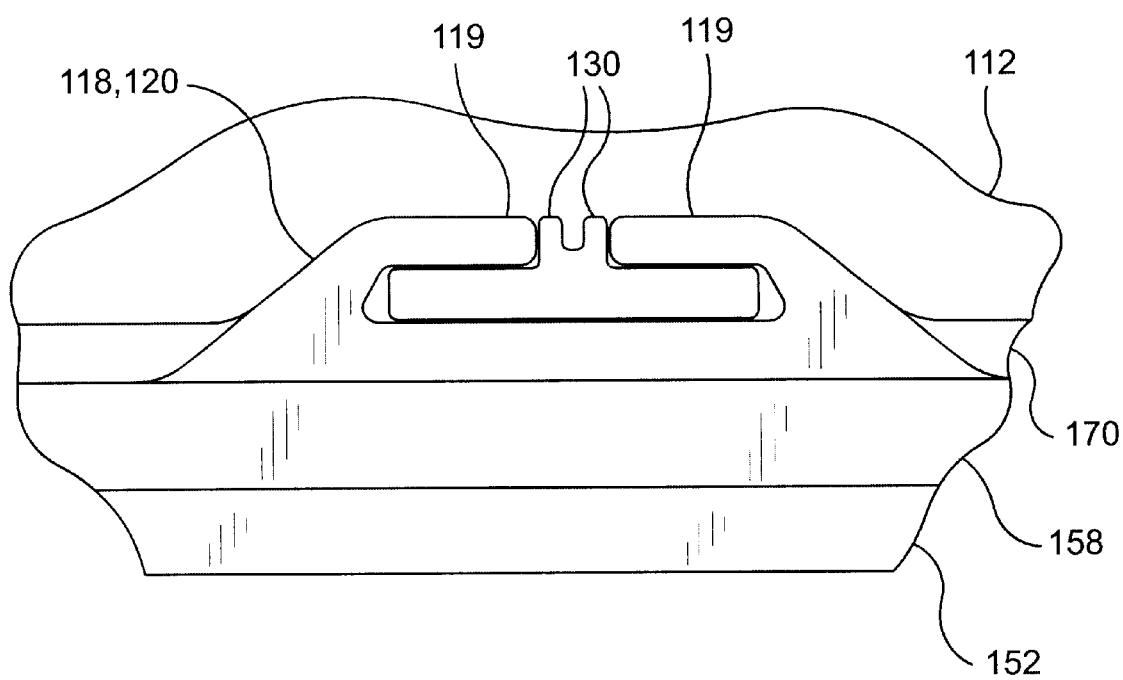
FIG. 29 is a partial elevational view showing the connection of the filter assembly to the housing as shown in FIG. 27.
Figure 31:
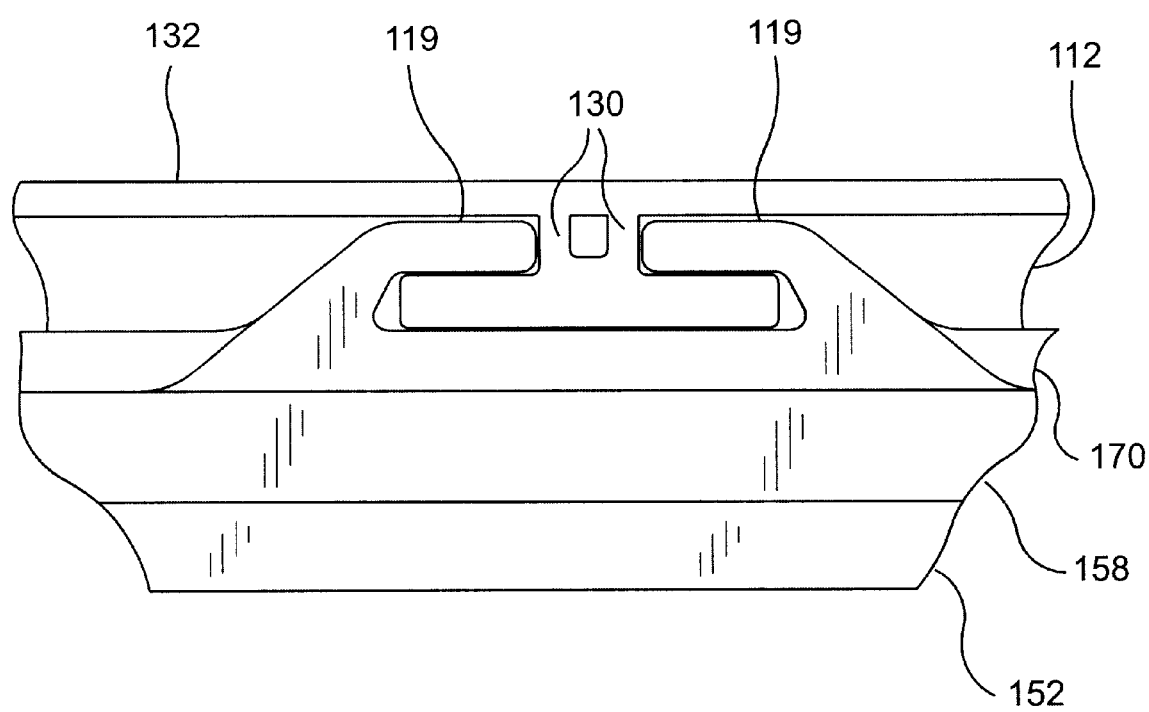
FIG. 31 is a view similar to FIG. 29 of the housing shown in FIG. 30.

The filter assembly 146 also includes at least one hanger for facilitating the connection to an elongate hanger support. As shown in FIG. 26, preferably the filter assembly includes first and second hangers 118, 120. Each hanger 118, 120 preferably includes a pair of legs 119 attached to the top wall 158 at the lip 170 to form an open "C" shaped section. This arrangement defines a gap 121 between the legs 119. When the filter assembly 146 is mounted to the housing 112 as shown in FIGS. 29 and 31 each leg 119 engages a portion of the respective elongate hanger support 122, 124.

Figure 8:
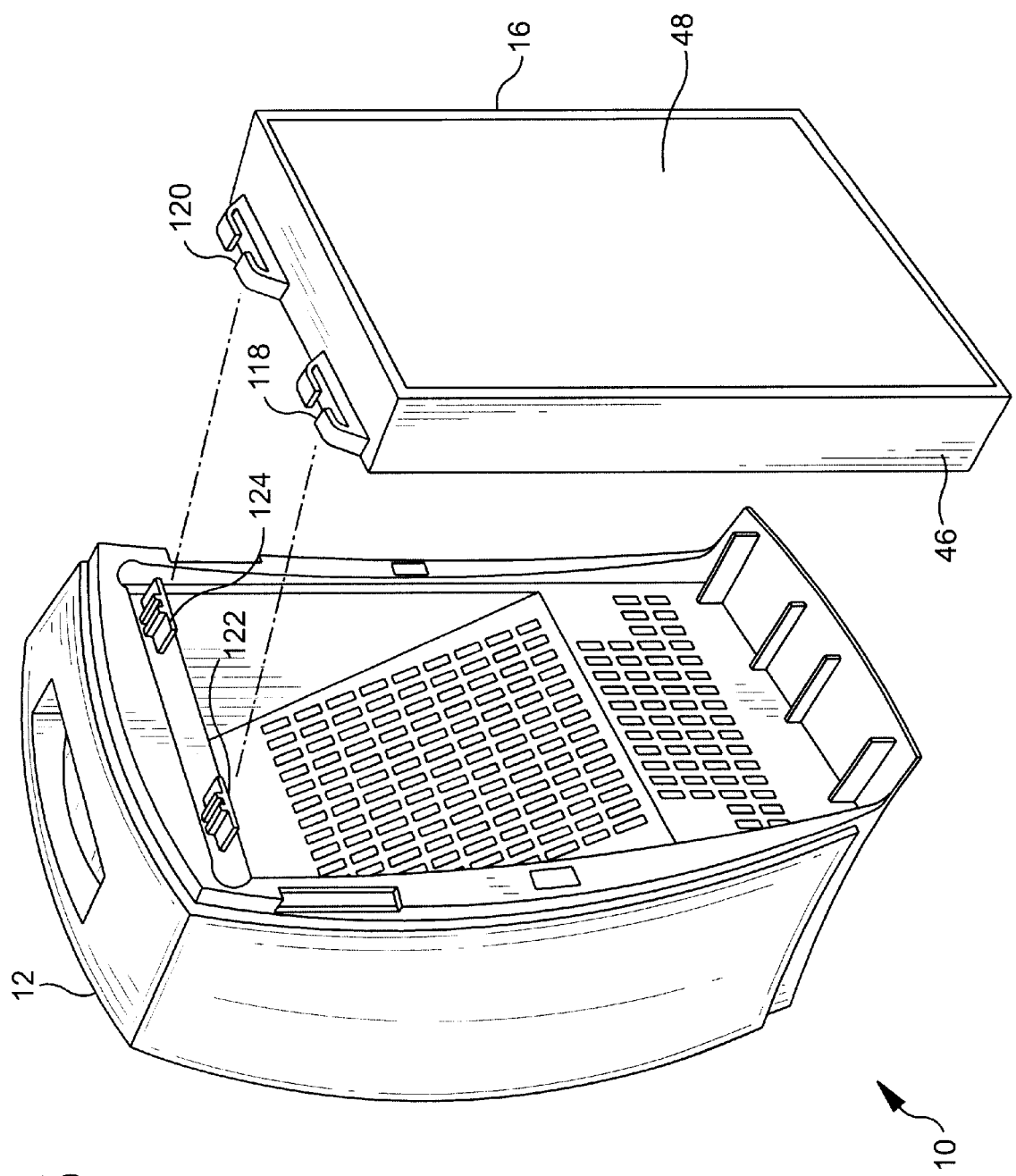
FIG. 8 is a partially exploded rear perspective view of another alternative embodiment of the present invention that include the hangers and elongate hanger supports shown in FIGS. 26 and 29.
Figure 9:
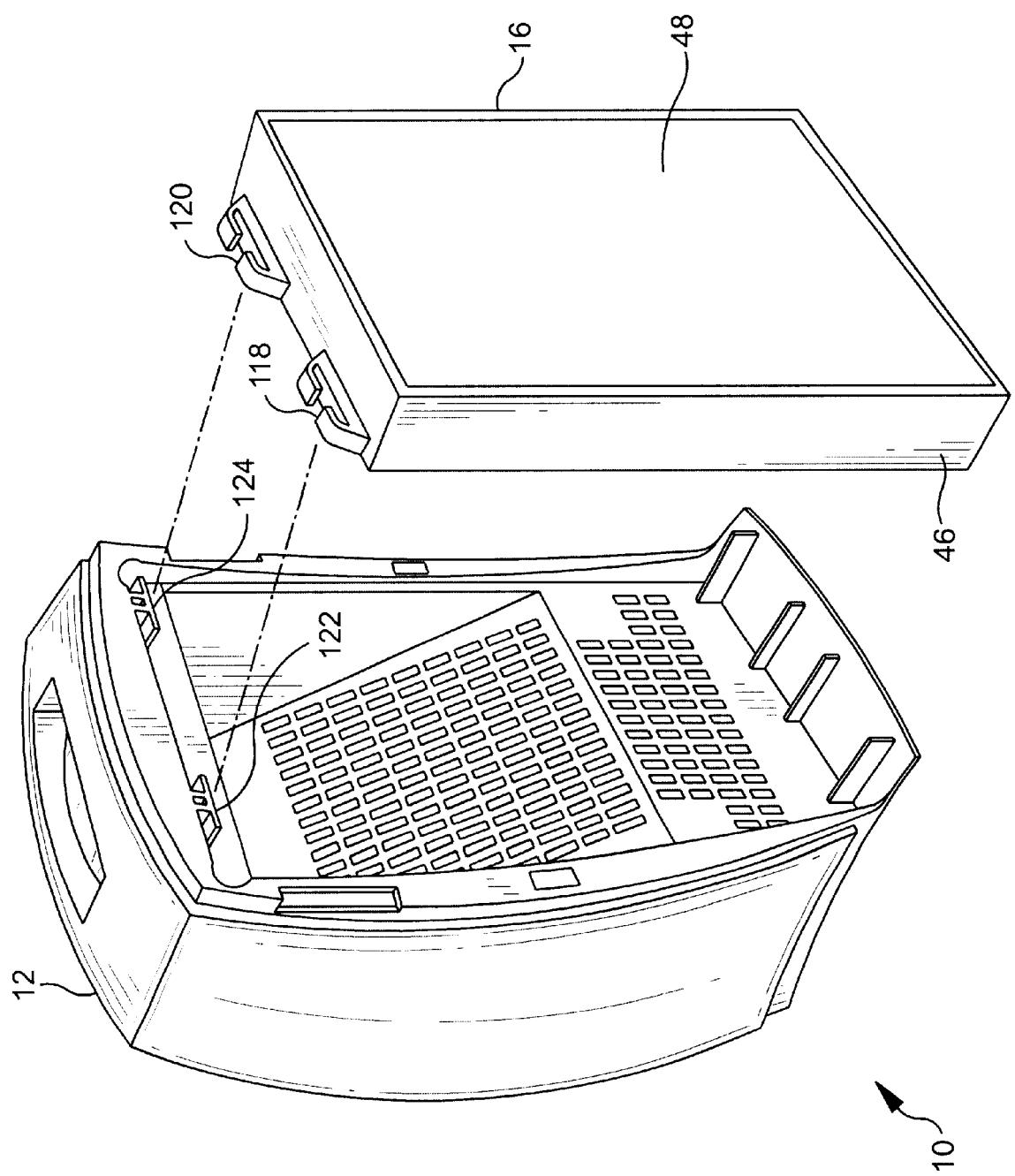
FIG. 9 is a partially exploded rear view of another alternative embodiment of the present invention that includes the hanger and elongate hanger supports shown in FIGS. 30 and 31.
Figure 10:
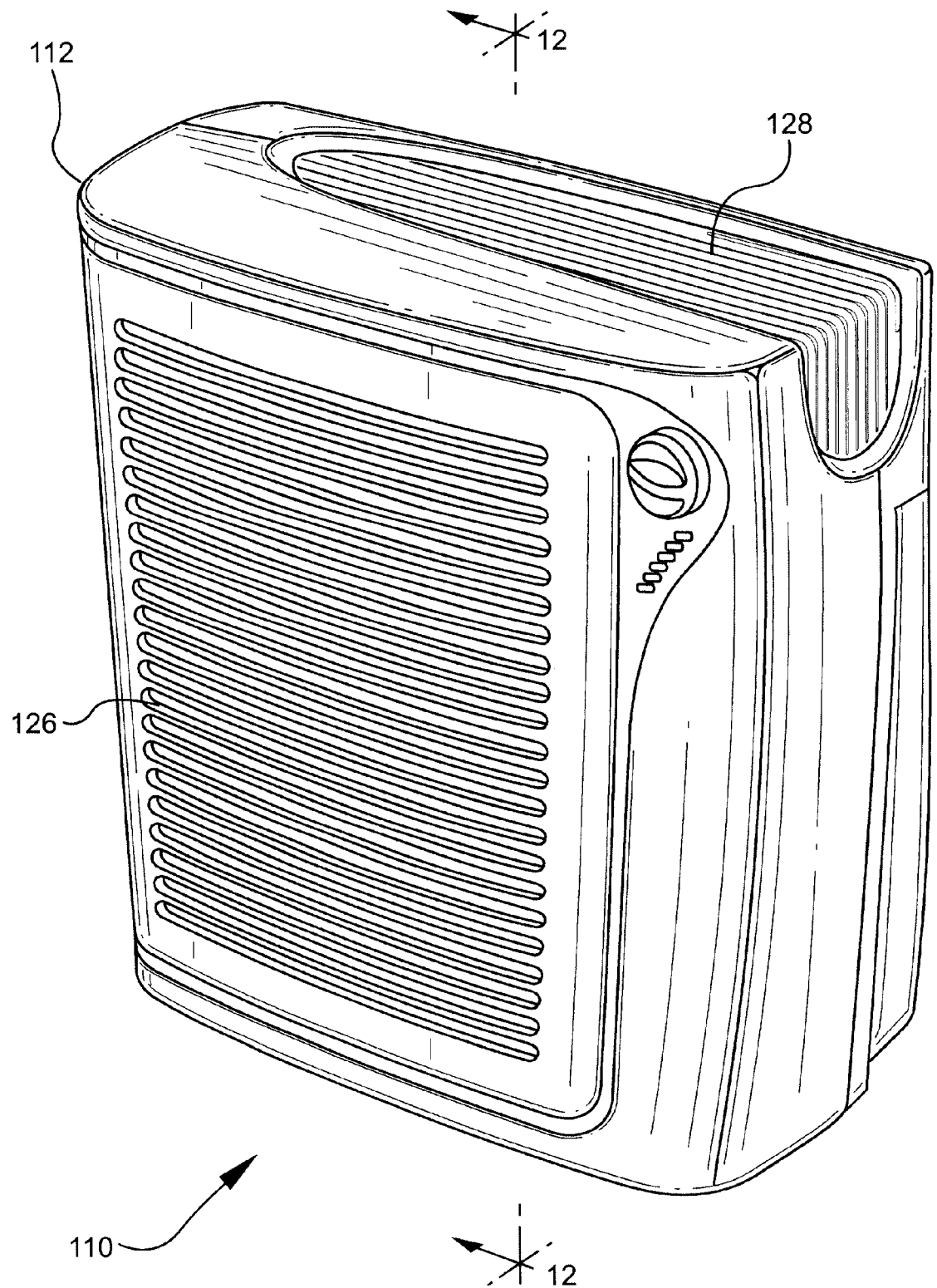
FIG. 10 is a front perspective view of a first member of a family of air purifiers in accordance with the present invention.
Figure 30:
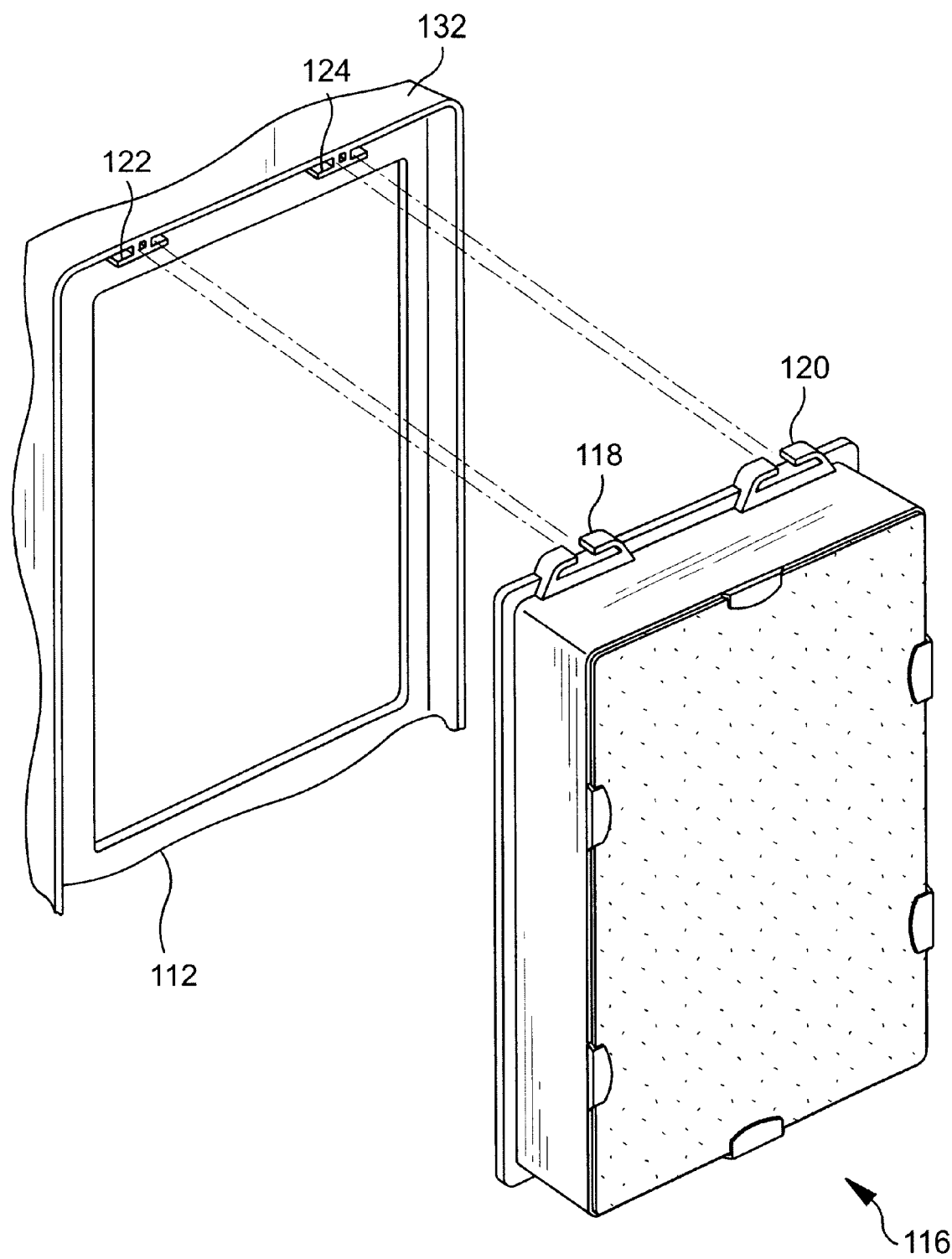
FIG. 30 is similar to FIG. 26 but illustrates an alternative configuration of the housing.

Referring now to FIG. 26, the elongate hanger supports 122, 124 are attached at one end to the housing 112 as a cantilever. To complement the configuration of the hangers 118, 120, preferably the elongate hanger supports 122, 124 include at least one rib 130 extending between the gap, and most preferably a pair of ribs 130 that are arranged to contact the legs of the hanger 118, 120 when the filter assembly 116 is installed thereon as shown in FIG. 29. The ribs 130 help stiffen the elongate member 122, 124 against bending and reduce the rotation of the filter assembly 116 when the filter assembly 116 is cantilevered—horizontally arranged—as shown in FIGS. 11 and 20. In an alternative embodiment, the housing 112 includes a wall element 132 that is attached to the ribs 130 and runs substantially perpendicular thereto as shown in FIGS. 30 and 31. FIGS. 8 and 9 illustrate another embodiment of the present invention that includes the housing 12 and filter assembly 16 of the embodiment shown in FIGS. 1 through 5 while utilizing the hangers 118, 120 and hanger supports 122, 124 as detailed in FIGS. 29 and 31.

Figure 15:
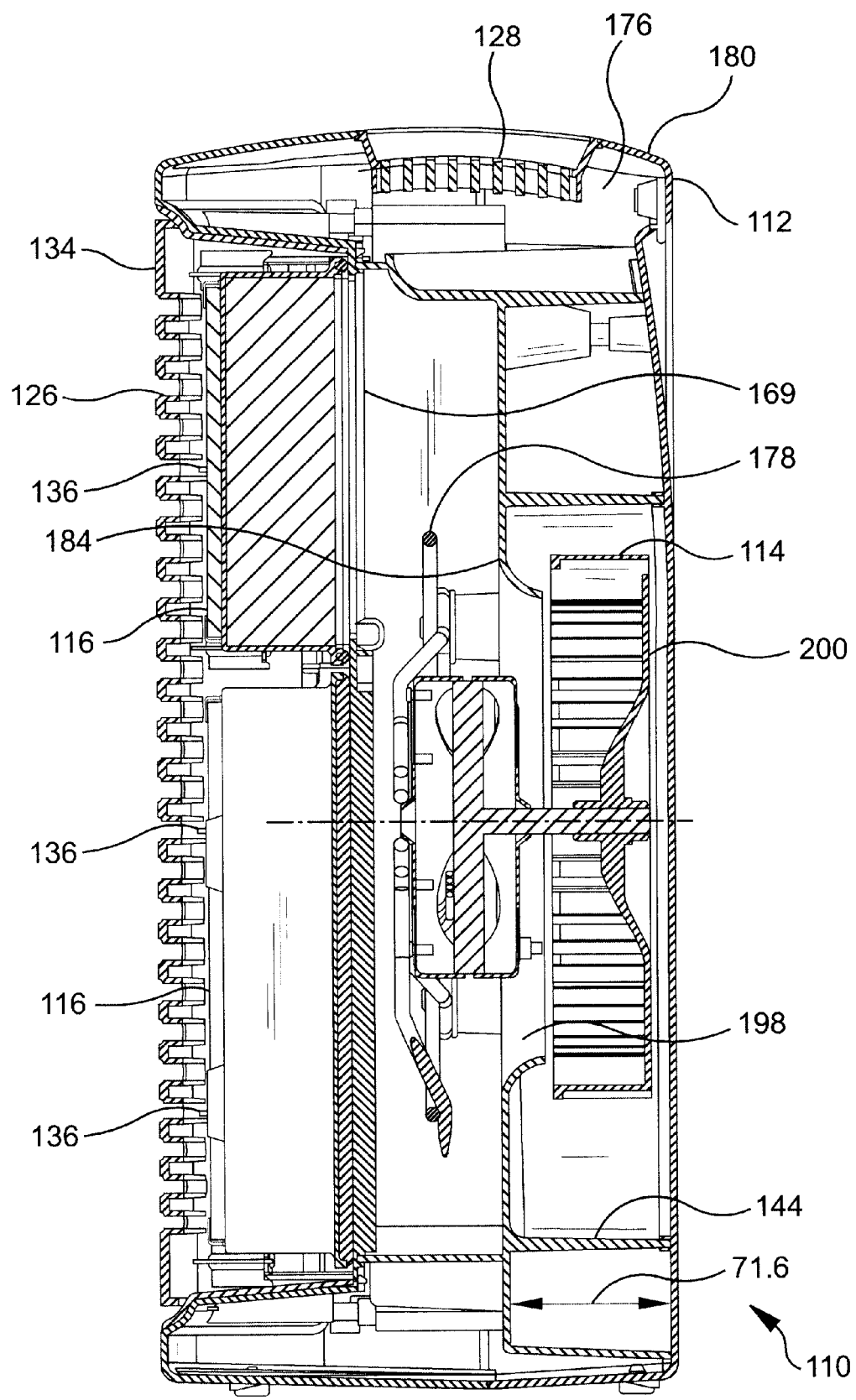
FIG. 15 is a cross-sectional view taken along line 15—15 as shown in FIG. 13.
Figure 15A:
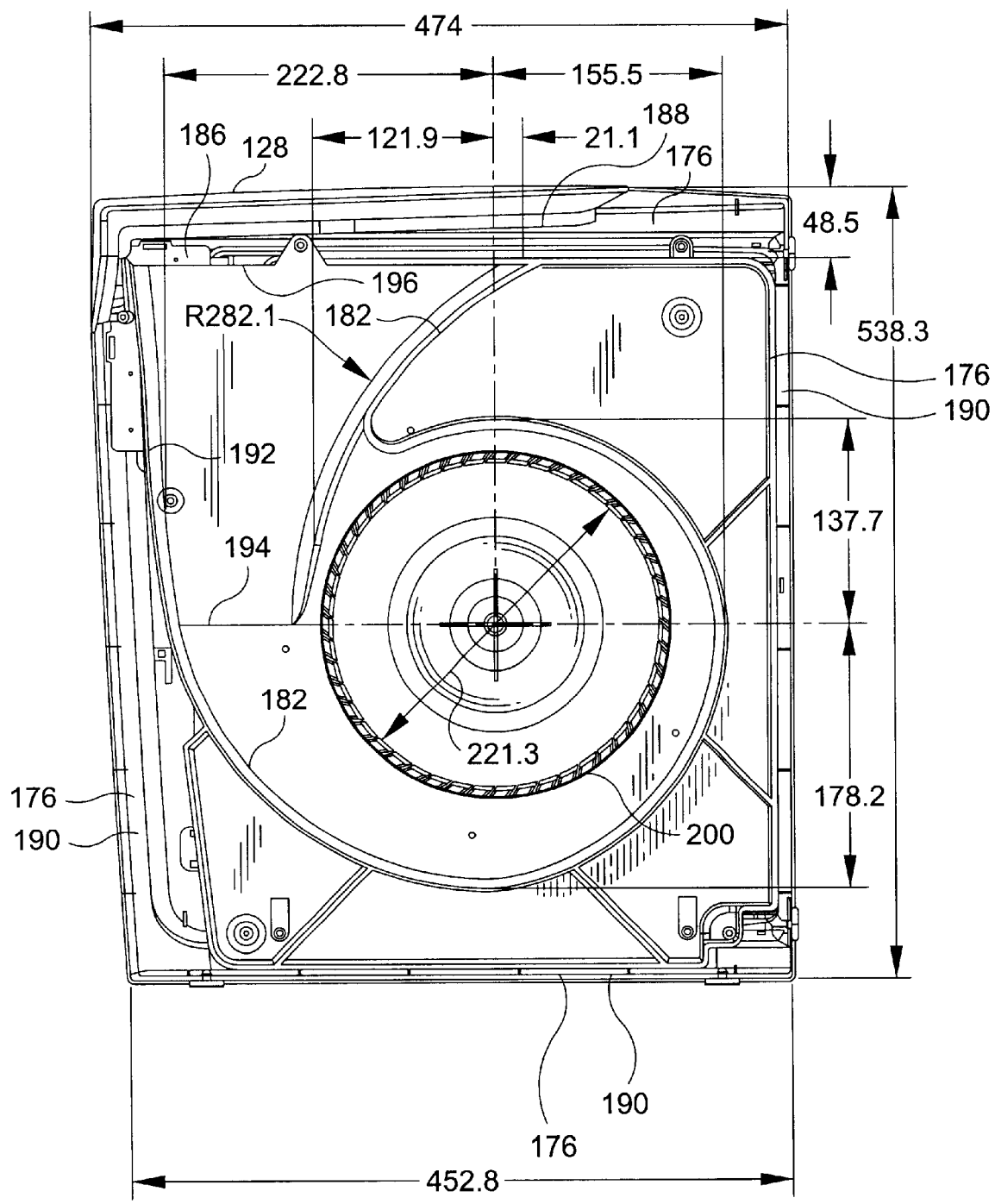
FIG. 15A is an open view of the air purifier shown in FIG. 13 looking at the fan and scroll relationship with the rear panel and top grill removed.
Figure 15B:
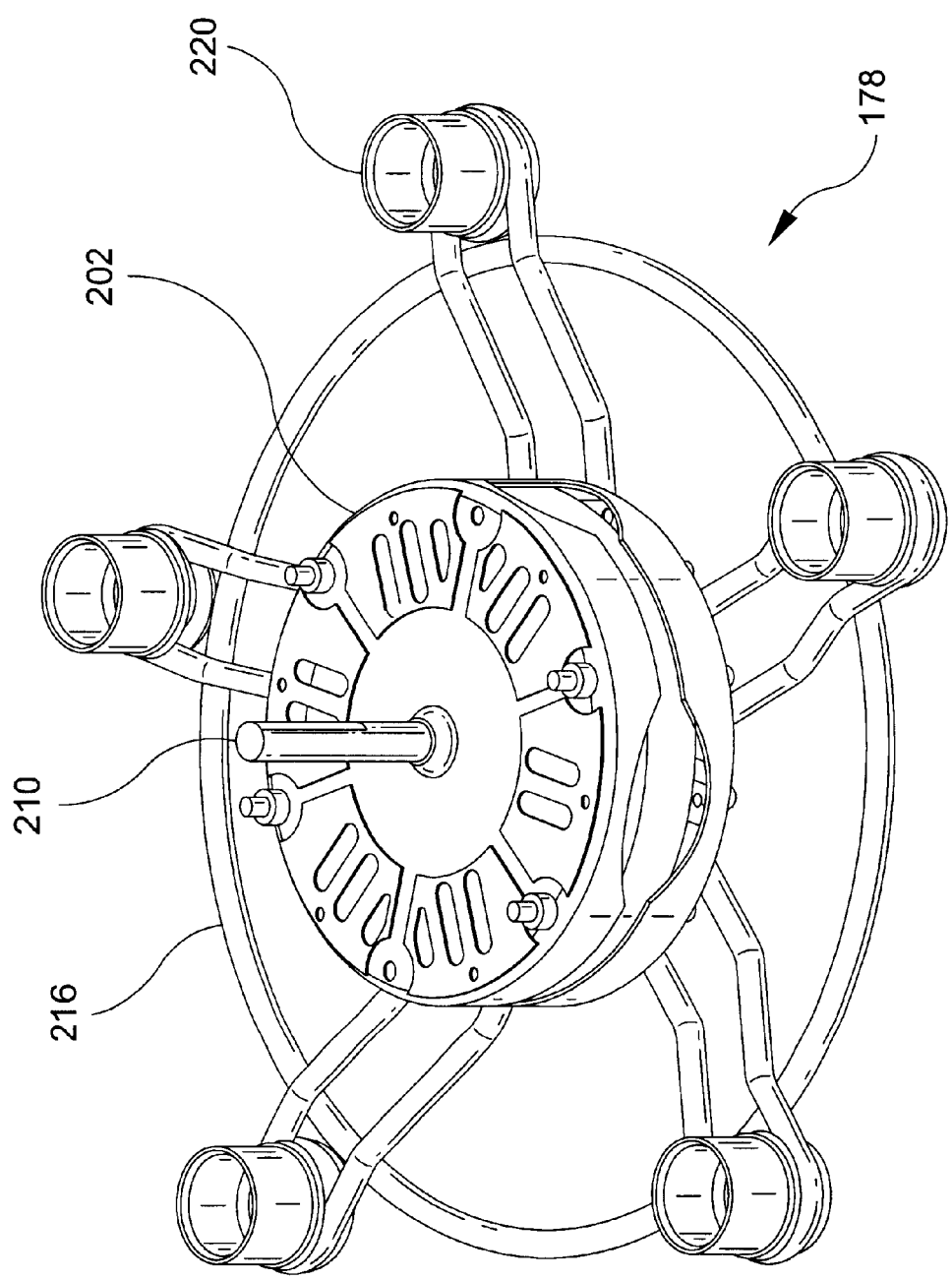
FIG. 15B is a perspective view of the motor mount assembly of the air purifier shown in FIG. 13.
Figure 15C:
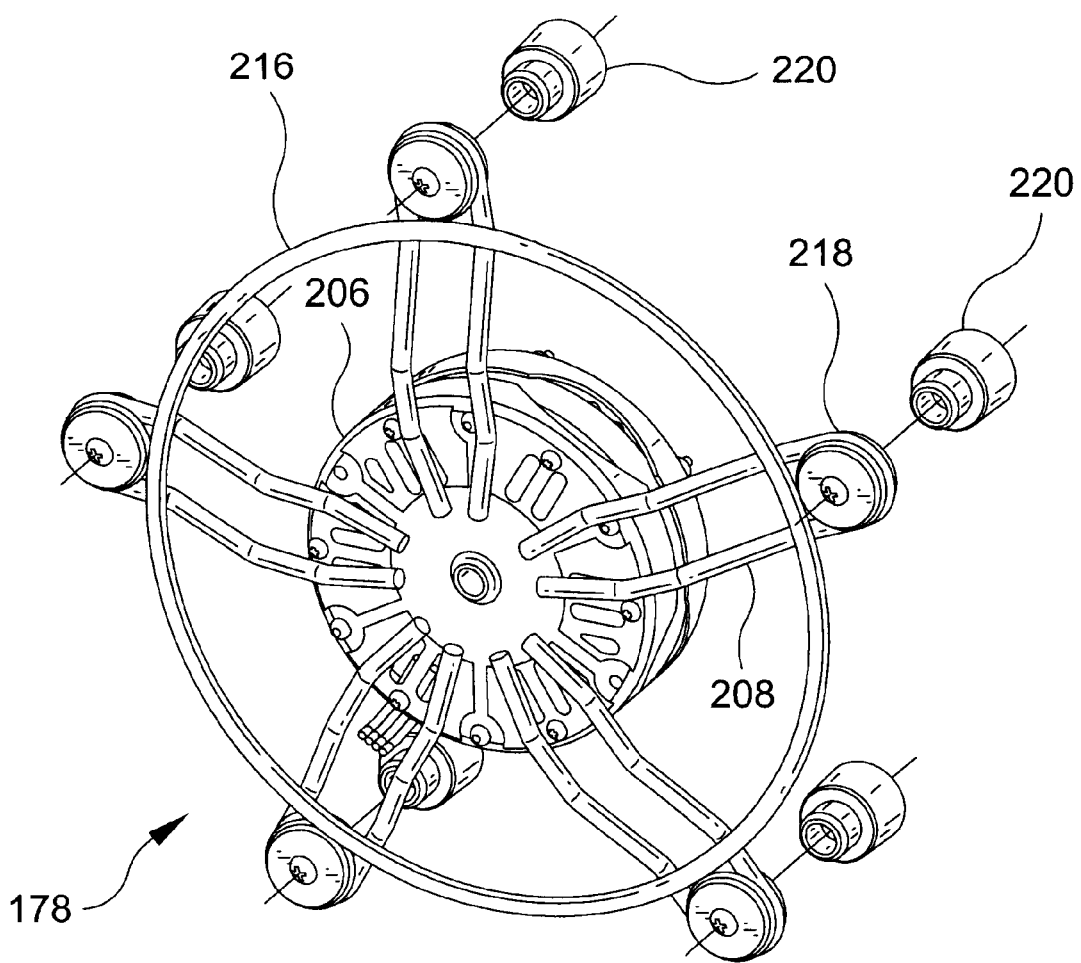
FIG. 15C is a partially exploded perspective view of the motor mount assembly showing the relationship of the boss caps to the assembly of the air purifier shown in FIG. 13.
Figure 15D:
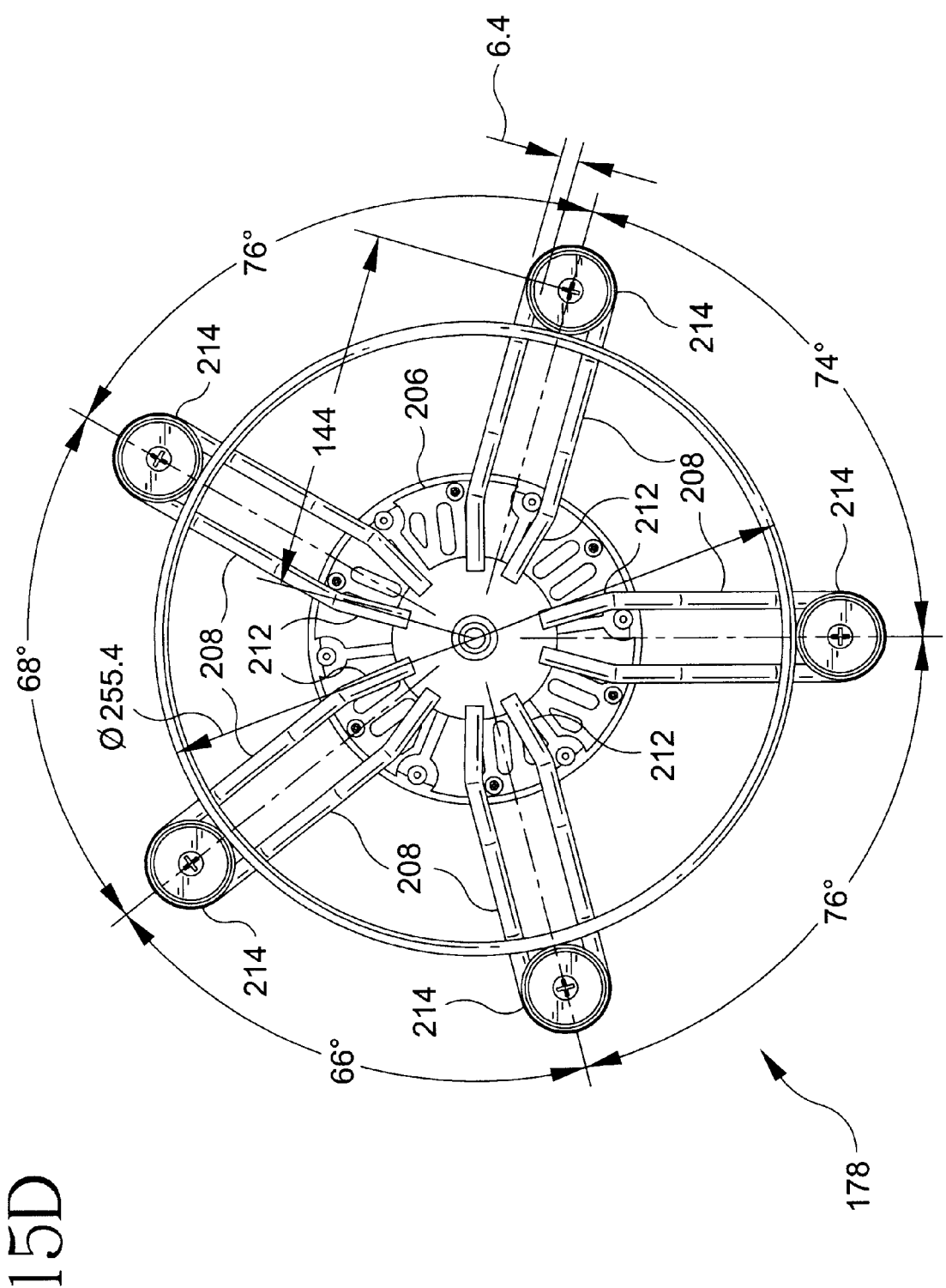
FIG. 15D is a front elevational view of the motor mount assembly of the air purifier shown in FIG. 13.
Figure 15E:
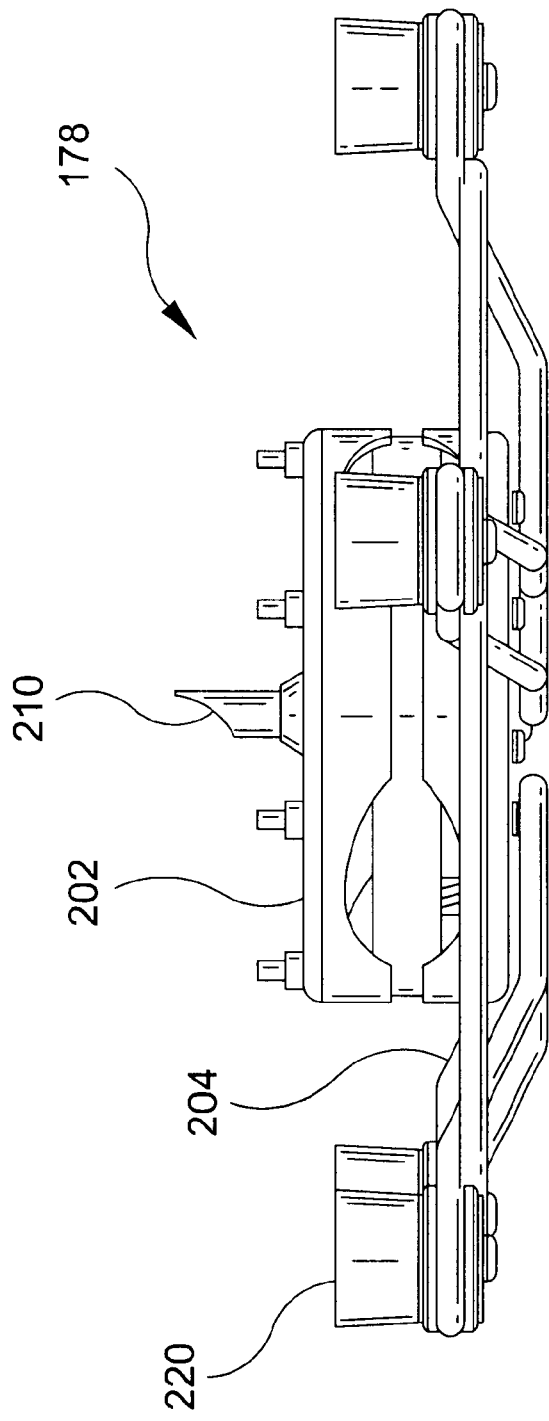
FIG. 15E is a side elevational view of the motor mount assembly of the air purifier shown in FIG. 13.
Figure 15F:
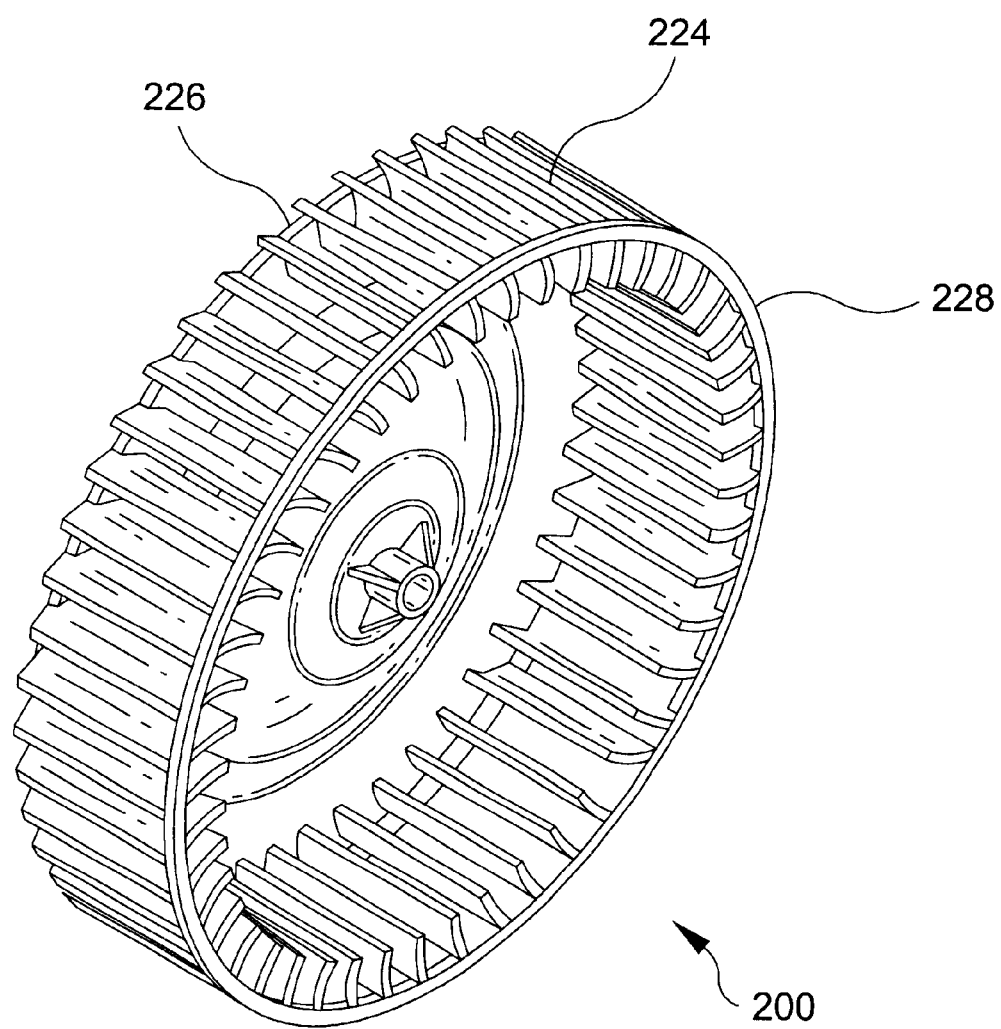
FIG. 15F is a perspective view of the fan blade of the air purifier shown in FIG. 13.
Figure 16:
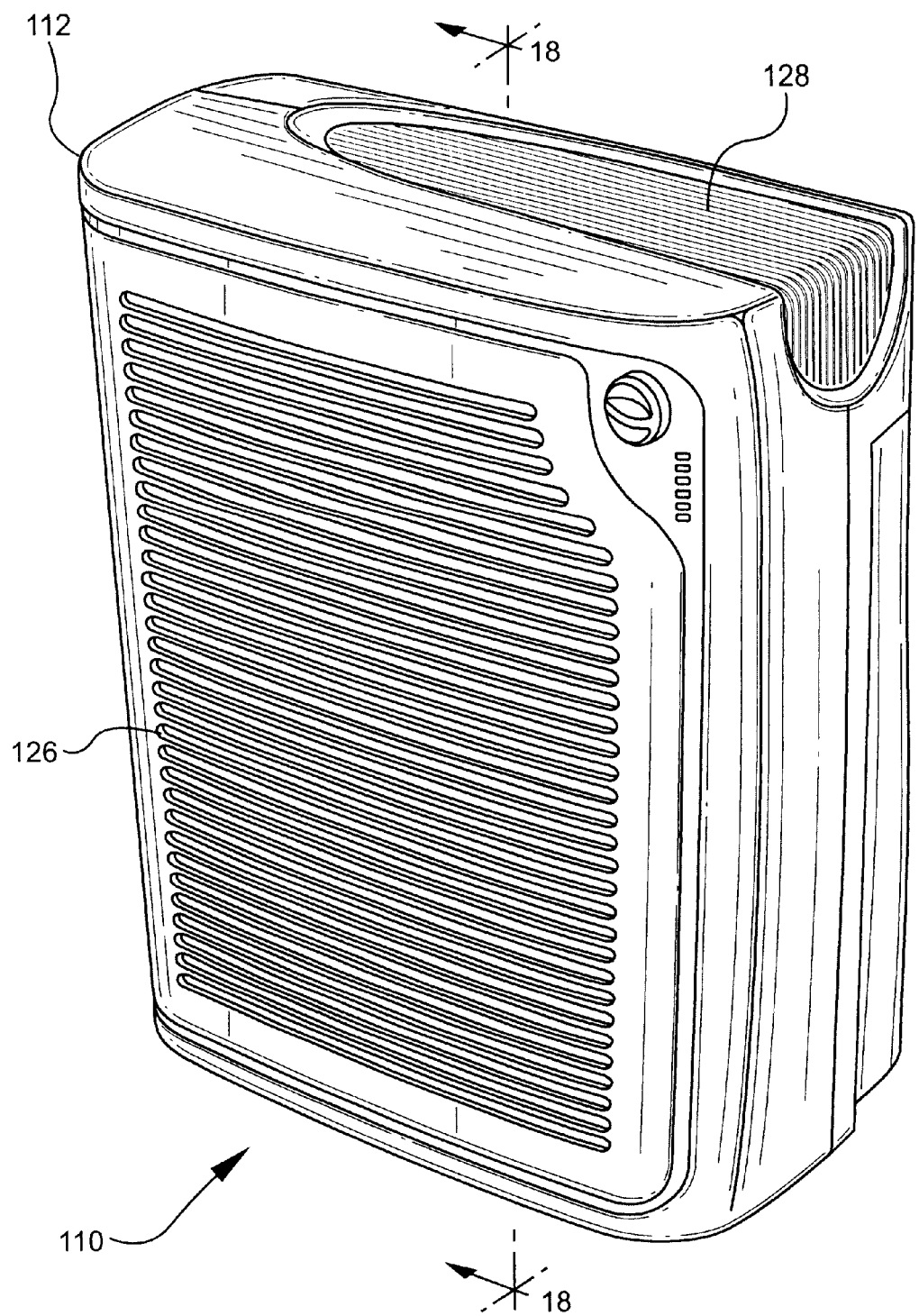
FIG. 16 is a front perspective view of a third member of a family of air purifiers in accordance with the present invention.
Figure 27:
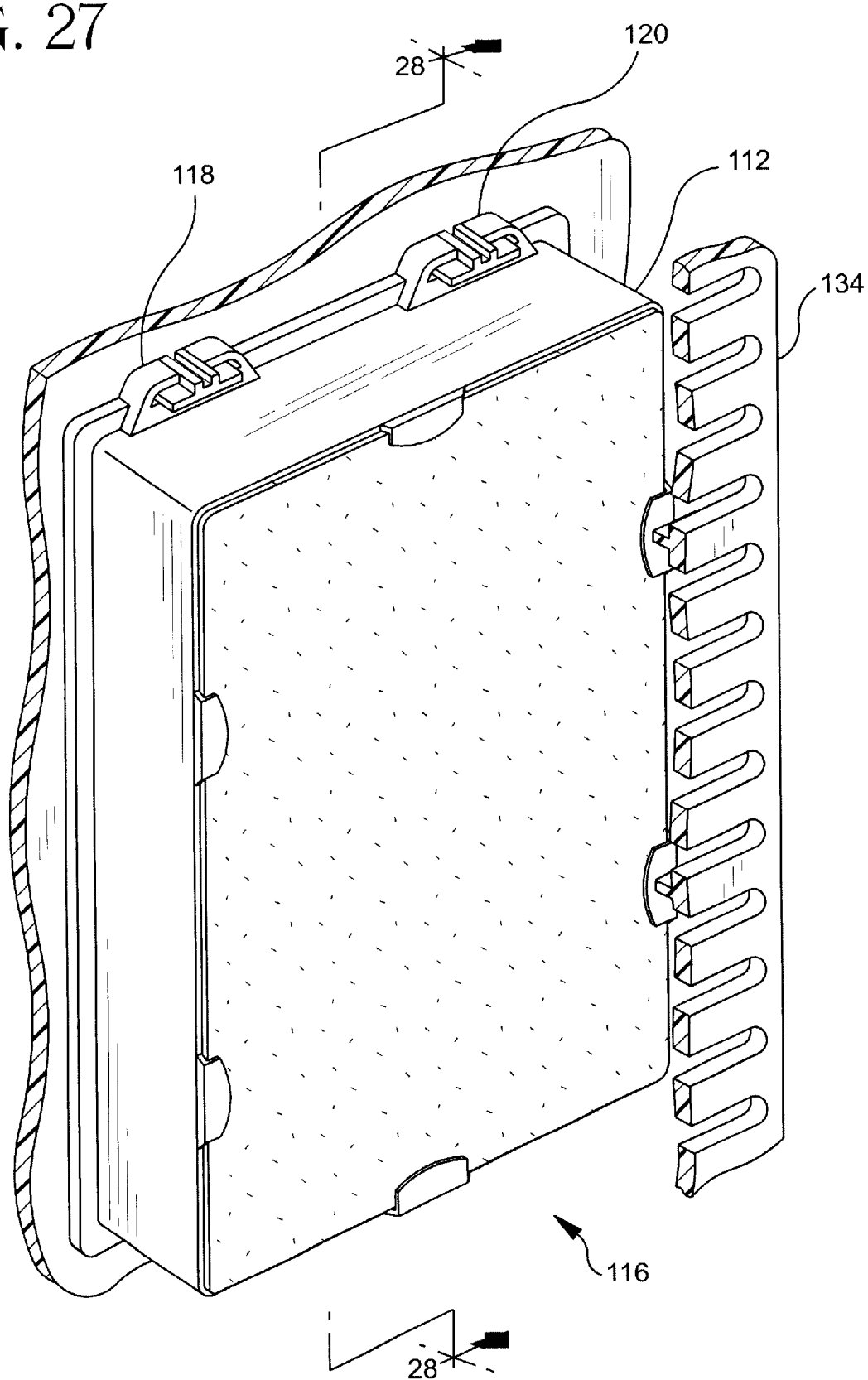
FIG. 27 is a perspective view showing the filter assembly mounted to the housing inside the door.

Referring again to FIGS. 10 through 24, the air purifiers 110 preferably include a door 134 for gaining access to the filter assemblies 116. Referring now to FIG. 27, the filter assembly 116 is shown positioned within the housing 12 with respect to the door 134. Preferably the door 134 includes door tabs 136 that are configured to make contact with the filter tabs 154 that secure the second filter element 152 to the filter assembly 116. The contact helps ensure that a good seal is maintained between the gasket 174 and housing 112. The door tabs 136 can be arranged to make contact with the filter tabs 154 in a variety of ways as shown in FIGS. 27 and FIG. 15. Preferably the door tabs 136 are arranged to span the filter assembly 116 in a horizontal manner. That is, where the filter assembly 116 is hung vertically as shown in FIG. 27 preferably at least one pair of door tabs 136 makes contact with the filter tabs 154 on opposite side walls 162, 164. Where the filter assembly 116 is cantilevered as represented by the top filter assembly 116 in FIG. 15 preferably at least one pair of door tabs 136 makes contact with the filter tabs 154 on the top and bottom walls 158, 160.

The family of air purifiers 110 formed in accordance with the present invention solves a huge problem with retailers that market air purifiers. The family of air purifiers 110 includes a variety of members designed to have different Clean Air Delivery Rates ("CADR") to suit consumers particular performance requirements. The filter assembly disclosed herein can be used in all the members' housings. This allows retailers to stock a single filter assembly 116 to suit the demands of all consumers. This benefits the retailer because the filter assemblies will turn over more frequently and the retailer does not have to allocate as much shelf space as is needed to stock a variety of different size units.

In addition, the filter assembly 116 also provides advantages in reducing shelf space by having the hangers formed as an open "C" shaped section that defines the gap 121. The hanger 118, 120 could have been designed as illustrated by the embodiment shown in FIGS. 1 through 5 without a gap 121, but it was found that the gap allows for the packaging size for the replacement filter assemblies 116 to be reduced if the ribs 130 of the elongate members 122, 124 are allowed to extend between the legs 119 of each hanger 118, 120.

The family of air purifiers illustrated in FIGS. 10, 13, 16, 19, and 22 offer improved performance characteristics over comparable commercially available units that use HEPA filters when considering Clean Air Delivery Rate, the size of the unit, and the noise generated by the unit. The improved performance is attributed to the overall design as well as the design of the individual component parts. The dimensional relationship has been found to be important to the improved performance and is illustrated in the drawings. The drawings are to scale with the dimensions shown therein in millimeters. The design improvements of the following component parts have enhanced each air purifiers performance characteristics:

1. Housing 112 design having a cavity 176 that extends around the perimeter thereof;
2. Motor mount assembly 178; and
3. Fan 114.

These major components are generally illustrated in Figures that include a similar letter as part of their identification. For example, FIGS. 12A, 15A, 18A, 21A, and 24A all illustrate the same view for each purifier. Accordingly for the remainder of this disclosure reference to a similarly noted group of Figures will be hereinafter referred to as the "A drawings," "B drawings" etc.

Referring now to the FIGS. 12, 15, 18, 21, 24, and the "A drawings," the scroll 144 and fan 114 relationship for each purifier within the housing 112 is shown. The housing 112 in each purifier has an exterior surface 180 that is formed with the air inlet 126 and air outlet 128. In each purifier, the scroll 144 is located within the housing 112 and has walls 182 formed with an intake opening 184 and an exhaust port 186. The exterior surface 180 and the walls 182 define the cavity 176. The cavity 176 has a first portion 188 and a second portion 190. The first portion 188 is in communication between the exhaust port 186 and the air outlet 128. The scroll 144 preferably includes an exhaust duct portion 192 having a first end 194 and a second end 196 with the walls 182 defining a cross section of the exhaust duct portion 192. The first end 194 is in fluid communication with the intake opening 184 and the second end 196 terminates at the exhaust port 186. Preferably the cross section increases between the first end 194 and the second end 196. Preferably the walls 182 of the scroll 144 are configured to form a reducer 198 at the intake opening 184 having a cross section. Preferably the cross section of the reducer 198 is circular and decreases from the intake opening 184 towards the fan blade 200. When an air purifier is activated non-filtered air is drawn through the filter assemblies 116 creating a negative pressure zone between the outlet end 169 of the filter assemblies 116 and the central portion of the fan 114 while a positive pressure develops outside of the fan 114 within the scroll 144. In addition, a positive pressure of filtered clean air is developed in the second portion 190 of the cavity 176 that surrounds the negative pressure zone. With respect to the exterior surface 180 of the housing 112, this helps ensure that air exiting the purifier will be filtered clean air and that air entering the purifier will enter through the air inlet 126 and pass through one of the filter assemblies 116.

Referring now to the FIGS. 12, 15, 18, 21, and 24, the fan 114 preferably includes a motor mount assembly 178 connected to either the housing 112 or the scroll 144, and a fan blade 200 coupled to the motor mount assembly 178. Preferably the fan blade 200 is positioned within the scroll 144 adjacent to the reducer 198. The motor mount assembly 178 and fan blade 200 for the first member (FIG. 10) and the fourth member (FIG. 19) of the family of air purifiers are the same and are shown in FIGS. 12B through 12F. In addition, the motor mount assembly 178 and fan blade 200 for the third member (FIG. 16) and the fifth member (FIG. 22) of the family of air purifiers are the same and are shown in FIGS. 18B through 18F.

Referring now to the "B", "C", "D", and "E" drawings the motor mount assembly 178 for the air purifiers are shown. The motor mount assembly 178 includes a motor 202 and motor mount frame 204 attached to the motor 202. Preferably the assembly 178 also includes a motor mount ring 206 that has a center and facilitates the connection between the motor 202 and motor mount frame 204. The motor 202 is generally an electric motor that is powered by A.C. current. The motor 202 preferably has a shaft 210 for coupling to the fan blade 200. The motor mount frame 204 preferably includes a plurality of U-shaped brackets 208 made from wire. Each of the brackets 208 preferably has a pronged end 212 that is attached to the motor mount ring 206 and extends radially from the center, and a curved end 214 for connecting to either the housing 112 or the scroll 144. Preferably a wire ring 216 is connected to at least two of the plurality of brackets 208 adjacent to the curved end 214 for stiffening the motor mount frame 204. Preferably a grommet 218 made from rubber is located at the curved end 214 of each bracket Preferably the mounting assembly 178 also includes boss caps 220 to fit over the star shaped bosses 222 of the housing 112 or scroll 144 as shown in FIG. 13. The mounting assembly 178 is generally secured with screws through washers to sandwich the grommet 218 between the boss cap 220. The motor mount assembly 178 is advantageous because it is designed to reduce air turbulence and vibration providing for quieter operation without loss of CADR.

Referring now to the "F" drawings, the details of the fan blade 200 for each air purifier are shown. The fan blade 200 includes a plurality of fins 224 sandwiched between a circular plate 226 and a circular ring 228. The circular plate 226 is preferably formed with an opening in the center for cooperating with the shaft 210 of the motor 202. Preferably the fan blade 200 is made from plastic such as ABS. The configuration of the fan blade 200 is also significant in enhancing each air purifiers performance characteristics.

Although illustrative embodiments of the present invention have been described herein with reference to the accompanying drawings, it is to be understood that the invention is not limited to those precise embodiments, and that various other changes and modifications may be effected by one skilled in the art without departing from the scope or spirit of the invention.

What is claimed is:

1. A portable air purifying device comprising:
    a housing including an exterior surface formed with an air inlet and an air outlet, said air outlet being formed as a plurality of openings;
    a scroll located within said housing having walls formed with an intake opening and an exhaust port, said scroll including an exhaust duct portion having a first end in fluid communication with said intake opening and a second end that terminates at said exhaust port with a cross section that increases between said first end and said second end, said exterior surface and said walls defining a cavity which surrounds said scroll, said cavity having a first portion and a second portion with said first portion being located between said exhaust duct portion and said air outlet to provide substantially direct fluid communication between said exhaust port and said air outlet,
    a fan positioned within said intake opening for drawing air in through said air inlet to pass through said scroll and said first portion of said cavity to be expelled through said air outlet with said first portion being in fluid communication with said second portion so that said second portion of said cavity is under a positive pressure with substantially no airflow therein; and
    a filter assembly positioned within said housing between said air inlet and said fan.

2. A portable air purifying device as defined in claim 1, wherein said plurality of openings of said air outlet are a grill.

3. A portable air purifying device as defined in claim 1, wherein said walls of said scroll are configured to form a reducer at said intake opening having a cross section.

4. A portable air purifying device as defined in claim 3, wherein said fan includes:
    a motor mount assembly connected to one of said housing or said scroll; and
    a fan blade coupled to said motor mount assembly and positioned within said scroll adjacent to said reducer.

5. A portable air purifying device as defined in claim 4, wherein said cross section of said reducer is circular and decreases from said intake opening towards said fan blade.

6. A portable air purifying device as defined in claim 4, wherein said motor mount assembly includes:
    a motor having a shaft for coupling to said fan blade;
    a motor mount ring attached to said motor and having a center; and
    a plurality of brackets, each of said brackets having:
        a pronged end attached to said motor mount ring and extending radially from said center; and
        a curved end for connecting to one of said housing or said scroll.

7. A portable air purifying device as defined in claim 4, further comprising a wire ring that is connected to at least two of said plurality of brackets adjacent to said curved end.

8. A portable air purifying device as defined in claim 4, further comprising a plurality of grommets, each of said grommets being located at said curved end of one of said plurality of brackets.

9. A motor mounting assembly for a portable air purifier having a housing with an air inlet and an air outlet, a fan blade positioned within the housing for drawing air in through a filter assembly positioned within the housing, said motor mount assembly comprising:
    a motor having a shaft for coupling to the fan blade;
    a motor mount ring attached to said motor and having a center;
    a plurality of brackets, each of said brackets having:
        a pronged end attached to said motor mount ring and extending radially from said center; and
        a curved end for connecting to the housing; and
    a continuous wire ring that is connected to each of said plurality of brackets adjacent to said curved end.

10. A motor mounting assembly for a portable air purifier as defined in claim 9, further comprising a plurality of grommets, each of said grommets being located at said curved end of one of said plurality of brackets.

11. A portable air purifying device comprising:
    a housing including an air inlet and an air outlet, said housing defining a housing plane located between said air inlet and said air outlet;
    a fan positioned within said housing for drawing air into said housing through said air inlet and expelling air through said air outlet; and
    at least two modular filter assemblies positioned within said housing in parallel between said air inlet and said fan, each of said filter assemblies including:
        a frame having an outlet end which defines a frame plane, said frame plane being in a substantially coplanar relationship with said housing plane; and
        a filter element mounted to said frame.

12. A portable air purifying device as defined in claim 11, wherein said housing includes a door configured to engage said filter assemblies.

13. A portable air purifying device as defined in claim 11, wherein each of said filter assemblies further comprises a second filter element in series with said filter element.

14. A portable air purifying device as defined in claim 13, wherein said filter element is a HEPA filter and said second filter element is a removably attached carbon filter.

15. A family of portable air purifying devices comprising:
    a plurality of portable air purifying devices, each of said plurality of portable air purifying devices including:
        a housing including an air inlet and an air outlet;
        a fan positioned within said housing for drawing air into said housing through said air inlet and expelling air through said air outlet;
        a number of modular filter assemblies positioned within said housing in parallel between said air inlet and said fan, said filter assemblies having a frame and a filter element mounted to said frame,
    wherein said number for at least one of said plurality of portable air purifying devices is different from said number for another of said plurality of portable air purifying devices.

16. A family of portable air purifying devices as defined in claim 15, wherein said housing includes a door configured to engage said filter assemblies.

17. A family of portable air purifying devices as defined in claim 15, wherein each of said filter assemblies further comprises a second filter element in series with said filter element.

18. A family of portable air purifying devices as defined in claim 17, wherein said filter element is a HEPA filter and said second filter element is a removably attached carbon filter.

* * * * *